US012120775B2

(12) United States Patent
Talebi Fard et al.

(10) Patent No.: US 12,120,775 B2
(45) Date of Patent: *Oct. 15, 2024

(54) MULTI ACCESS PACKET/PROTOCOL DATA UNIT SESSION

(71) Applicant: Ofinno, LLC, Reston, VA (US)

(72) Inventors: Peyman Talebi Fard, Vienna, VA (US); Esmael Hejazi Dinan, McLean, VA (US); Weihua Qiao, Herndon, VA (US); Kyungmin Park, Vienna, VA (US)

(73) Assignee: Ofinno, LLC, Reston, VA (US)

( * ) Notice: Subject to any disclaimer, the term of this patent is extended or adjusted under 35 U.S.C. 154(b) by 257 days.

This patent is subject to a terminal disclaimer.

(21) Appl. No.: 17/516,252

(22) Filed: Nov. 1, 2021

(65) Prior Publication Data

US 2022/0053603 A1 Feb. 17, 2022

Related U.S. Application Data

(63) Continuation of application No. 16/445,878, filed on Jun. 19, 2019, now Pat. No. 11,178,725.

(Continued)

(51) Int. Cl.
*H04W 80/10* (2009.01)
*H04W 4/80* (2018.01)
(Continued)

(52) U.S. Cl.
CPC .............. *H04W 80/10* (2013.01); *H04W 4/80* (2018.02); *H04W 8/08* (2013.01);
(Continued)

(58) Field of Classification Search
CPC ....... H04W 80/10; H04W 76/12; H04W 4/80; H04W 8/08; H04W 28/0268; H04W 68/005; H04W 84/12; H04W 76/11
See application file for complete search history.

(56) References Cited

U.S. PATENT DOCUMENTS 8,566,455 B1   10/2013 Zhao et al.
11,166,334 B2  11/2021 Wang et al.
(Continued)

FOREIGN PATENT DOCUMENTS

WO    2019/160278 A1   8/2019

OTHER PUBLICATIONS

3GPP TS 29.510 V17.4.0 (Dec. 2021); Technical Specification; 3rd Generation Partnership Project; Technical Specification Group Core Network and Terminals; 5G System; Network Function Repository Services; Stage 3; (Release 17).

(Continued)

*Primary Examiner* — Walter J Divito
(74) *Attorney, Agent, or Firm* — Sachin Kandhari; Kavon Nasabzadeh; Jacob L. Mangan

(57) ABSTRACT

A session management function (SMF) receives, from a user plane function (UPF), a data notification message for a multi access (MA) packet data unit (PDU) session associated with multiple tunnels between multiple access network types and a PDU session anchor. The SMF sends, to an access and mobility management function (AMF), a first request to activate user plane resources. The first request comprises an indication of an access network type, from among the multiple access network types, of the MA PDU session.

20 Claims, 38 Drawing Sheets

Related U.S. Application Data

(60) Provisional application No. 62/688,075, filed on Jun. 21, 2018.

(51) Int. Cl.
| | |
|---|---|
| *H04W 8/08* | (2009.01) |
| *H04W 28/02* | (2009.01) |
| *H04W 28/086* | (2023.01) |
| *H04W 68/00* | (2009.01) |
| *H04W 76/11* | (2018.01) |
| *H04W 76/12* | (2018.01) |
| *H04W 84/04* | (2009.01) |
| *H04W 84/12* | (2009.01) |

(52) U.S. Cl.
CPC ..... *H04W 28/0268* (2013.01); *H04W 68/005* (2013.01); *H04W 76/11* (2018.02); *H04W 76/12* (2018.02); *H04W 28/086* (2023.05); *H04W 84/042* (2013.01); *H04W 84/12* (2013.01)

(56) References Cited

U.S. PATENT DOCUMENTS

| | | | |
|---|---|---|---|
| 2010/0153547 | A1 | 6/2010 | Kidachi et al. |
| 2011/0075605 | A1 | 3/2011 | De Pasquale et al. |
| 2014/0198637 | A1 | 7/2014 | Shan et al. |
| 2017/0048739 | A1 | 2/2017 | Jeong et al. |
| 2017/0231020 | A1 | 8/2017 | Tomici et al. |
| 2019/0223129 | A1* | 7/2019 | Starsinic ............ H04L 63/0807 |
| 2019/0274178 | A1* | 9/2019 | Salkintzis ............ H04L 47/125 |
| 2019/0357294 | A1 | 11/2019 | Ha et al. |
| 2019/0373441 | A1* | 12/2019 | Ryu ..................... H04W 48/18 |
| 2020/0128432 | A1* | 4/2020 | Youn ..................... H04W 28/10 |
| 2020/0170071 | A1* | 5/2020 | Mildh ................... H04W 80/08 |
| 2020/0236727 | A1* | 7/2020 | Salkintzis ............ H04W 76/16 |
| 2020/0245383 | A1* | 7/2020 | Lu ........................ H04W 76/12 |
| 2020/0260325 | A1 | 8/2020 | Futaki et al. |
| 2020/0336940 | A1 | 10/2020 | Salkintzis |
| 2020/0367090 | A1 | 11/2020 | Zhang et al. |
| 2020/0382941 | A1 | 12/2020 | Lee et al. |
| 2021/0029586 | A1 | 1/2021 | Zhu et al. |
| 2021/0037585 | A1 | 2/2021 | Youn et al. |
| 2021/0100047 | A1 | 4/2021 | Chiba et al. |
| 2021/0112478 | A1 | 4/2021 | Dannebro et al. |

OTHER PUBLICATIONS

3GPP TS 29.571 V17.4.0 (Dec. 2021); Technical Specification; 3rd Generation Partnership Project; Technical Specification Group Core Network and Terminals; 5G System; Common Data Types for Service Based Interfaces; Stage 3; (Release 17).
C4-192124; 3GPP TSG-CT WG4 Meeting #91C4-192124; Reno, US; May 13-17, 2019; was C4-191522; Change Request; 29.510; CR 0154; rev 3; Current version: 15.3.0.
C4-200628; 3GPP TSG-CT WG4 Meeting #96; E-Meeting, Feb. 24-28, 2020; Change Request; 29.571; CR 0182; rev-; Current version: 16.2.0.
3GPP TS 23.234 V13.1.0 (Mar. 2017); 3rd Generation Partnership Project; Technical Specification Group Services and System Aspects; 3GPP system to Wireless Local Area Network (WLAN) interworking; System description (Release 13).
3GPP TS 23.327 V13.1.0 (Sep. 2016); 3rd Generation Partnership Project; Technical Specification Group Services and System Aspects; Mobility between 3GPP-Wireless Local Area Network (WLAN) interworking and 3GPP systems (Release 13).
3GPP TS 23.401 V15.4.0 (Jun. 2018); 3rd Generation Partnership Project; Technical Specification Group Services and System Aspects; General Packet Radio Service (GPRS) enhancements for Evolved Universal Terrestrial Radio Access Network (E-UTRAN) access (Release 15).
3GPP TS 23.402 V15.3.0 (Mar. 2018); 3rd Generation Partnership Project; Technical Specification Group Services and System Aspects; Architecture enhancements for non-3GPP accesses (Release 15).
3GPP TS 23.501 V15.2.0 (Jun. 2018); 3rd Generation Partnership Project; Technical Specification Group Services and System Aspects; System Architecture for the 5G System; Stage 2 (Release 15).
3GPP TS 23.502 V15.2.0 (Jun. 2018); 3rd Generation Partnership Project; Technical Specification Group Services and System Aspects; Procedures for the 5G System; Stage 2 (Release 15).
3GPP TR 23.793 V0.5.0 (Jun. 2018); 3rd Generation Partnership Project; Technical Specification Group Services and System Aspects; Study on Access Traffic Steering, Switching and Splitting support in the 5G system architecture (Release 16).
3GPP TS 37.340 V15.1.0 (Mar. 2018); 3rd Generation Partnership Project; Technical Specification Group Radio Access Network; Evolved Universal Terrestrial Radio Access (E-UTRA) and NR; Multi-connectivity; Stage 2 (Release 15).
3GPP TSG-SA WG2 Meeting #127BIS S2-185583 Newport Beach, California, USA, May 28-Jun. 1, 2018 (revision of S2-184976) Source: LG Electronics; Title: ATSSS Solution—Differentiation of 3GPP RATs in ATSSS Rule Document for: Approval; Agenda Item: 6.8 Study on Access Traffic Steering, Switch and Splitting support in the 5G system architecture; Work Item / Release: FS_ATSSS / Rel-16.
SA WG2 Meeting #120 S2-172017; Mar. 27-31, 2017, Busan, Korea (revision of S2-17xxxx); Source: Huawei, HiSilicon; Title: UE_initiated Service Request procedure in CM_IDLE state via untrusted non-3GPP; Document for: Approval; Agenda Item: 6.5.10; Work Item / Release: 5G_ph1 / Rel-15.
SA WG2 Meeting #120 S2-172036; Mar. 27-31, 2017, Busan, South Korea (revision of S2-17xxxx); Source: Huawei, HiSilicon; Title: Network-initiated Service Request for Non-3GPP Access ; Document for: Approval; Agenda Item: 6.5.10; Work Item / Release: 5G_ph1 / Rel-15.
SA WG2 Meeting #120 S2-172149; Mar. 27-31, 2017, Busan, South Korea (revision of S2-17xxxx); Source: ETRI; Title: TS 23.502 UE triggered Service Request procedure over non-3GPP access in CM-IDLE Document for: Approval; Agenda Item: 6.5.10; Work Item / Release: 5GS_Ph1 / Rel-15.
SA WG2 Meeting #120 S2-172855; Mar. 27-31, 2017, Busan, South Korea (e-mail revision 4 of S2-172475); Source: Samsung; Title: TS 23.502: Registration and Session management procedure when registered for both access types; Document for: Approval ; Agenda Item: 6.5.2; Work Item / Release: 5GS_Ph1 / Rel-15.
SA WG2 Meeting #121 S2-172988; May 15-19, 2017 Hangzhou, P. R. China (revision of S2-17xxxx); Source: Ericsson, Sony, Qualcomm, LG Electronics, MediaTek; Title: MICO mode updates; Document for: Approval; Agenda Item: 6.5.7.2 ; Work Item / Release: 5G_ph1 / Rel-15.
SA WG2 Meeting #S2-121 S2-173130; May 15-19, 2017, Hangzhou, P. R. China; Source: Qualcomm Incorporated; Title: TS 23.501: Support of CN-IDLE state over non-3GPP access.; Document for: Discussion/Approval; Agenda Item: 6.5.10; Work Item / Release: 5G_ph1/Rel-15.
3GPP TSG SA WG2 Meeting #121 S2-173392; May 15-19, 2017, Hangzhou, China (revision of S2-17xxxx); Source: Huawei, HiSilicon; Title: Network-initiated Service Request for Non-3GPP Access ; Document for: Approval; Agenda Item: 6.5.10; Work Item / Release: 5G_ph1 / Rel-15.
SA WG2 Meeting #121 S2-173624; May 15-19, 2017 Hangzhou, P. R. China (revision of S2-172988); Source: Ericsson, Sony, Qualcomm, LG Electronics, MediaTek, HTC, CATT; Title: MICO mode updates; Document for: Approval; Agenda Item: 6.5.7.2 ; Work Item / Release: 5G_ph1 / Rel-15.
SA WG2 Meeting #S2-121 S2-173754; May 15-19, 2017, Hangzhou, P. R. China; Source: Qualcomm Incorporated, Nokia?, Alcatel-Lucent Shanghai Bell?, Ericsson?, Huawei?, HiSilicon? ; Title: TS 23.501: Support of CN-IDLE state over non-3GPP access.; Document for: Discussion/Approval; Agenda Item: 6.5.10; Work Item / Release: 5G_ph1/ Rel-15.
SA WG2 Meeting #S2-121 S2-173778;May 15-19, 2017, Hangzhou, P. R. China; Source: Qualcomm Incorporated, Nokia?, Alcatel-Lucent Shanghai Bell?, Ericsson?, Huawei?, HiSilicon? ; Title: TS

(56) References Cited

OTHER PUBLICATIONS 23.501: Support of CN-IDLE state over non-3GPP access.; Document for: Discussion/Approval; Agenda Item: 6.5.10; Work Item / Release: 5G_ph1/ Rel-15.
SA WG2 Meeting #S2-121 S2-173810; May 15-19, 2017, Hangzhou, P. R. China; Source: Qualcomm Incorporated, Nokia, Alcatel-Lucent Shanghai Bell, Ericsson, Huawei, HiSilicon, Samsung ; Title: TS 23.501: Support of CN-IDLE state over non-3GPP access.; Document for: Discussion/Approval; Agenda Item: 6.5.10 Work Item / Release: 5G_ph1/Rel-15.
SA WG2 Meeting #122 S2-174889; Jun. 26-30, 2017, San Jose del cabo, Mexico (revision of S2-174280); Source: Nokia, Alcatel-Lucent Shanghai Bell; Title: 23.501: pCR on solving Non-3GPP access reachability editor's note; Document for: Approval; Agenda Item: 6.5.10; Work Item / Release: 5GS_Ph1/ Rel15.
SA WG2 Meeting #126 S2-181544; Feb. 26-Mar. 2, 2018, Montreal, Canada ; Source: ZTE; Title: QoS flow handling for Multi-Access PDU session; Document for: Approval; Agenda Item: 6.8; Work Item / Release: FS_ATSSS / Rel-16.
SA WG2 Meeting #126 S2-181596; Feb. 26-Mar. 2, 2018, Montreal, Canada (was S2-18----); Source: CATT; Title: Multi-access PDU session support for Non-IP type PDU sessions; Document for: Approval; Agenda Item: 6.8; Work Item / Release: FS_ATSSS / Rel-16.
SA WG2 Meeting #126 S2-182015; Feb. 26-Mar. 2, 2018, Montreal, Canada (revision of S2-17xxxx); Source: InterDigital Inc.; Title: UE Requested Multi-access PDU Session Establishment; Document for: Approval; Agenda Item: 6.8; Work Item / Release: FS_ATSSS / Rel-16.
SA WG2 Meeting #126 S2-182016; Feb. 26-Mar. 2, 2018, Montreal, Canada (revision of S2-17xxxx); Source: InterDigital Inc.; Title: Update on ATSSS Key Issue #5; Document for: Approval; Agenda Item: 6.8; Work Item / Release: FS_ATSSS / Rel-16.
SA WG2 Meeting #126 S2-182041; Montreal, Canada, Feb. 22-Mar. 2 (revision of S2-18xxxx); Source: LG Electronics; Title: ATSSS Architectural Assumptions—Homogenous support of ATSSS; Document for: Approval; Agenda Item: 6.8 Study on Access Traffic Steering, Switch and Splitting support in the 5G system architecture; Work Item / Release: FS_ATSSS / Rel-16.
SA WG2 Meeting #126 S2-182043; Montreal, Canada, Feb. 22-Mar. 2 (revision of S2-18xxxx); Source: LG Electronics; Title: ATSSS Solution—Multi-Access PDU Session Establishment; Document for: Approval; Agenda Item: 6.8 Study on Access Traffic Steering, Switch and Splitting support in the 5G system architecture; Work Item / Release: FS_ATSSS / Rel-16.
SA WG2 Meeting #126 S2-182044; Montreal, Canada, Feb. 22-Mar. 2 (revision of S2-18xxxx); Source: LG Electronics; Title: ATSSS Solution—Differentiation of 3GPP RATs in ATSSS Rule; Document for: Approval; Agenda tem: 6.8 Study on Access Traffic Steering, Switch and Splitting support in the 5G system architecture; Work Item / Release: FS_ATSSS / Rel-16.
SA WG2 Meeting #126 S2-182101; Feb. 26, 2018-Mar. 2, 2018, Montreal, Canada (revision of S2-18xxxx); Source: Samsung; Title: TR 23.793: ATSSS operations modes; Document for: Approval; Agenda Item: 6.8; Work Item Release: ATSSS / Release 16.
SA WG2 Meeting #126 S2-182122; Feb. 26-Mar. 2, 2018, Montreal, Canada (revision of S2-18xxxx); Source: ETRI; Title: 23.793: Updates on Key Issue #3 and #4 ; Document for: Approval; Agenda Item: 6.8; Work Item / Release: FS_ATSSS/Rel-16.
SA WG2 Meeting #126 S2-182123; Feb. 26-Mar. 2, 2018, Montreal, Canada (revision of S2-18xxxx); Source: ETRI; Title: 23.793: Proposed Solution for Multi-access PDU Session ; Document for: Approval; Agenda Item: 6.8; Work Item / Release: FS_ATSSS/Rel-16.
3GPP TSG SA WG2 Meeting #126 S2-182197; Feb. 26-Mar. 2, 2018, Montreal, Canada (revision of S2-18xxxx); Source: Intel; Title: Solution for the differentiation of 3GPP RATs in ATSSS rule; Document for: Approval; Agenda Item: 6.8; Work Item / Release: ATSSS/Rel-16.
SA WG2 Meeting #126 S2-182202; Feb. 26-Mar. 2, 2018, Montreal, Canada (revision of S2-18xxxx); Source: China Telecom; Title: 23.793: Update for the references and abbreviations of ATSSS; Document for: Approval; Agenda Item: 6.8; Work Item / Release: FS_ATSSS/Rel-16.
SA WG2 Meeting #126 S2-182204; Feb. 22-Mar. 2, 2018, Montreal, Canada (revision of S2-18xxxx); Source: China Telecom; Title: 23.793: New Key Issue : Policy rule for ATSSS; Document for: Approval; Agenda Item: 6.8; Work Item / Release: FS_ATSSS/ Rel-16.
SA WG2 Meeting #126 S2-182243; Feb. 26 to Mar. 2, 2018, Montreal, Canada (revision of S2-18xxxx); Source: ITRI; Title: MA-PDU session release operations; Document for: Approval ; Agenda Item: 6.8; Work Item / Release: ATSSS.
SA WG2 Meeting #126 S2-182501; Feb. 26-Mar. 2, 2018, Montreal, Canada (revision of S2-182203); Source: China Telecom; Title: 23.793: Update on Key Issue 5: Multi-access PDU sessions; Document for: Approval; Agenda Item: 6.8; Work Item / Release: FS_ATSSS/Rel-16.
SA WG2 Meeting #126 S2-182504; Feb. 26-Mar. 2, 2018, Montreal, Canada (revision of S2-182121); Source: Motorola Mobility, Lenovo; Title: Update of Solution 2; Document for: Approval; Agenda Item: 6.8; Work Item / Release! FS_ATSSS / Rel-16.
SA WG2 Meeting #126 S2-182505; Feb. 26-Mar. 2, 2018, Montreal, Canada (revision of S2-182231); Source: ITR; Title: Update the existing solution to Support of Multi-Access PDU Sessions; Document for: Approval ; Agenda Item: 6.8; Work Item / Release: ATSSS.
SA WG2 Meeting #126 S2-182883; Montreal, Canada, Feb. 22-Mar. 2 (revision of S2-182502); Source: Broadcom; Title: Architectural Extension for ATSSS Solution 1; Document for: Approval; Agenda Item: 6.8 Study on Access Traffic Steering, Switch and Splitting support in the 5G system architecture; Work Item / Release: FS_ATSSS / Rel-16.
SA WG2 Meeting #126 S2-182884; Feb. 26, 2018-Mar. 2, 2018, Montreal, Canada (revision of S2-182503); Source: Samsung; Title: TR 23.793: ATSSS architecture updates; Document for: Approval; Agenda Item: 6.8; Work Item / Release: ATSSS / Release 16.
SA WG2 Meeting #126 S2-182885; Feb. 26-Mar. 2, 2018, Montreal, Canada ; Source: OPPO; Title: Solution: NCP Based Solution Improvement; Document for: Approval; Agenda Item: 6.8; Work Item / Release: FS_CIoT_5G / Rel-16.
SA WG2 Meeting #126 S2-182886; Feb. 26-Mar. 2, 2018, Montreal, Canada; Source: Huawei, HiSilicon, OPPO; Title: Solution 3: Multi-access PDU Session Establishment with NCP; Document for: Approval; Agenda Item: 6.12; Work Item / Release: FS_ATSSS /Rel-16.
3GPP TSG-SA WG2 Meeting #127 S2-183385; Sanya, China, Apr. 16-20, 2018.
SA WG2 Meeting #127 S2-183551; Apr. 16-Apr. 20, 2018, Sanya, China (revision of S2-17xxxx); Source: InterDigital Inc.; Title: Network-controlled Traffic Steering for Multi-access PDU Session; Document for: Approval; Agenda Item: 6.8; Work Item / Release: FS_ATSSS / Rel-16.
SA WG2 Meeting #127 S2-183580; Sanya, China, Apr. 16-20 (revision of S2-18xxxx); Source: LG Electronics; Title: ATSSS Solution—Differentiation of 3GPP RATs in ATSSS Rule; Document for: Approval; Agenda Item: 6.8 Study on Access Traffic Steering, Switch and Splitting support in the 5G system architecture; Work Item / Release: FS_ATSSS / Rel-16.
SA WG2 Meeting #127 S2-183581; Sanya, China, Apr. 16-20 (revision of S2-18xxxx); Source: LG Electronics; Title: URSP Rule and ATSSS Rule; Document for: Approval; Agenda Item: 6.8 Study on Access Traffic Steering, Switch and Splitting support in the 5G system architecture; Work Item / Release: FS_ATSSS / Rel-16.
3GPP TSG SA WG2 Meeting #127 S2-183640; Apr. 16-Apr. 20, 2018, Sanya, China (revision of S2-18xxxx); Source: Intel; Title: Solution for the differentiation of 3GPP RATs in ATSSS rule; Document for: Approval; Agenda Item! 6.8; Work Item / Release: FS_ATSSS/Rel-16.
3GPP TSG SA WG2 Meeting #127 S2-183642; Apr. 16-Apr. 20, 2018, Sanya, China (revision of S2-18xxxx); Source: Intel; Title:

(56) References Cited

OTHER PUBLICATIONS

Solution of Key Issues #2, #3, #4 for ATSSS rule; Document for: Approval; Agenda Item: 6.8; Work Item / Release: FS_ATSSS/Rel-16.
SA WG2 Meeting #127 S2-183689; Apr. 16-20, 2018, Sanya, China (revision of S2-18xxxx); Source: ETRI; Title: Updating 6.2 Solution 2 to add a procedure for Multi-Access PDU Session Release; Document for: Approval; Agenda Item: 6.8; Work Item / Release: FS_ATSSS / Rel-16.
SA WG2 Meeting #127 S2-183712; Apr. 16-20, 2018, Sanya, China ; Source: ZTE, Qualcomm; Title: QoS flow handling for Multi-Access PDU session; Document for: Approval; Agenda Item: 6.8; Work Item / Release: FS_ATSSS / Rel-16.
SA WG2 Meeting #127 S2-184113; Apr. 16-Apr. 20, 2018, Sanya, China revision of S2-183271; Source: Huawei, HiSilicon; Title: 23.793: Update on Key Issue 5: Multi-access PDU sessions; Document for: Discussion; Agenda Item: 6.8; Work Item / Release: FS_ATSSS/Rel-16.
SA WG2 Meeting #127 S2-184119; Apr. 16 to Apr. 20, 2018, Sanya, China (revision of S2-183675); Source: ITRI, ETRI; Title: MA-PDU session release operations; Document for: Approval ; Agenda Item: 6.8; Work Item / Release: ATSSS.
SA WG2 Meeting #127 S2-184120; Apr. 16-20, 2018, Sanya, P.R.China (revision of S2-183388); Source: Motorola Mobility, Lenovo; Title: Traffic steering with ATSSS policy; Document for: Approval; Agenda Item: 6.8; Work Item / Release: FS_ATSSS / Rel-16.
SA WG2 Meeting #127 S2-184471; Apr. 16-20, 2018, Sanya, China (revision of S2-183622, S2-184115); Source: Apple, Inc., Deutsche Telekom; Title: 23.793: New solution: MPTCP proxy architecture; Document for: Approval; Agenda Item: 6.8; Work Item / Release: FS_ATSSS/Rel-16.
SA WG2 Meeting #127 S2-184472; Apr. 16-Apr. 20, 2018, Sanya, PRC (revision of S2-184116); Source: Nokia, Nokia Shanghai Bell; Title: Architecture framework with ATSSS rules and UP Access Agnostic Reporting Control Protocol; Document for: Approval; Agenda Item: 6.8; Work Item / Release: FS_ATSSS.
SA WG2 Meeting #127 S2-184473; Apr. 16-20, 2018, Sanya, P.R.China (revision of S2-183495, 4117); Source: Motorola Mobility, Lenovo; Title: Solution 2 Update: NW-Requested Establishment of MA-PDU session; Document for: Approval; Agenda Item: 6.8; Work Item / Release: FS_ATSSS / Rel-16.
SA WG2 Meeting #127 S2-184474; Sanya, China, Apr. 16-20 (Revision of S2-184474 was 3579, merging 3690, 3677, 3550); Source: LG Electronics, Motorola Mobility, Lenovo, InterDigital Inc.; Title: ATSSS Solution—Update of Solution 2; Document for: Approval; Agenda Item: 6.8 Study on Access Traffic Steering, Switch and Splitting support in the 5G system architecture; Work Item / Release: FS_ATSSS / Rel-16.
SA WG2 Meeting #127 S2-184475; Apr. 16-20, 2018, Sanya, China (revision of S2-184121, S2-183361); Source: Huawei, HiSilicon; Title: ATSSS Rule definition and update of TFCP; Document for: Approval; Agenda Item: 6.8; Work Item / Release: FS_ATSSS /Rel-16.
SA WG2 Meeting #127 S2-184476; Sanya, P.R.China, Apr. 16-20, 2018 (revision of S2-184470); Source: BT Plc, Broadcom, Deutsche Telekom; Title: Architectural Updates for ATSSS Solution 1; Document for: Approval; Agenda Item: 6.8 Study on Access Traffic Steering, Switch and Splitting support in the 5G system architecture; Work Item / Release: FS_ATSSS / Rel-16.
SA WG2 Meeting #127-Bis S2-185001; May 28-Jun. 1, 2018, Newport Beach, USA (revision of S2-18xxxx); Source: ETRI; Title: Updating 6.2 Solution 2 to add a procedure for Multi-Access PDU Session Modification; Document for: Approval; Agenda Item: 6.8; Work Item / Release: FS_ATSSS / Rel-16.
SA WG2 Meeting #127-Bis S2-185002; May 28-Jun. 1, 2018, Newport Beach, USA (revision of S2-18xxxx); Source: ETRI; Title: Updating 6.5 Solution 5 to use multiple addresses at a MPTCP Proxy; Document for: Approval; Agenda Item: 6.8; Work Item / Release: FS_ATSSS / Rel-16.
SA WG2 Meeting #127b S2-185121; May 28-Jun. 1, 2018, Newport Beach, USA (revision of S2-185121).
3GPP TSG-SA2 Meeting #127bis S2-185298; May 28-Jun. 1, 2018, Newport Beach, USA.
SA WG2 Meeting #127bis S2-185362; Newport Beach, the US, May 28-Jun. 1, 2018; Source: Huawei, HiSilicon; Title: Solution for the UL CL case on the Multi-access PDU sessions; Document for: Discussion; Agenda Item: 6.8; Work Item / Release: FS_ATSSS/Rel-16.
SA WG2 Meeting #127bis S2-185446; May 28 to Jun. 1, 2018, Newport Beach, USA (revision of S2-18xxxx); Source: TRI; Title: Resolve EN in Release of a Multi-Access PDU Session; Document for: Approval ; Agenda Item: 6.8; Work Item / Release: ATSSS.
3GPP TSG-SA2 Meeting #127 Bis S2-186134; May 28-Jun. 1, 2018, Newport Beach, USA.

\* cited by examiner

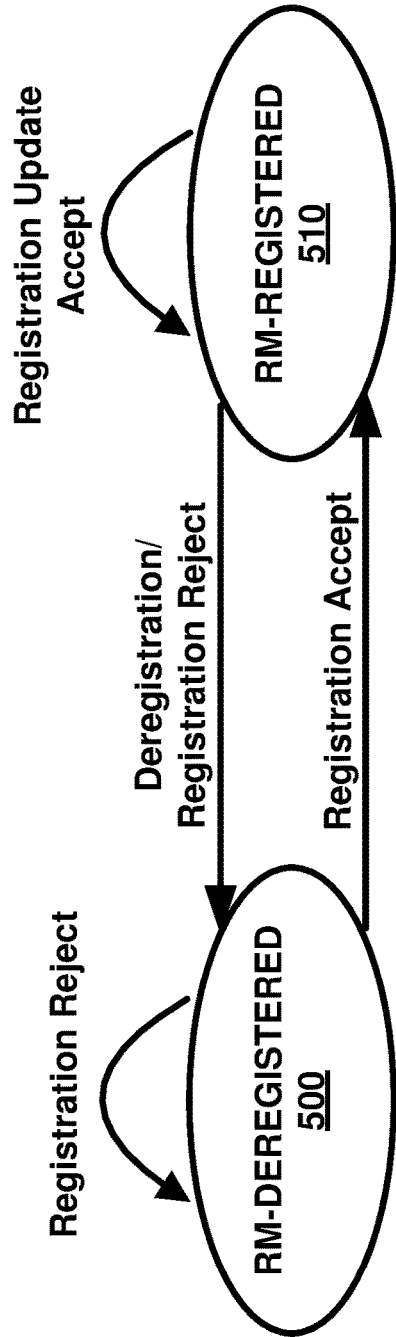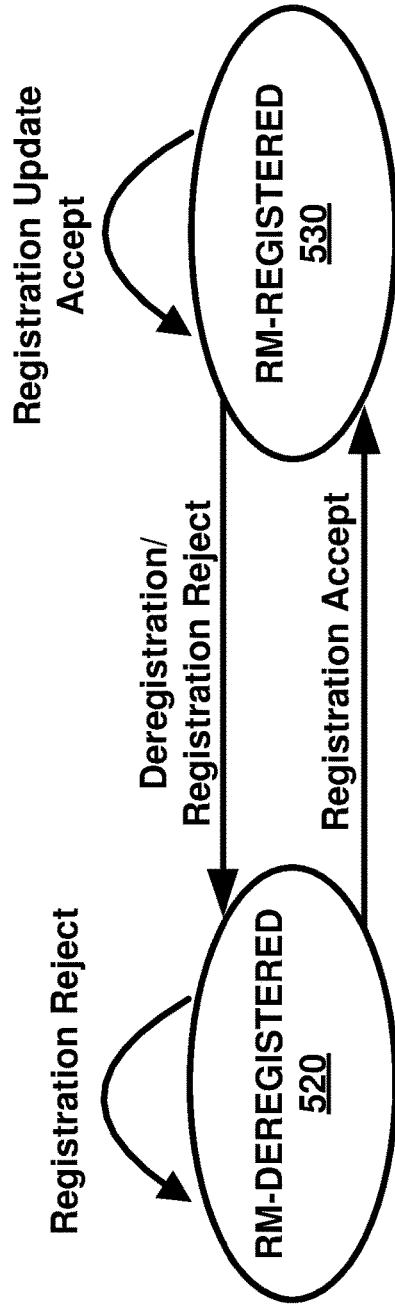
FIG. 5A
FIG. 5B

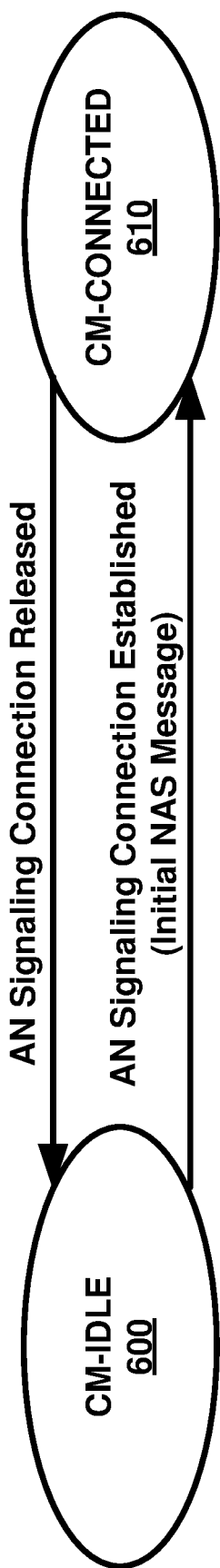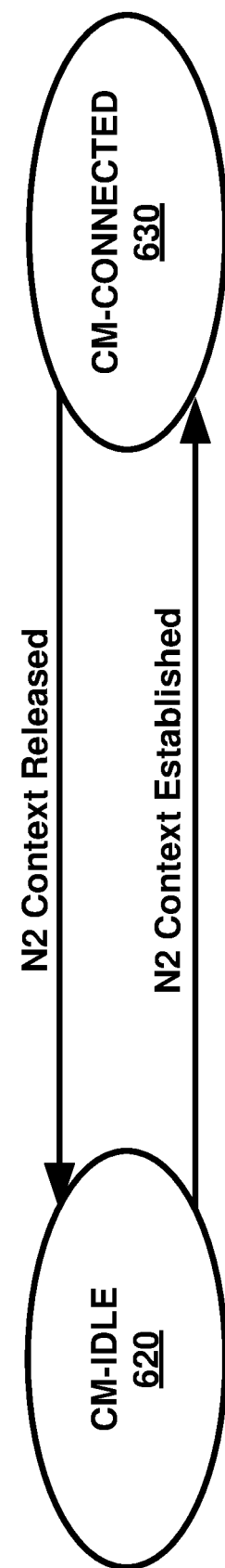

First ATSSS rule (priority 1):
- Traffic filter: Traffic of App-X.
- Steering mode: Active-Standby steering; Active access: 3GPP, Standby access: non-3GPP

Second ATSSS rule (priority 2):
- Traffic filter: TCP traffic with destination IP address 10.10.0.1.
- Steering mode: Active-Standby steering; Active access: 3GPP, Standby access: None.

Default ATSSS rule (least priority):
- Traffic filter: All traffic.
- Steering mode: Active-Standby steering; Active access: non-3GPP, Standby access: 3GPP Example ATSSS Policy

FIG. 18

```
┌─────────────────────────────────────────────────────────────┐
│ Send, to an SMF, a reporting message indicating inactivity of a │
│   child session of an MA PDU session, the reporting message    │
│     comprising: access information associated with the child   │
│ session of the MA PDU session wherein the access information   │
│      comprises an access type; and an identifier of a session  │
│    between the SMF and the UPF associated with the MA PDU      │
│                          session                                │
│                           3610                                  │
└─────────────────────────────────────────────────────────────┘
                                │
                                ▼
┌─────────────────────────────────────────────────────────────┐
│ Receive, from the SMF, a session modification request indicating │
│    deactivation of a user plane connection of the child session │
│                           3620                                  │
└─────────────────────────────────────────────────────────────┘
                                │
                                ▼
┌─────────────────────────────────────────────────────────────┐
│ Deactivate, based on the session modification request, the user │
│           plane connection of the child session                 │
│                           3630                                  │
└─────────────────────────────────────────────────────────────┘
```

FIG. 36

Receive, from an AMF, a first session creation request message for an MA PDU session of a wireless device, the first session creation request message comprising an ATSSS capability indicator
3710

Send, to an NRF, a first message requesting discovery of a UPF, the first message comprising the ATSSS capability indicator
3720

Receive, from the NPF, a second message comprising an identifier of the UPF
3730

Send, to the UPF, a second session creation request message to create a session between the SMF and the UPF
3740

FIG. 37

MULTI ACCESS PACKET/PROTOCOL DATA UNIT SESSION

CROSS-REFERENCE TO RELATED APPLICATIONS

This application is a continuation of U.S. patent application Ser. No. 16/445,878, filed Jun. 19, 2019, which claims the benefit of U.S. Provisional Application No. 62/688,075, filed Jun. 21, 2018, which are hereby incorporated by reference in their entirety.

BRIEF DESCRIPTION OF THE SEVERAL VIEWS OF THE DRAWINGS

Examples of several of the various embodiments of the present invention are described herein with reference to the drawings.

FIG. 5A and FIG. 5B depict two registration management state models in UE 100 and AMF 155 as per an aspect of embodiments of the present disclosure.

FIG. 6A and FIG. 6B depict two connection management state models in UE 100 and AMF 155 as per an aspect of embodiments of the present disclosure.

FIG. 18 is an example call flow as per an aspect of an embodiment of the present disclosure.

FIG. 36 is a flow diagram of an aspect of an embodiment of the present disclosure.

FIG. 37 is a flow diagram of an aspect of an embodiment of the present disclosure.

DETAILED DESCRIPTION OF EMBODIMENTS

Example embodiments of the present invention enable implementation of enhanced features and functionalities in 5G systems. Embodiments of the technology disclosed herein may be employed in the technical field of 5G systems and network slicing for communication systems. More particularly, the embodiments of the technology disclosed herein may relate to 5G core network and 5G systems for network slicing in communication systems. Throughout the present disclosure, UE, wireless device, and mobile device are used interchangeably.

Figure 1:
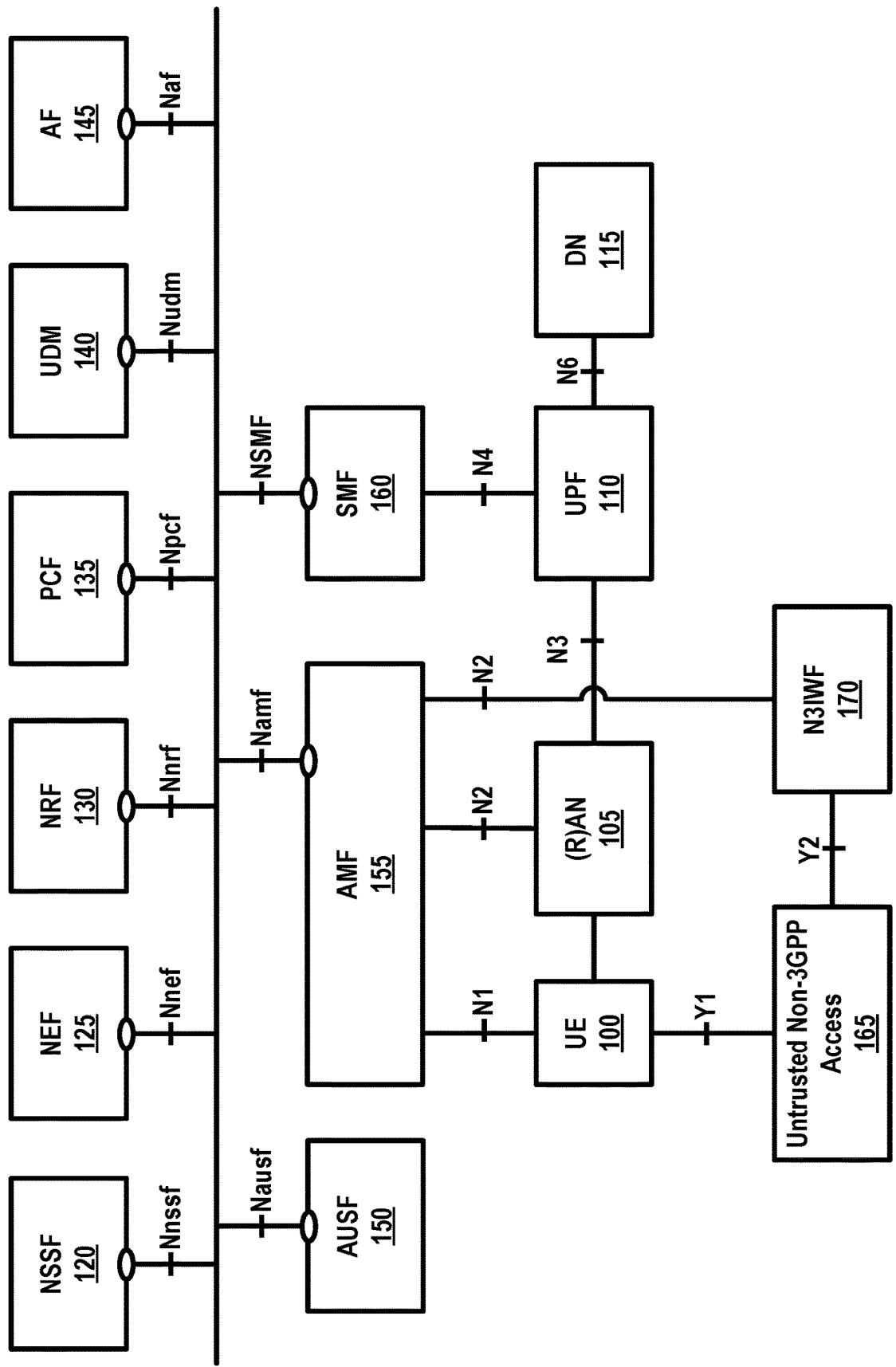
FIG. 1 is a diagram of an example 5G system architecture as per an aspect of an embodiment of the present disclosure.
Figure 2:
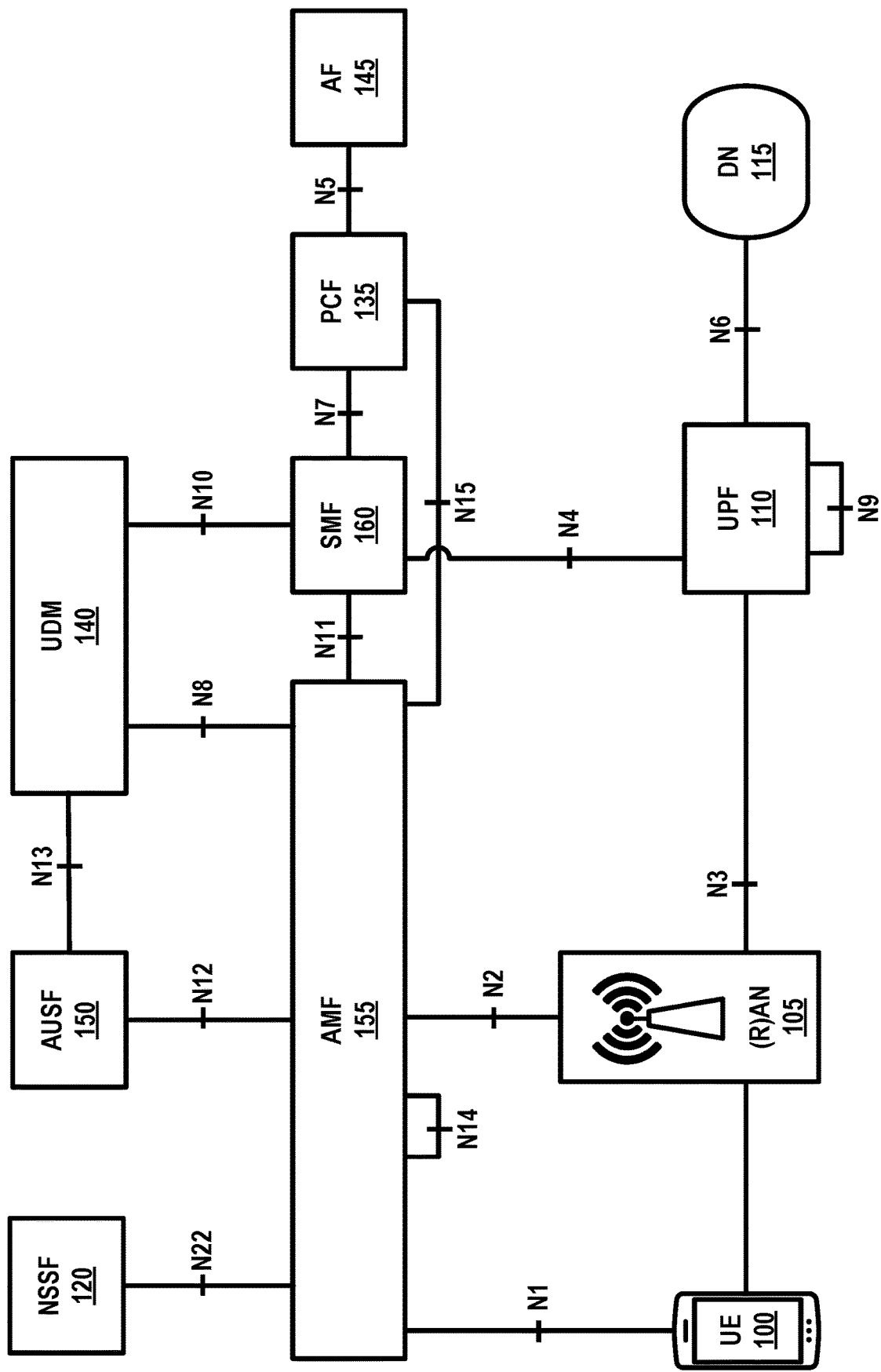
FIG. 2 is a diagram of an example 5G System architecture as per an aspect of an embodiment of the present disclosure.

The following acronyms are used throughout the present disclosure:

5G 5th generation mobile networks
5GC 5G Core Network
5GS 5G System
5G-AN 5G Access Network
5QI 5G QoS Indicator
ACK Acknowledgement
AF Application Function
AMF Access and Mobility Management Function
AN Access Network
ATSSS Access Traffic Steering, Switching and Splitting
AT3SF Access Traffic Steering, Switching and Splitting Function
CDR Charging Data Record
CCNF Common Control Network Functions
CIoT Cellular IoT
CN Core Network
CP Control Plane
DDN Downlink Data Notification
DL Downlink
DN Data Network
DNN Data Network Name
F-TEID Fully Qualified TEID GPSI Generic Public Subscription Identifier
GTP GPRS Tunneling Protocol
GUTI Globally Unique Temporary Identifier
IMSI International Mobile Subscriber Identity
LADN Local Area Data Network
LI Lawful Intercept
MA-PDU Multi-Access Packet Data Unit
MEI Mobile Equipment Identifier
MICO Mobile Initiated Connection Only
MME Mobility Management Entity
MO Mobile Originated
MSISDN Mobile Subscriber ISDN
MT Mobile Terminating
NB31WF Non-3GPP InterWorking Function
NAI Network Access Identifier
NAS Non-Access Stratum
NB-IoT Narrow Band IoT
NEF Network Exposure Function
NF Network Function
NGAP Next Generation Application Protocol
NR New Radio
NRF Network Repository Function
NSI Network Slice Instance
NSSAI Network Slice Selection Assistance Information
NSSF Network Slice Selection Function
OCS Online Charging System
OFCS Offline Charging System
PCF Policy Control Function
PDU Packet/Protocol Data Unit
PEI Permanent Equipment Identifier
PLMN Public Land Mobile Network
RAN Radio Access Network
QFI QoS Flow Identity
RM Registration Management
S1-AP S1 Application Protocol
SBA Service Based Architecture
SEA Security Anchor Function
SCM Security Context Management
SMF Session Management Function
SMSF SMS Function
S-NSSAI Single Network Slice Selection Assistance information
SUCI Served User Correlation ID
SUPI Subscriber Permanent Identifier
TEID Tunnel Endpoint Identifier
TFCP Traffic Flow Control Protocol
UE User Equipment
UL Uplink
UL CL Uplink Classifier
UPF User Plane Function Example FIG. 1 and FIG. 2 depict a 5G system comprising of access networks and 5G core network. An example 5G access network may comprise an access network connecting to a 5G core network. An access network may comprise an NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces may be employed for communication among the functional elements and/or network elements.

Figure 3:
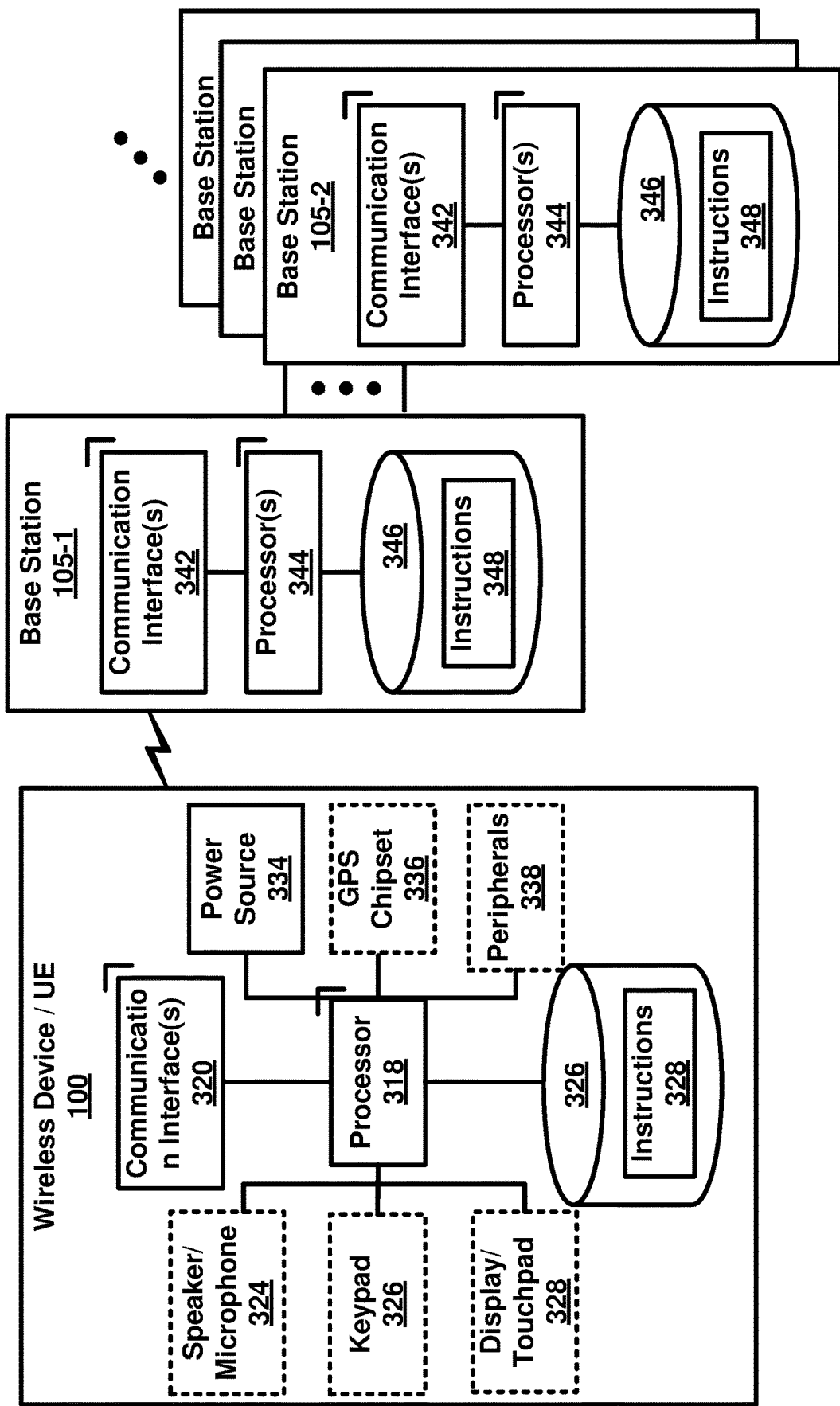
FIG. 3 is a system diagram of an example wireless device and a network node in a 5G system as per an aspect of an embodiment of the present disclosure.
Figure 4:
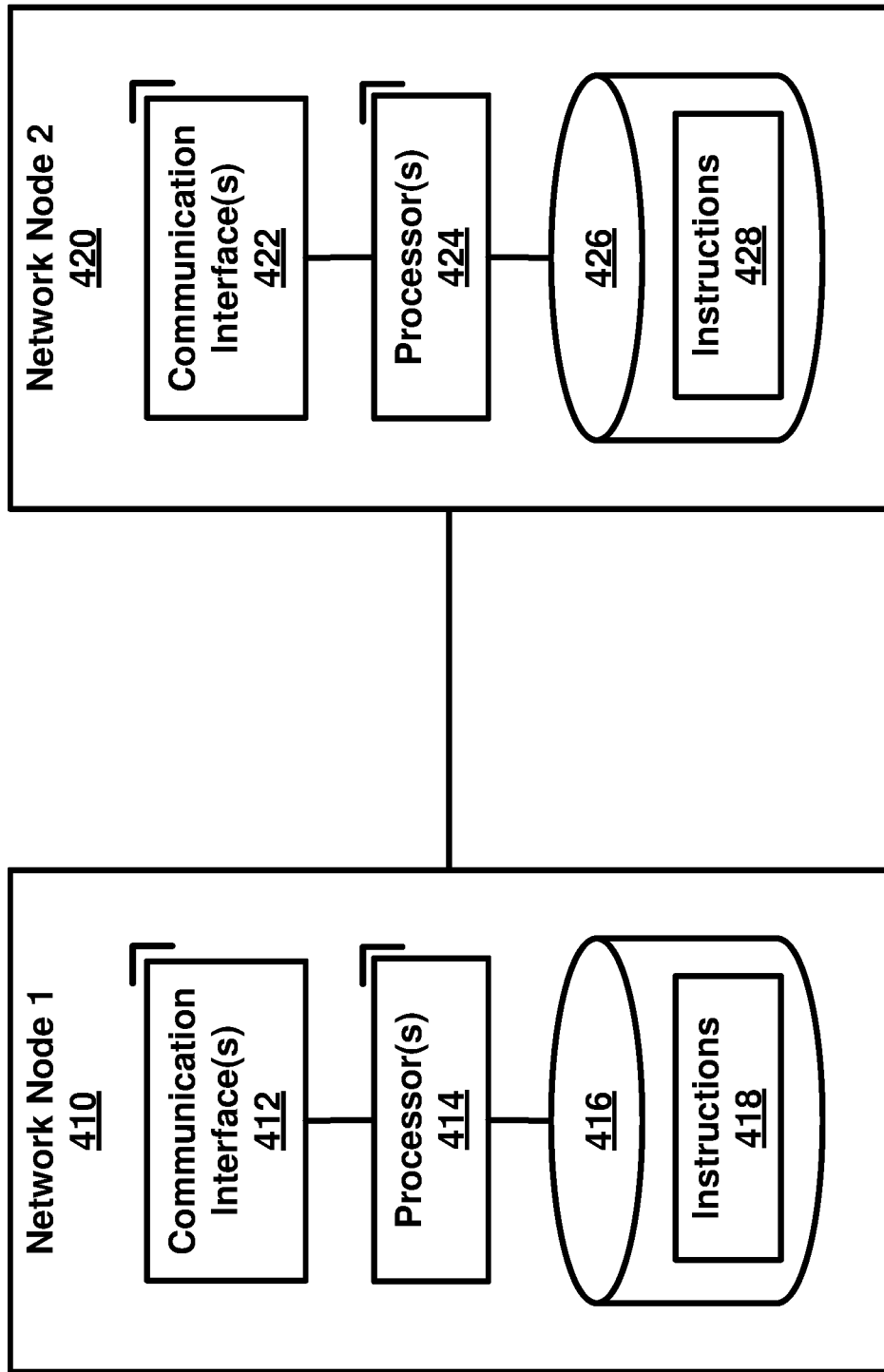
FIG. 4 is a system diagram of an example wireless device as per an aspect of an embodiment of the present disclosure.

In an example, a network function may be a processing function in a network, which may have a functional behavior and/or interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

In an example, access and mobility management function, AMF 155, may include the following functionalities (some of the AMF 155 functionalities may be supported in a single instance of an AMF 155): termination of RAN 105 CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys, and/or the like.

In an example, the AMF 155 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP access 105 and non-3GPP access 165 simultaneously, support of a coordinated RM context valid over 3GPP access 105 and non 3GPP access 165, support of CM management contexts for the UE 100 for connectivity over non-3GPP access, and/or the like.

In an example, an AMF 155 region may comprise one or multiple AMF 155 sets. The AMF 155 set may comprise some AMF 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that may be provisioned in a UE 100. DN 115 access identifier (DNAI), for a DNN, may be an identifier of a user plane access to a DN 115. Initial registration may be related to a UE 100 registration in RM-DEREGISTERED 500, 520 states. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

In an example, session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115, and/or the like.

In an example, a user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, downlink data notification triggering, and/or the like.

In an example, the UE 100 IP address management may include allocation and release of the UE 100 IP address and/or renewal of the allocated IP address. The UE 100 may set a requested PDU type during a PDU session establishment procedure based on its IP stack capabilities and/or configuration. In an example, the SMF 160 may select PDU type of a PDU session. In an example, if the SMF 160 receives a request with PDU type set to IP, the SMF 160 may select PDU type IPv4 or IPv6 based on DNN configuration and/or operator policies. In an example, the SMF 160 may provide a cause value to the UE 100 to indicate whether the other IP version is supported on the DNN. In an example, if the SMF 160 receives a request for PDU type IPv4 or IPv6 and the requested IP version is supported by the DNN the SMF 160 may select the requested PDU type.

In an example embodiment, the 5GC elements and UE 100 may support the following mechanisms: during a PDU session establishment procedure, the SMF 160 may send the IP address to the UE 100 via SM NAS signaling. The IPv4 address allocation and/or IPv4 parameter configuration via DHCPv4 may be employed once PDU session may be established. IPv6 prefix allocation may be supported via IPv6 stateless autoconfiguration, if IPv6 is supported. In an example, 5GC network elements may support IPv6 parameter configuration via stateless DHCPv6.

The 5GC may support the allocation of a static IPv4 address and/or a static IPv6 prefix based on subscription information in a UDM 140 and/or based on the configuration on a per-subscriber, per-DNN basis.

User plane function(s) (UPF 110) may handle the user plane path of PDU sessions. A UPF 110 that provides the interface to a data network may support functionality of a PDU session anchor.

In an example, a policy control function, PCF 135, may support unified policy framework to govern network behavior, provide policy rules to control plane function(s) to enforce policy rules, implement a front end to access subscription information relevant for policy decisions in a user data repository (UDR), and/or the like.

A network exposure function, NEF 125, may provide means to securely expose the services and capabilities provided by the 3GPP network functions, translate between information exchanged with the AF 145 and information exchanged with the internal network functions, receive information from other network functions, and/or the like.

In an example, a network repository function, NRF 130 may support service discovery function that may receive NF discovery request from NF instance, provide information about the discovered NF instances (be discovered) to the NF instance, and maintain information about available NF instances and their supported services, and/or the like.

In an example, an NSSF 120 may select a set of network slice instances serving the UE 100, may determine allowed NSSAI. In an example, the NSSF 120 may determine the AMF 155 set to be employed to serve the UE 100, and/or, based on configuration, determine a list of candidate AMF 155(s) 155 by querying the NRF 130.

In an example, stored data in a UDR may include at least user subscription data, including at least subscription identifiers, security credentials, access and mobility related subscription data, session related subscription data, policy data, and/or the like.

In an example, an AUSF 150 may support authentication server function (AUSF 150).

In an example, an application function, AF 145, may interact with the 3GPP core network to provide services. In an example, based on operator deployment, application functions may be trusted by the operator to interact directly with relevant network functions. Application functions not allowed by the operator to access directly the network functions may use an external exposure framework (e.g., via the NEF 125) to interact with relevant network functions.

In an example, control plane interface between the (R)AN 105 and the 5G core may support connection of multiple different kinds of AN(s) (e.g. 3GPP RAN 105, N3IWF 170 for Un-trusted access 165) to the 5GC via a control plane protocol. In an example, an N2 AP protocol may be employed for both the 3GPP access 105 and non-3GPP access 165. In an example, control plane interface between the (R)AN 105 and the 5G core may support decoupling between AMF 155 and other functions such as SMF 160 that may need to control the services supported by AN(s) (e.g. control of the UP resources in the AN 105 for a PDU session).

In an example, the 5GC may provide policy information from the PCF 135 to the UE 100. In an example, the policy information may comprise: access network discovery and selection policy, UE 100 route selection policy (URSP), SSC mode selection policy (SSCMSP), network slice selection policy (NSSP), DNN selection policy, non-seamless offload policy, and/or the like.

In an example, as depicted in example FIG. 5A and FIG. 5B, the registration management, RM may be employed to register or de-register a UE/user 100 with the network, and establish the user context in the network. Connection management may be employed to establish and release the signaling connection between the UE 100 and the AMF 155.

In an example, a UE 100 may register with the network to receive services that require registration. In an example, the UE 100 may update its registration with the network periodically in order to remain reachable (periodic registration update), or upon mobility (e.g., mobility registration update), or to update its capabilities or to re-negotiate protocol parameters.

Figure 8:
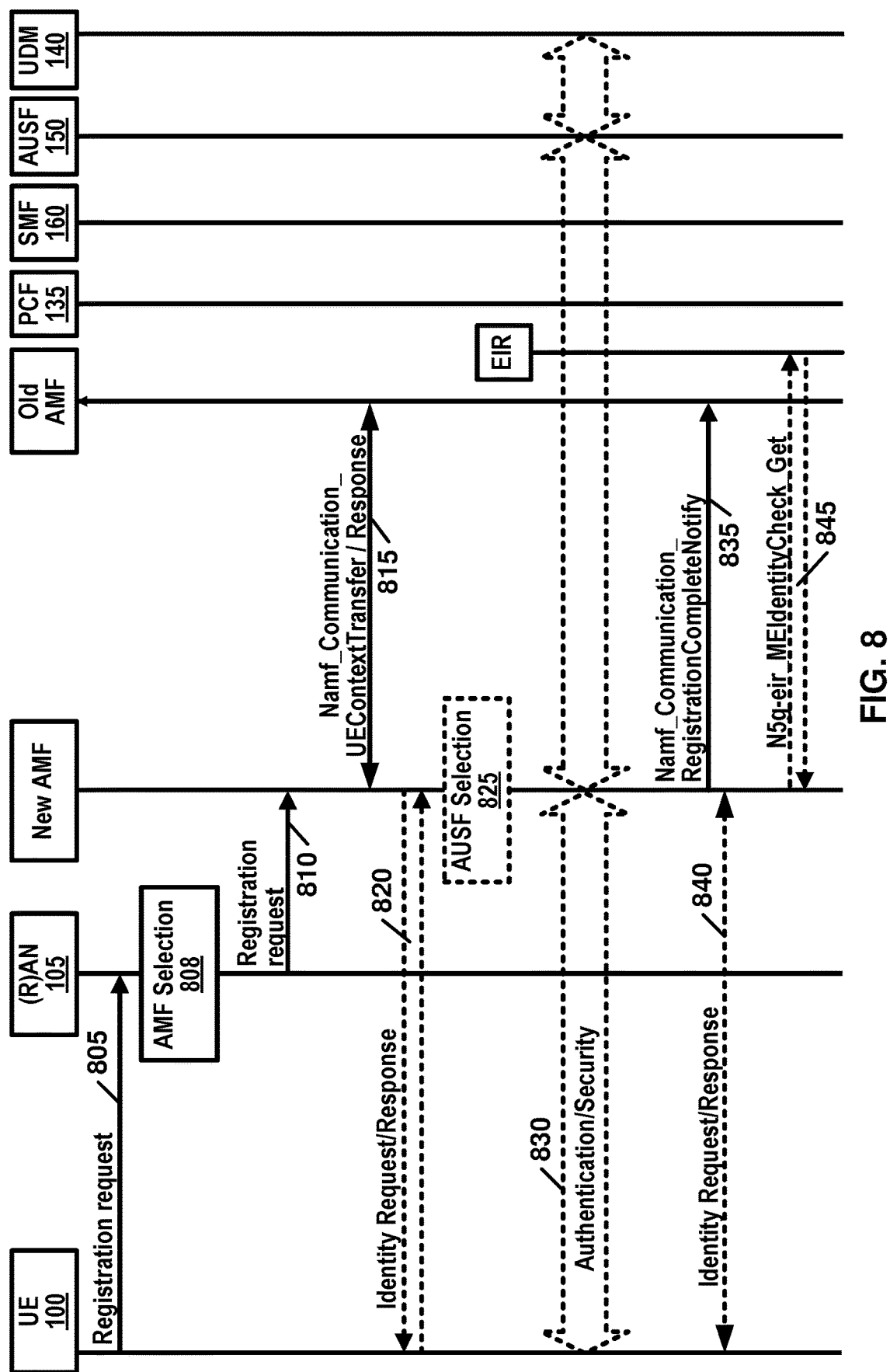
FIG. 8 is an example call flow as per an aspect of an embodiment of the present disclosure.
Figure 9:
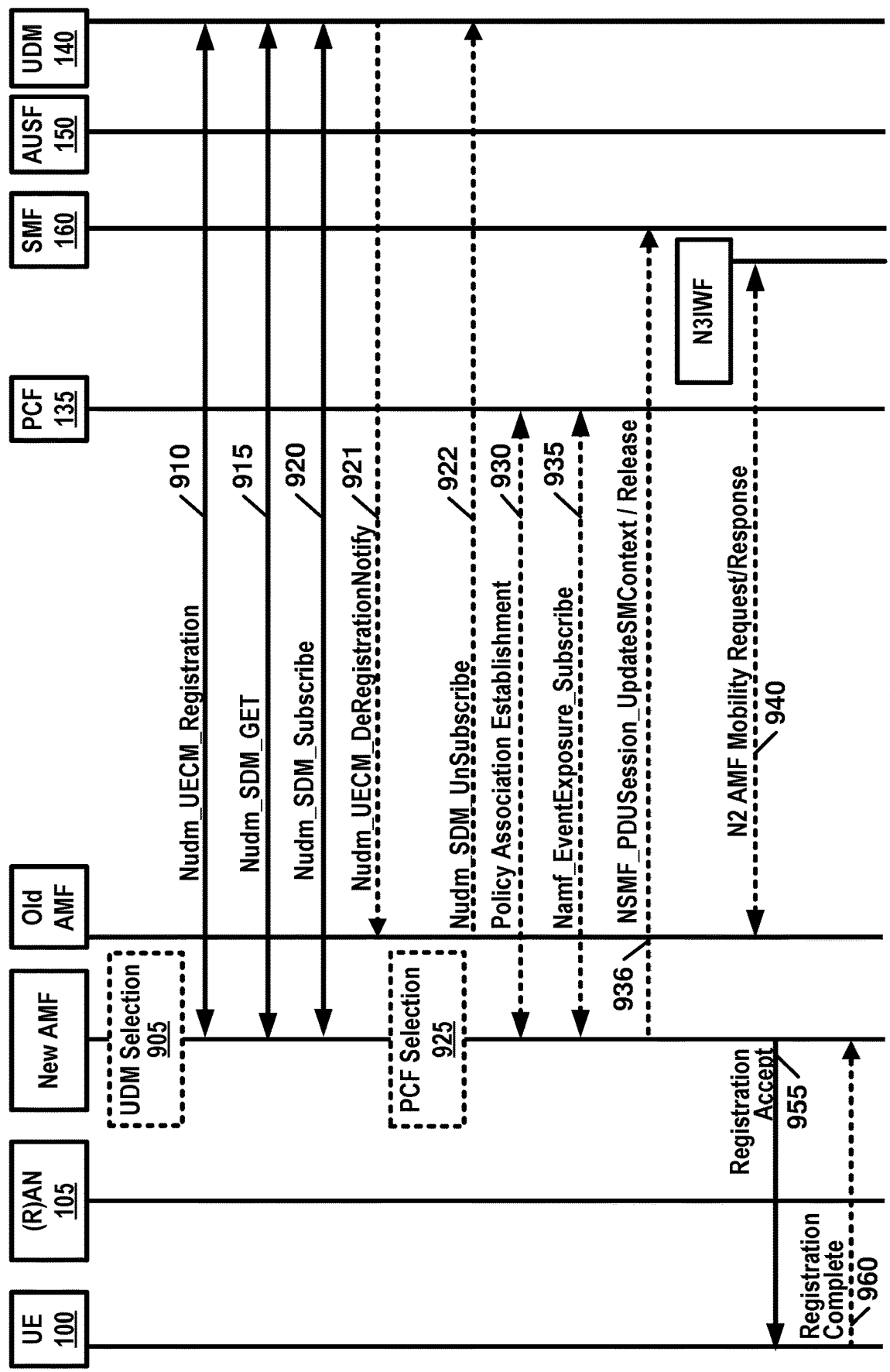
FIG. 9 is an example call flow as per an aspect of an embodiment of the present disclosure.

In an example, an initial registration procedure as depicted in example FIG. 8 and FIG. 9 may involve execution of network access control functions (e.g. user authentication and access authorization based on subscription profiles in UDM 140). Example FIG. 9 is a continuation of the initial registration procedure depicted in FIG. 8. As a result of the initial registration procedure, the identity of the serving AMF 155 may be registered in a UDM 140.

In an example, the registration management, RM procedures may be applicable over both 3GPP access 105 and non 3GPP access 165.

An example FIG. 5A may depict the RM states of a UE 100 as observed by the UE 100 and AMF 155. In an example embodiment, two RM states may be employed in the UE 100 and the AMF 155 that may reflect the registration status of the UE 100 in the selected PLMN: RM-DEREGISTERED 500, and RM-REGISTERED 510. In an example, in the RM DEREGISTERED state 500, the UE 100 may not be registered with the network. The UE 100 context in the AMF 155 may not hold valid location or routing information for the UE 100 so the UE 100 may not be reachable by the AMF 155. In an example, the UE 100 context may be stored in the UE 100 and the AMF 155. In an example, in the RM REGISTERED state 510, the UE 100 may be registered with the network. In the RM-REGISTERED 510 state, the UE 100 may receive services that may require registration with the network.

In an example embodiment, two RM states may be employed in AMF 155 for the UE 100 that may reflect the registration status of the UE 100 in the selected PLMN: RM-DEREGISTERED 520, and RM-REGISTERED 530.

As depicted in example FIG. 6A and FIG. 6B, connection management, CM, may comprise establishing and releasing a signaling connection between a UE 100 and an AMF 155 over N1 interface. The signaling connection may be employed to enable NAS signaling exchange between the UE 100 and the core network. The signaling connection between the UE 100 and the AMF 155 may comprise both the AN signaling connection between the UE 100 and the (R)AN 105 (e.g. RRC connection over 3GPP access) and the N2 connection for the UE 100 between the AN and the AMF 155.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state may be in RM-REGISTERED 510 state and may have no NAS signaling connection established with the AMF 155 over N1. The UE 100 may perform cell selection, cell reselection, PLMN selection, and/or the like. A UE 100 in CM-CONNECTED 610 state may have a NAS signaling connection with the AMF 155 over N1.

In an example embodiment two CM states may be employed for the UE 100 at the AMF 155, CM-IDLE 620 and CM-CONNECTED 630.

In an example, an RRC inactive state may apply to NG-RAN (e.g. it may apply to NR and E-UTRA connected to 5G CN). The AMF 155, based on network configuration, may provide assistance information to the NG RAN 105, to assist the NG RAN's 105 decision whether the UE 100 may be sent to RRC inactive state. When a UE 100 is CM-CONNECTED 610 with RRC inactive state, the UE 100 may resume the RRC connection due to uplink data pending, mobile initiated signaling procedure, as a response to RAN 105 paging, to notify the network that it has left the RAN 105 notification area, and/or the like.

In an example, a NAS signaling connection management may include establishing and releasing a NAS signaling connection. A NAS signaling connection establishment function may be provided by the UE 100 and the AMF 155 to establish the NAS signaling connection for the UE 100 in CM-IDLE 600 state. The procedure of releasing the NAS signaling connection may be initiated by the 5G (R)AN 105 node or the AMF 155.

In an example, reachability management of a UE 100 may detect whether the UE 100 is reachable and may provide the UE 100 location (e.g. access node) to the network to reach the UE 100. Reachability management may be done by paging the UE 100 and the UE 100 location tracking. The UE 100 location tracking may include both UE 100 registration area tracking and UE 100 reachability tracking. The UE 100 and the AMF 155 may negotiate UE 100 reachability characteristics in CM-IDLE 600, 620 state during registration and registration update procedures.

In an example, two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between the UE 100 and a data network identified by a DNN. The PDU connectivity service may be supported via PDU sessions that are established upon request from the UE 100.

In an example, a PDU session may support one or more PDU session types. PDU sessions may be established (e.g. upon UE 100 request), modified (e.g. upon UE 100 and 5GC request) and/or released (e.g. upon UE 100 and 5GC request) using NAS SM signaling exchanged over N1 between the UE 100 and the SMF 160. Upon request from an application server, the 5GC may be able to trigger a specific application in the UE 100. When receiving the trigger, the UE 100 may send it to the identified application in the UE 100. The identified application in the UE 100 may establish a PDU session to a specific DNN.

Figure 7:
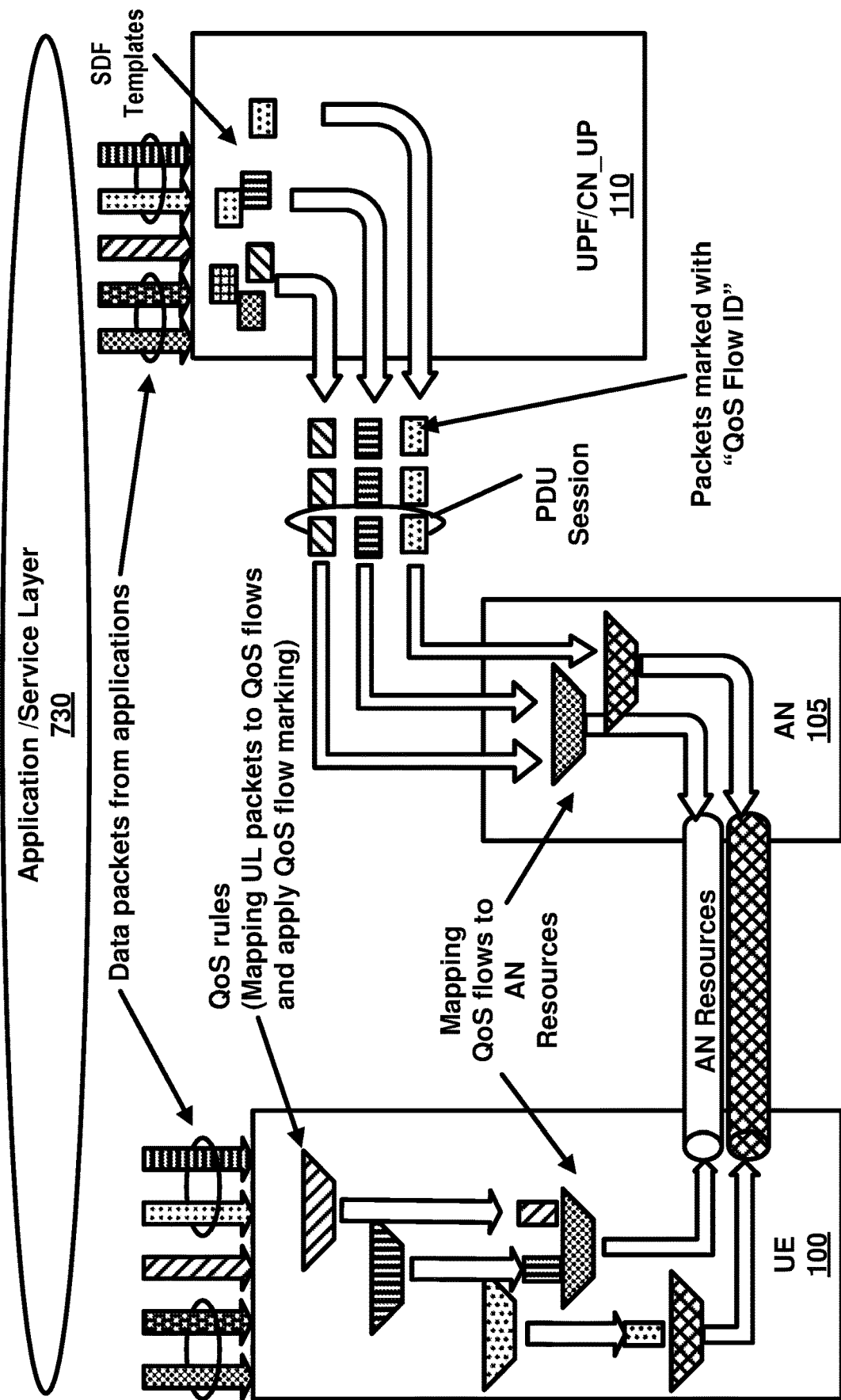
FIG. 7 is diagram for classification and marking traffic as per an aspect of an embodiment of the present disclosure.

In an example, the 5G QoS model may support a QoS flow based framework as depicted in example FIG. 7. The 5G QoS model may support both QoS flows that require a guaranteed flow bit rate and QoS flows that may not require a guaranteed flow bit rate. In an example, the 5G QoS model may support reflective QoS. The QoS model may comprise flow mapping or packet marking at the UPF 110 (CN_UP) 110, AN 105 and/or the UE 100. In an example, packets may arrive from and/or destined to the application/service layer 730 of UE 100, UPF 110 (CN_UP) 110, and/or the AF 145.

In an example, the QoS flow may be a granularity of QoS differentiation in a PDU session. A QoS flow ID, QFI, may be employed to identify the QoS flow in the 5G system. In an example, user plane traffic with the same QFI within a PDU session may receive the same traffic forwarding treatment. The QFI may be carried in an encapsulation header on N3 and/or N9 (e.g. without any changes to the end-to-end packet header). In an example, the QFI may be applied to PDUs with different types of payload. The QFI may be unique within a PDU session.

In an example, the QoS parameters of a QoS flow may be provided to the (R)AN 105 as a QoS profile over N2 at PDU session establishment, QoS flow establishment, or when NG-RAN is used at every time the user plane is activated. In an example, a default QoS rule may be required for every PDU session. The SMF 160 may allocate the QFI for a QoS flow and may derive QoS parameters from the information provided by the PCF 135. In an example, the SMF 160 may provide the QFI together with the QoS profile containing the QoS parameters of a QoS flow to the (R)AN 105.

In an example, 5G QoS flow may be a granularity for QoS forwarding treatment in the 5G system. Traffic mapped to the same 5G QoS flow may receive the same forwarding treatment (e.g. scheduling policy, queue management policy, rate shaping policy, RLC configuration, and/or the like). In an example, providing different QoS forwarding treatment may require separate 5G QoS flows.

In an example, a 5G QoS indicator may be a scalar that may be employed as a reference to a specific QoS forwarding behavior (e.g. packet loss rate, packet delay budget) to be provided to a 5G QoS flow. In an example, the 5G QoS indicator may be implemented in the access network by the 5QI referencing node specific parameters that may control the QoS forwarding treatment (e.g. scheduling weights, admission thresholds, queue management thresholds, link layer protocol configuration, and/or the like).

In an example, 5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. In an example, the selection and traffic steering may be based on the UE's 100 subscription data, UE 100 location, the information from application function AF 145, policy, other related traffic rules, and/or the like. In an example, the 5G core network may expose network information and capabilities to an edge computing application function. The functionality support for edge computing may include local routing where the 5G core network may select a UPF 110 to route the user traffic to the local data network, traffic steering where the 5G core network may select the traffic to be routed to the applications in the local data network, session and service continuity to enable UE 100 and application mobility, user plane selection and reselection, e.g. based on input from application function, network capability exposure where 5G core network and application function may provide information to each other via NEf 125, QoS and charging where PCF 135 may provide rules for QoS control and charging for the traffic routed to the local data network, support of local area data network where 5G core network may provide support to connect to the LADN in a certain area where the applications are deployed, and/or the like.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

In an example, a PDU connectivity service may provide exchange of PDUs between a UE 100 and a data network. A PDU session may be an association between the UE 100 and the data network, DN 115, that may provide the PDU connectivity service. The type of association may be IP, Ethernet and/or unstructured.

Establishment of user plane connectivity to a data network via network slice instance(s) may comprise the following: performing a RM procedure to select an AMF 155 that supports the required network slices, and establishing one or more PDU session(s) to the required data network via the network slice instance(s).

In an example, the set of network slices for a UE 100 may be changed at any time while the UE 100 may be registered with the network, and may be initiated by the network, or the UE 100.

In an example, a periodic registration update may be UE 100 re-registration at expiry of a periodic registration timer. A requested NSSAI may be a NSSAI that the UE 100 may provide to the network.

In an example, a service based interface may represent how a set of services may be provided/exposed by a given NF.

In an example, a service continuity may be an uninterrupted user experience of a service, including the cases where the IP address and/or anchoring point may change. In an example, a session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by the SMF 160, towards data network, DN 115.

In an example, the 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

In an example, the 5G system may reduce dependencies between the access network (AN) and the core network (CN). The architecture may comprise a converged access-agnostic core network with a common AN-CN interface which may integrate different 3GPP and non-3GPP access types.

In an example, the 5G system may support a unified authentication framework, stateless NFs, where the compute resource is decoupled from the storage resource, capability exposure, and concurrent access to local and centralized services. To support low latency services and access to local data networks, UP functions may be deployed close to the access network.

In an example, the 5G system may support roaming with home routed traffic and/or local breakout traffic in the visited PLMN. An example 5G architecture may be service-based and the interaction between network functions may be represented in two ways. (1) As service-based representation (depicted in example FIG. 1), where network functions within the control plane, may enable other authorized network functions to access their services. This representation may also include point-to-point reference points where necessary. (2) Reference point representation, showing the interaction between the NF services in the network functions described by point-to-point reference point (e.g. N11) between any two network functions.

In an example, a network slice may comprise the core network control plane and user plane network functions, the 5G Radio Access Network; the N3IWF functions to the non-3GPP Access Network; and/or the like. Network slices may differ for supported features and network function implementation. The operator may deploy multiple network slice instances delivering the same features but for different groups of UEs, e.g. as they deliver a different committed service and/or because they may be dedicated to a customer. The NSSF 120 may store the mapping information between slice instance ID and NF ID (or NF address).

In an example, a UE 100 may simultaneously be served by one or more network slice instances via a 5G-AN. In an example, the UE 100 may be served by k network slices (e.g. k=8, 16, etc.) at a time. An AMF 155 instance serving the UE 100 logically may belong to a network slice instance serving the UE 100.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a network slice. An S-NSSAI may comprise a slice/service type (SST), which may refer to the expected network slice behavior in terms of features and services; and/or a slice differentiator (SD). A slice differentiator may be optional information that may complement the slice/service type(s) to allow further differentiation for selecting a network slice instance from potentially multiple network slice instances that comply with the indicated slice/service type. In an example, the same network slice instance may be selected employing different S-NSSAIs. The CN part of a network slice instance(s) serving a UE 100 may be selected by CN.

In an example, subscription data may include the S-NS-SAI(s) of the network slices that the UE 100 subscribes to. One or more S-NSSAIs may be marked as default S-NSSAI. In an example, k S-NSSAI may be marked default S-NSSAI (e.g. k=8, 16, etc.). In an example, the UE 100 may subscribe to more than 8 S-NSSAIs.

In an example, a UE 100 may be configured by the HPLMN with a configured NSSAI per PLMN. Upon successful completion of a UE's registration procedure, the UE 100 may obtain from the AMF 155 an Allowed NSSAI for this PLMN, which may include one or more S-NSSAIs.

In an example, the Allowed NSSAI may take precedence over the configured NSSAI for a PLMN. The UE 100 may use the S-NSSAIs in the allowed NSSAI corresponding to a network slice for the subsequent network slice selection related procedures in the serving PLMN.

In an example, the establishment of user plane connectivity to a data network via a network slice instance(s) may comprise: performing a RM procedure to select an AMF 155 that may support the required network slices, establishing one or more PDU sessions to the required data network via the network slice instance(s), and/or the like.

In an example, when a UE 100 registers with a PLMN, if the UE 100 for the PLMN has a configured NSSAI or an allowed NSSAI, the UE 100 may provide to the network in RRC and NAS layer a requested NSSAI comprising the S-NSSAI(s) corresponding to the slice(s) to which the UE 100 attempts to register, a temporary user ID if one was assigned to the UE, and/or the like. The requested NSSAI may be configured-NSSAI, allowed-NSSAI, and/or the like.

In an example, when a UE 100 registers with a PLMN, if for the PLMN the UE 100 has no configured NSSAI or allowed NSSAI, the RAN 105 may route NAS signaling from/to the UE 100 to/from a default AMF 155.

In an example, the network, based on local policies, subscription changes and/or UE 100 mobility, may change the set of permitted network slice(s) to which the UE 100 is registered. In an example, the network may perform the change during a registration procedure or trigger a notification towards the UE 100 of the change of the supported network slices using an RM procedure (which may trigger a registration procedure). The network may provide the UE 100 with a new allowed NSSAI and tracking area list.

In an example, during a registration procedure in a PLMN, in case the network decides that the UE 100 should be served by a different AMF 155 based on network slice(s) aspects, the AMF 155 that first received the registration request may redirect the registration request to another AMF 155 via the RAN 105 or via direct signaling between the initial AMF 155 and the target AMF 155.

In an example, the network operator may provision the UE 100 with network slice selection policy (NSSP). The NSSP may comprise one or more NSSP rules.

In an example, if a UE 100 has one or more PDU sessions established corresponding to a specific S-NSSAI, the UE 100 may route the user data of the application in one of the PDU sessions, unless other conditions in the UE 100 may prohibit the use of the PDU sessions. If the application provides a DNN, then the UE 100 may consider the DNN to determine which PDU session to use. In an example, if the UE 100 does not have a PDU session established with the specific S-NSSAI, the UE 100 may request a new PDU session corresponding to the S-NSSAI and with the DNN that may be provided by the application. In an example, in order for the RAN 105 to select a proper resource for supporting network slicing in the RAN 105, the RAN 105 may be aware of the network slices used by the UE 100.

In an example, an AMF 155 may select an SMF 160 in a network slice instance based on S-NSSAI, DNN and/or other information e.g. UE 100 subscription and local operator policies, and/or the like, when the UE 100 triggers the establishment of a PDU session. The selected SMF 160 may establish the PDU session based on S-NSSAI and DNN.

In an example, in order to support network-controlled privacy of slice information for the slices the UE 100 may access, when the UE 100 is aware or configured that privacy considerations may apply to NSSAI, the UE 100 may not include NSSAI in NAS signaling unless the UE 100 has a NAS security context and the UE 100 may not include NSSAI in unprotected RRC signaling.

In an example, for roaming scenarios, the network slice specific network functions in VPLMN and HPLMN may be selected based on the S-NSSAI provided by the UE 100 during PDU connection establishment. If a standardized S-NSSAI is used, selection of slice specific NF instances may be done by each PLMN based on the provided S-NSSAI. In an example, the VPLMN may map the S-NSSAI of HPLMN to a S-NSSAI of VPLMN based on roaming agreement (e.g., including mapping to a default S-NSSAI of VPLMN). In an example, the selection of slice specific NF instance in VPLMN may be done based on the S-NSSAI of VPLMN. In an example, the selection of any slice specific NF instance in HPLMN may be based on the S-NSSAI of HPLMN.

As depicted in example FIG. 8 and FIG. 9, a registration procedure may be performed by the UE 100 to get authorized to receive services, to enable mobility tracking, to enable reachability, and/or the like.

In an example, the UE 100 may send to the (R)AN 105 an AN message 805 (comprising AN parameters, RM-NAS registration request (registration type, SUCI or SUPI or 5G-GUTI, last visited TAI (if available), security parameters, requested NSSAI, mapping of requested NSSAI, UE 100 5GC capability, PDU session status, PDU session(s) to be re-activated, Follow on request, MICO mode preference, and/or the like), and/or the like). In an example, in case of NG-RAN, the AN parameters may include e.g. SUCI or SUPI or the 5G-GUTI, the Selected PLMN ID and requested NSSAI, and/or the like. In an example, the AN parameters may comprise establishment cause. The establishment cause may provide the reason for requesting the establishment of an RRC connection. In an example, the registration type may indicate if the UE 100 wants to perform an initial registration (i.e. the UE 100 is in RM-DEREGISTERED state), a mobility registration update (e.g., the UE 100 is in RM-REGISTERED state and initiates a registration procedure due to mobility), a periodic registration update (e.g., the UE 100 is in RM-REGISTERED state and may initiate a registration procedure due to the periodic registration update timer expiry) or an emergency registration (e.g., the UE 100 is in limited service state). In an example, if the UE 100 performing an initial registration (i.e., the UE 100 is in RM-DEREGISTERED state) to a PLMN for which the UE 100 does not already have a 5G-GUTI, the UE 100 may include its SUCI or SUPI in the registration request. The SUCI may be included if the home network has provisioned the public key to protect SUPI in the UE. If the UE 100 received a UE 100 configuration update command indicating that the UE 100 needs to re-register and the 5G-GUTI is invalid, the UE 100 may perform an initial registration and may include the SUPI in the registration request message. For an emergency registration, the SUPI may be included if the UE 100 does not have a valid 5G-GUTI available; the PEI may be included when the UE 100 has no SUPI and no valid 5G-GUTI. In other cases, the 5G-GUTI may be included and it may indicate the last serving AMF 155. If the UE 100 is already registered via a non-3GPP access in a PLMN different from the new PLMN (e.g., not the registered PLMN or an equivalent PLMN of the registered PLMN) of the 3GPP access, the UE 100 may not provide over the 3GPP access the 5G-GUTI allocated by the AMF 155 during the registration procedure over the non-3GPP access. If the UE 100 is already registered via a 3GPP access in a PLMN (e.g., the registered PLMN), different from the new PLMN (i.e. not the registered PLMN or an equivalent PLMN of the registered PLMN) of the non-3GPP access, the UE 100 may not provide over the non-3GPP access the 5G-GUTI allocated by the AMF 155 during the registration procedure over the 3GPP access. The UE 100 may provide the UE's usage setting based on its configuration. In case of initial registration or mobility registration update, the UE 100 may include the mapping of requested NSSAI, which may be the mapping of each S-NSSAI of the requested NSSAI to the S-NSSAIs of the configured NSSAI for the HPLMN, to ensure that the network is able to verify whether the S-NSSAI(s) in the requested NSSAI are permitted based on the subscribed S-NSSAIs. If available, the last visited TAI may be included in order to help the AMF 155 produce registration area for the UE. In an example, the security parameters may be used for authentication and integrity protection. requested NSSAI may indicate the network slice selection assistance information. The PDU session status may indicates the previously established PDU sessions in the UE. When the UE 100 is connected to the two AMF 155 belonging to different PLMN via 3GPP access and non-3GPP access then the PDU session status may indicate the established PDU session of the current PLMN in the UE. The PDU session(s) to be re-activated may be included to indicate the PDU session(s) for which the UE 100 may intend to activate UP connections. A PDU session corresponding to a LADN may not be included in the PDU session(s) to be re-activated when the UE 100 is outside the area of availability of the LADN. The follow on request may be included when the UE 100 may have pending uplink signaling and the UE 100 may not include PDU session(s) to be re-activated, or the registration type may indicate the UE 100 may want to perform an emergency registration.

In an example, if a SUPI is included or the 5G-GUTI does not indicate a valid AMF 155, the (R)AN 105, based on (R)AT and requested NSSAI, if available, may selects 808 an AMF 155. If UE 100 is in CM-CONNECTED state, the (R)AN 105 may forward the registration request message to the AMF 155 based on the N2 connection of the UE. If the (R)AN 105 may not select an appropriate AMF 155, it may forward the registration request to an AMF 155 which has been configured, in (R)AN 105, to perform AMF 155 selection 808.

In an example, the (R)AN 105 may send to the new AMF 155 an N2 message 810 (comprising: N2 parameters, RM-NAS registration request (registration type, SUPI or 5G-GUTI, last visited TAI (if available), security param-eters, requested NSSAI, mapping of requested NSSAI, UE 100 5GC capability, PDU session status, PDU session(s) to be re-activated, follow on request, and MICO mode preference), and/or the like). In an example, when NG-RAN is used, the N2 parameters may comprise the selected PLMN ID, location information, cell identity and the RAT type related to the cell in which the UE 100 is camping. In an example, when NG-RAN is used, the N2 parameters may include the establishment cause.

In an example, the new AMF 155 may send to the old AMF 155 a Namf_Communication_UEContextTransfer (complete registration request) 815. In an example, if the UE's 5G-GUTI was included in the registration request and the serving AMF 155 has changed since last registration procedure, the new AMF 155 may invoke the Namf_Communication_UEContextTransfer service operation 815 on the old AMF 155 including the complete registration request IE, which may be integrity protected, to request the UE's SUPI and MM Context. The old AMF 155 may use the integrity protected complete registration request IE to verify if the context transfer service operation invocation corresponds to the UE 100 requested. In an example, the old AMF 155 may transfer the event subscriptions information by each NF consumer, for the UE, to the new AMF 155. In an example, if the UE 100 identifies itself with PEI, the SUPI request may be skipped.

In an example, the old AMF 155 may send to new AMF 155 a response 815 to Namf_Communication_UEContext-Transfer (SUPI, MM context, SMF 160 information, PCF ID). In an example, the old AMF 155 may respond to the new AMF 155 for the Namf_Communication_UEContext-Transfer invocation by including the UE's SUPI and MM context. In an example, if old AMF 155 holds information about established PDU sessions, the old AMF 155 may include SMF 160 information including S-NSSAI(s), SMF 160 identities and PDU session ID. In an example, if old AMF 155 holds information about active NGAP UE-TNLA bindings to N3IWF, the old AMF 155 may include information about the NGAP UE-TNLA bindings.

In an example, if the SUPI is not provided by the UE 100 nor retrieved from the old AMF 155 the identity request procedure 820 may be initiated by the AMF 155 sending an identity request message to the UE 100 requesting the SUCI.

In an example, the UE 100 may respond with an identity response message 820 including the SUCI. The UE 100 may derive the SUCI by using the provisioned public key of the HPLMN.

In an example, the AMF 155 may decide to initiate UE 100 authentication 825 by invoking an AUSF 150. The AMF 155 may select an AUSF 150 based on SUPI or SUCI. In an example, if the AMF 155 is configured to support emergency registration for unauthenticated SUPIs and the UE 100 indicated registration type emergency registration the AMF 155 may skip the authentication and security setup or the AMF 155 may accept that the authentication may fail and may continue the registration procedure.

In an example, the authentication 830 may be performed by Nudm_UEAuthenticate_Get operation. The AUSF 150 may discover a UDM 140. In case the AMF 155 provided a SUCI to AUSF 150, the AUSF 150 may return the SUPI to AMF 155 after the authentication is successful. In an example, if network slicing is used, the AMF 155 may decide if the registration request needs to be rerouted where the initial AMF 155 refers to the AMF 155. In an example, the AMF 155 may initiate NAS security functions. In an example, upon completion of NAS security function setup, the AMF 155 may initiate NGAP procedure to enable 5G-AN use it for securing procedures with the UE. In an example, the 5G-AN may store the security context and may acknowledge to the AMF 155. The 5G-AN may use the security context to protect the messages exchanged with the UE.

In an example, new AMF 155 may send to the old AMF 155 Namf_Communication_RegistrationCompleteNotify 835. If the AMF 155 has changed, the new AMF 155 may notify the old AMF 155 that the registration of the UE 100 in the new AMF 155 may be completed by invoking the Namf_Communication_RegistrationCompleteNotify service operation. If the authentication/security procedure fails, then the registration may be rejected, and the new AMF 155 may invoke the Namf_Communication_RegistrationCompleteNotify service operation with a reject indication reason code towards the old AMF 155. The old AMF 155 may continue as if the UE 100 context transfer service operation was never received. If one or more of the S-NSSAIs used in the old registration area may not be served in the target registration area, the new AMF 155 may determine which PDU session may not be supported in the new registration area. The new AMF 155 may invoke the Namf_Communication_RegistrationCompleteNotify service operation including the rejected PDU session ID and a reject cause (e.g. the S-NSSAI becomes no longer available) towards the old AMF 155. The new AMF 155 may modify the PDU session status correspondingly. The old AMF 155 may inform the corresponding SMF 160(s) to locally release the UE's SM context by invoking the Nsmf_PDUSession_ReleaseSMContext service operation.

In an example, the new AMF 155 may send to the UE 100 an identity request/response 840 (e.g., PEI). If the PEI was not provided by the UE 100 nor retrieved from the old AMF 155, the identity request procedure may be initiated by AMF 155 sending an identity request message to the UE 100 to retrieve the PEI. The PEI may be transferred encrypted unless the UE 100 performs emergency registration and may not be authenticated. For an emergency registration, the UE 100 may have included the PEI in the registration request.

In an example, the new AMF 155 may initiate ME identity check 845 by invoking the N5g-eir_EquipmentIdentityCheck_Get service operation 845.

In an example, the new AMF 155, based on the SUPI, may select 905 a UDM 140. The UDM 140 may select a UDR instance. In an example, the AMF 155 may select a UDM 140.

In an example, if the AMF 155 has changed since the last registration procedure, or if the UE 100 provides a SUPI which may not refer to a valid context in the AMF 155, or if the UE 100 registers to the same AMF 155 it has already registered to a non-3GPP access (e.g., the UE 100 is registered over a non-3GPP access and may initiate the registration procedure to add a 3GPP access), the new AMF 155 may register with the UDM 140 using Nudm_UECM_Registration 910 and may subscribe to be notified when the UDM 140 may deregister the AMF 155. The UDM 140 may store the AMF 155 identity associated to the access type and may not remove the AMF 155 identity associated to the other access type. The UDM 140 may store information provided at registration in UDR, by Nudr_UDM_Update. In an example, the AMF 155 may retrieve the access and mobility subscription data and SMF 160 selection subscription data using Nudm_SDM_Get 915. The UDM 140 may retrieve this information from UDR by Nudr_UDM_Query (access and mobility subscription data). After a successful response is received, the AMF 155 may subscribe to be notified using Nudm_SDM_Subscribe 920 when the data requested may be modified. The UDM 140 may subscribe to UDR by Nudr_UDM_Subscribe. The GPSI may be provided to the AMF 155 in the subscription data from the UDM 140 if the GPSI is available in the UE 100 subscription data. In an example, the new AMF 155 may provide the access type it serves for the UE 100 to the UDM 140 and the access type may be set to 3GPP access. The UDM 140 may store the associated access type together with the serving AMF 155 in UDR by Nudr_UDM_Update. The new AMF 155 may create an MM context for the UE 100 after getting the mobility subscription data from the UDM 140. In an example, when the UDM 140 stores the associated access type together with the serving AMF 155, the UDM 140 may initiate a Nudm_UECM_DeregistrationNotification 921 to the old AMF 155 corresponding to 3GPP access. The old AMF 155 may remove the MM context of the UE. If the serving NF removal reason indicated by the UDM 140 is initial registration, then the old AMF 155 may invoke the Namf_EventExposure_Notify service operation towards all the associated SMF 160s of the UE 100 to notify that the UE 100 is deregistered from old AMF 155. The SMF 160 may release the PDU session(s) on getting this notification. In an example, the old AMF 155 may unsubscribe with the UDM 140 for subscription data using Nudm_SDM_unsubscribe 922.

In an example, if the AMF 155 decides to initiate PCF 135 communication, e.g. the AMF 155 has not yet obtained access and mobility policy for the UE 100 or if the access and mobility policy in the AMF 155 are no longer valid, the AMF 155 may select 925 a PCF 135. If the new AMF 155 receives a PCF ID from the old AMF 155 and successfully contacts the PCF 135 identified by the PCF ID, the AMF 155 may select the (V-)PCF identified by the PCF ID. If the PCF 135 identified by the PCF ID may not be used (e.g. no response from the PCF 135) or if there is no PCF ID received from the old AMF 155, the AMF 155 may select 925 a PCF 135.

In an example, the new AMF 155 may perform a policy association establishment 930 during registration procedure. If the new AMF 155 contacts the PCF 135 identified by the (V-)PCF ID received during inter-AMF 155 mobility, the new AMF 155 may include the PCF-ID in the Npcf_AMPolicyControl Get operation. If the AMF 155 notifies the mobility restrictions (e.g. UE 100 location) to the PCF 135 for adjustment, or if the PCF 135 updates the mobility restrictions itself due to some conditions (e.g. application in use, time and date), the PCF 135 may provide the updated mobility restrictions to the AMF 155.

In an example, the PCF 135 may invoke Namf_EventExposure_Subscribe service operation 935 for UE 100 event subscription.

In an example, the AMF 155 may send to the SMF 160 a Nsmf_PDUSession_UpdateSMContext 936. In an example, the AMF 155 may invoke the Nsmf_PDUSession_UpdateSMContext if the PDU session(s) to be re-activated is included in the registration request. The AMF 155 may send Nsmf_PDUSession_UpdateSMContext request to SMF 160(s) associated with the PDU session(s) to activate user plane connections of the PDU session(s). The SMF 160 may decide to trigger e.g. the intermediate UPF 110 insertion, removal or change of PSA. In the case that the intermediate UPF 110 insertion, removal, or relocation is performed for the PDU session(s) not included in PDU session(s) to be re-activated, the procedure may be performed without N11 and N2 interactions to update the N3 user plane between (R)AN 105 and 5GC. The AMF 155 may invoke the Nsmf_PDUSession_ReleaseSMContext service operation towards the SMF 160 if any PDU session status indicates that it is released at the UE 100. The AMF 155 may invoke the Nsmf_PDUSession_ReleaseSMContext service operation towards the SMF 160 in order to release any network resources related to the PDU session.

In an example, the new AMF 155155 may send to a N3IWF an N2 AMF 155 mobility request 940. If the AMF 155 has changed, the new AMF 155 may create an NGAP UE 100 association towards the N3IWF to which the UE 100 is connected. In an example, the N3IWF may respond to the new AMF 155 with an N2 AMF 155 mobility response 940.

In an example, the new AMF 155 may send to the UE 100 a registration accept 955 (comprising: 5G-GUTI, registration area, mobility restrictions, PDU session status, allowed NSSAI, [mapping of allowed NSSAI], periodic registration update timer, LADN information and accepted MICO mode, IMS voice over PS session supported indication, emergency service support indicator, and/or the like). In an example, the AMF 155 may send the registration accept message to the UE 100 indicating that the registration request has been accepted. 5G-GUTI may be included if the AMF 155 allocates a new 5G-GUTI. If the AMF 155 allocates a new registration area, it may send the registration area to the UE 100 via registration accept message 955. If there is no registration area included in the registration accept message, the UE 100 may consider the old registration area as valid. In an example, mobility restrictions may be included in case mobility restrictions may apply for the UE 100 and registration type may not be emergency registration. The AMF 155 may indicate the established PDU sessions to the UE 100 in the PDU session status. The UE 100 may remove locally any internal resources related to PDU sessions that are not marked as established in the received PDU session status. In an example, when the UE 100 is connected to the two AMF 155 belonging to different PLMN via 3GPP access and non-3GPP access then the UE 100 may remove locally any internal resources related to the PDU session of the current PLMN that are not marked as established in received PDU session status. If the PDU session status information was in the registration request, the AMF 155 may indicate the PDU session status to the UE. The mapping of allowed NSSAI may be the mapping of each S-NSSAI of the allowed NSSAI to the S-NSSAIs of the configured NSSAI for the HPLMN. The AMF 155 may include in the registration accept message 955 the LADN information for LADNs that are available within the registration area determined by the AMF 155 for the UE. If the UE 100 included MICO mode in the request, then AMF 155 may respond whether MICO mode may be used. The AMF 155 may set the IMS voice over PS session supported Indication. In an example, in order to set the IMS voice over PS session supported indication, the AMF 155 may perform a UE/RAN radio information and compatibility request procedure to check the compatibility of the UE 100 and RAN radio capabilities related to IMS voice over PS. In an example, the emergency service support indicator may inform the UE 100 that emergency services are supported, e.g., the UE 100 may request PDU session for emergency services. In an example, the handover restriction list and UE-AMBR may be provided to NG-RAN by the AMF 155.

In an example, the UE 100 may send to the new AMF 155 a registration complete 960 message. In an example, the UE 100 may send the registration complete message 960 to the AMF 155 to acknowledge that a new 5G-GUTI may be assigned. In an example, when information about the PDU session(s) to be re-activated is not included in the registration request, the AMF 155 may release the signaling connection with the UE 100. In an example, when the follow-on request is included in the registration request, the AMF 155 may not release the signaling connection after the completion of the registration procedure. In an example, if the AMF 155 is aware that some signaling is pending in the AMF 155 or between the UE 100 and the 5GC, the AMF 155 may not release the signaling connection after the completion of the registration procedure.

Figure 10:
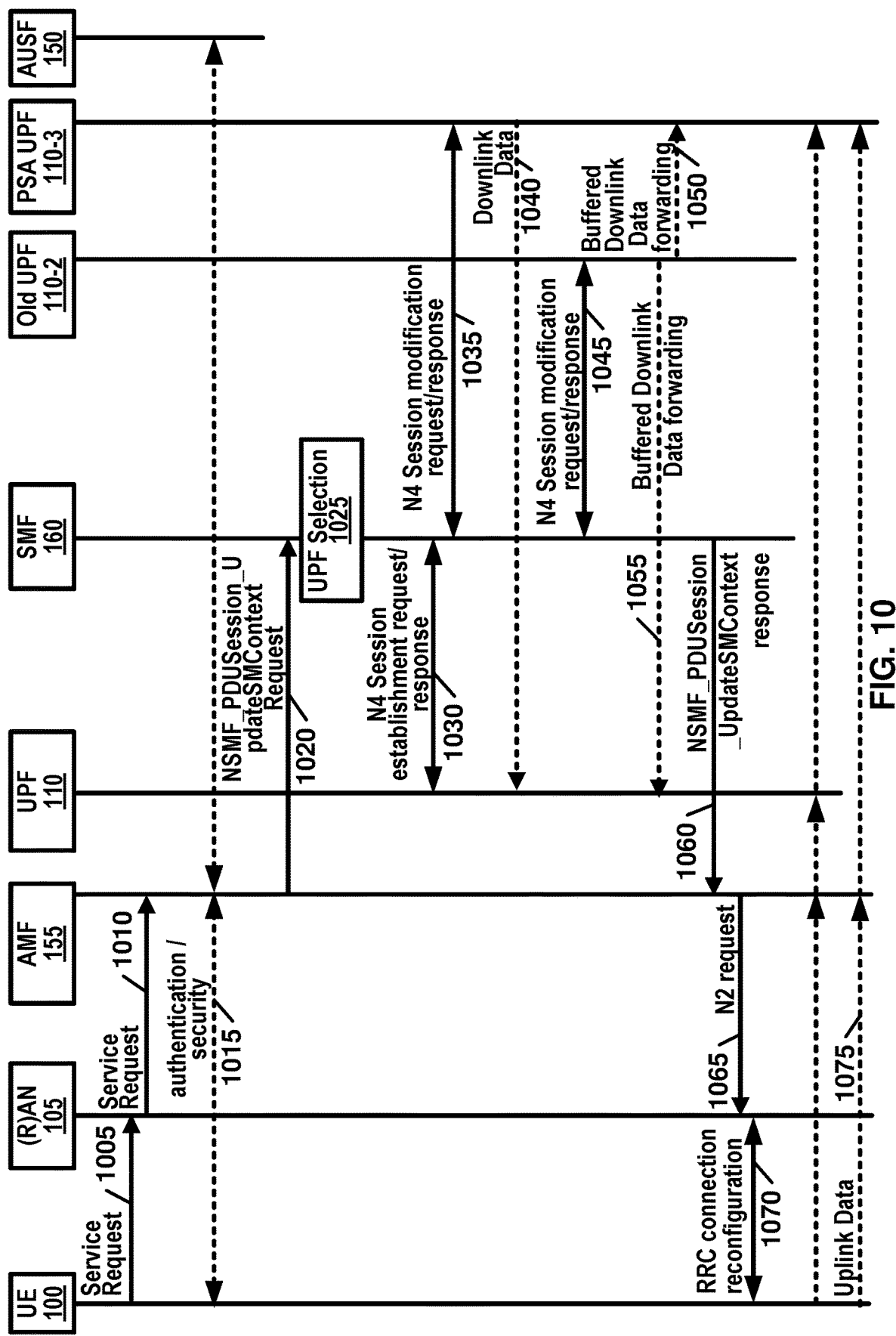
FIG. 10 is an example call flow as per an aspect of an embodiment of the present disclosure.
Figure 11:
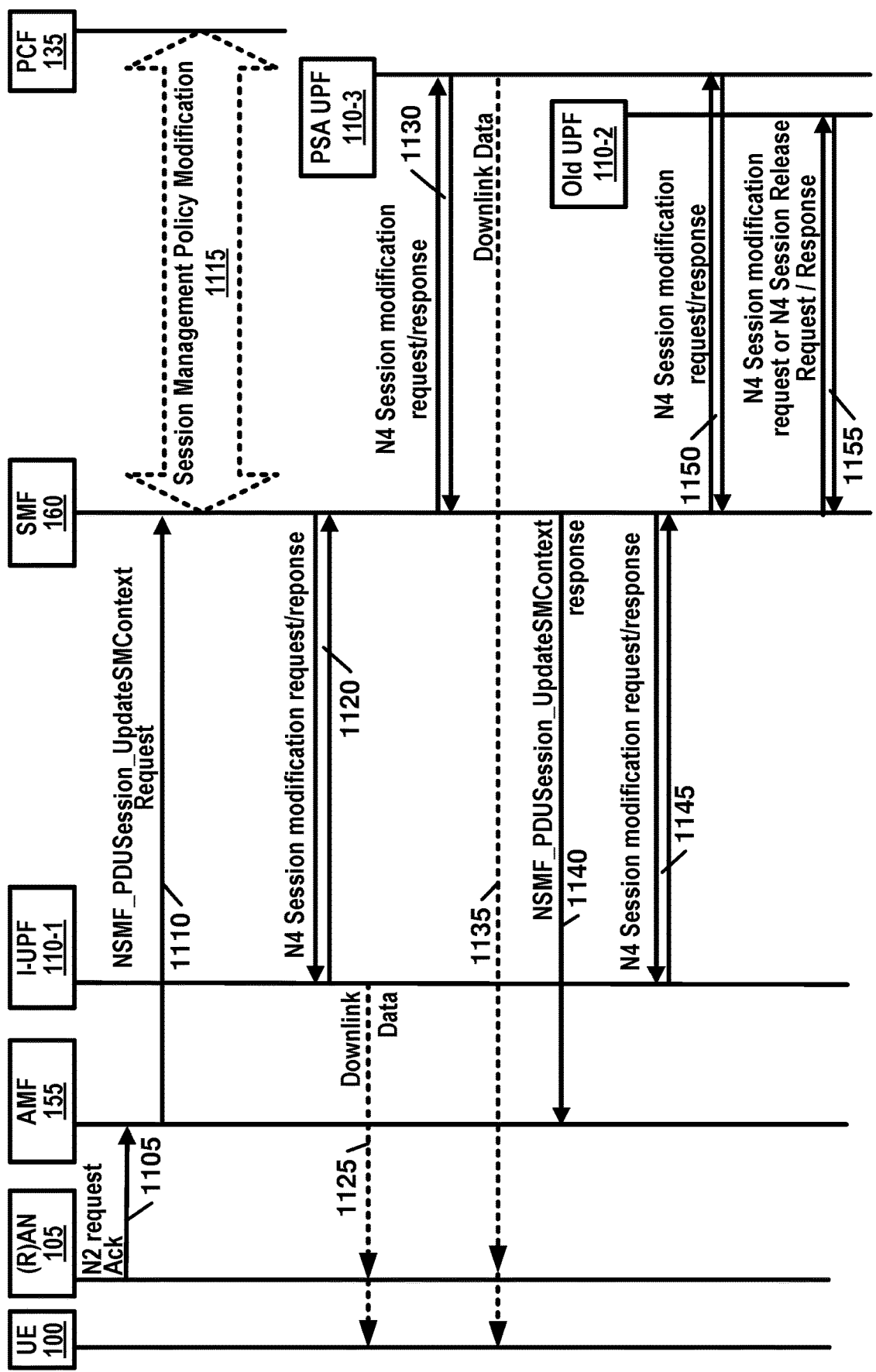
FIG. 11 is an example call flow as per an aspect of an embodiment of the present disclosure.

As depicted in example FIG. 10 and FIG. 11, a service request procedure e.g., a UE 100 triggered service request procedure may be used by a UE 100 in CM-IDLE state to request the establishment of a secure connection to an AMF 155. FIG. 11 is continuation of FIG. 10 depicting the service request procedure. The service request procedure may be used to activate a user plane connection for an established PDU session. The service request procedure may be triggered by the UE 100 or the 5GC, and may be used when the UE 100 is in CM-IDLE and/or in CM-CONNECTED and may allow selectively to activate user plane connections for some of the established PDU sessions.

In an example, a UE 100 in CM IDLE state may initiate the service request procedure to send uplink signaling messages, user data, and/or the like, as a response to a network paging request, and/or the like. In an example, after receiving the service request message, the AMF 155 may perform authentication. In an example, after the establishment of signaling connection to the AMF 155, the UE 100 or network may send signaling messages, e.g. PDU session establishment from the UE 100 to a SMF 160, via the AMF 155.

In an example, for any service request, the AMF 155 may respond with a service accept message to synchronize PDU session status between the UE 100 and network. The AMF 155 may respond with a service reject message to the UE 100, if the service request may not be accepted by the network. The service reject message may include an indication or cause code requesting the UE 100 to perform a registration update procedure. In an example, for service request due to user data, network may take further actions if user plane connection activation may not be successful. In an example FIG. 10 and FIG. 11, more than one UPF, e.g., old UPF 110-2 and PDU session Anchor PSA UPF 110-3 may be involved.

In an example, the UE 100 may send to a (R)AN 105 an AN message comprising AN parameters, mobility management, MM NAS service request 1005 (e.g., list of PDU sessions to be activated, list of allowed PDU sessions, security parameters, PDU session status, and/or the like), and/or the like. In an example, the UE 100 may provide the list of PDU sessions to be activated when the UE 100 may re-activate the PDU session(s). The list of allowed PDU sessions may be provided by the UE 100 when the service request may be a response of a paging or a NAS notification, and may identify the PDU sessions that may be transferred or associated to the access on which the service request may be sent. In an example, for the case of NG-RAN, the AN parameters may include selected PLMN ID, and an establishment cause. The establishment cause may provide the reason for requesting the establishment of an RRC connection. The UE 100 may send NAS service request message towards the AMF 155 encapsulated in an RRC message to the RAN 105.

In an example, if the service request may be triggered for user data, the UE 100 may identify, using the list of PDU sessions to be activated, the PDU session(s) for which the UP connections are to be activated in the NAS service request message. If the service request may be triggered for signaling, the UE 100 may not identify any PDU session(s). If this procedure may be triggered for paging response, and/or the UE 100 may have at the same time user data to be transferred, the UE 100 may identify the PDU session(s) whose UP connections may be activated in MM NAS service request message, by the list of PDU sessions to be activated.

In an example, if the service request over 3GPP access may be triggered in response to a paging indicating non-3GPP access, the NAS service request message may identify in the list of allowed PDU sessions the list of PDU sessions associated with the non-3GPP access that may be re-activated over 3GPP. In an example, the PDU session status may indicate the PDU sessions available in the UE 100. In an example, the UE 100 may not trigger the service request procedure for a PDU session corresponding to a LADN when the UE 100 may be outside the area of availability of the LADN. The UE 100 may not identify such PDU session(s) in the list of PDU sessions to be activated, if the service request may be triggered for other reasons.

In an example, the (R)AN 105 may send to AMF 155 an N2 Message 1010 (e.g., a service request) comprising N2 parameters, MM NAS service request, and/or the like. The AMF 155 may reject the N2 message if it may not be able to handle the service request. In an example, if NG-RAN may be used, the N2 parameters may include the 5G-GUTI, selected PLMN ID, location information, RAT type, establishment cause, and/or the like. In an example, the 5G-GUTI may be obtained in RRC procedure and the (R)AN 105 may select the AMF 155 according to the 5G-GUTI. In an example, the location information and RAT type may relate to the cell in which the UE 100 may be camping. In an example, based on the PDU session status, the AMF 155 may initiate PDU session release procedure in the network for the PDU sessions whose PDU session ID(s) may be indicated by the UE 100 as not available.

In an example, if the service request was not sent integrity protected or integrity protection verification failed, the AMF 155 may initiate a NAS authentication/security procedure 1015.

In an example, if the UE 100 triggers the service request to establish a signaling connection, upon successful establishment of the signaling connection, the UE 100 and the network may exchange NAS signaling.

In an example the AMF 155 may send to the SMF 160 a PDU session update context request 1020 e.g., Nsmf_PDUSession_UpdateSMContext request comprising PDU session ID(s), Cause(s), UE 100 location information, access type, and/or the like.

In an example, the Nsmf_PDUSession_UpdateSMContext request may be invoked by the AMF 155 if the UE 100 may identify PDU session(s) to be activated in the NAS service request message. In an example, the Nsmf_PDUSession_UpdateSMContext request may be triggered by the SMF 160 wherein the PDU session(s) identified by the UE 100 may correlate to other PDU session ID(s) than the one triggering the procedure. In an example, the Nsmf_PDUSession_UpdateSMContext request may be triggered by the SMF 160 wherein the current UE 100 location may be outside the area of validity for the N2 information provided by the SMF 160 during a network triggered service request procedure. The AMF 155 may not send the N2 information provided by the SMF 160 during the network triggered service request procedure.

In an example, the AMF 155 may determine the PDU session(s) to be activated and may send a Nsmf_PDUSession_UpdateSMContext request to SMF 160(*s*) associated with the PDU session(s) with cause set to indicate establishment of user plane resources for the PDU session(s).

In an example, if the procedure may be triggered in response to paging indicating non-3GPP access, and the list of allowed PDU sessions provided by the UE 100 may not include the PDU session for which the UE 100 was paged, the AMF 155 may notify the SMF 160 that the user plane for the PDU session may not be re-activated. The service request procedure may succeed without re-activating the user plane of any PDU sessions, and the AMF 155 may notify the UE 100.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) keep the PDU session, may reject the activation of user plane connection for the PDU session and may inform the AMF 155. In an example, if the procedure may be triggered by a network triggered service request, the SMF 160 may notify the UPF 110 that originated the data notification to discard downlink data for the PDU sessions and/or to not provide further data notification messages. The SMF 160 may respond to the AMF 155 with an appropriate reject cause and the user plane activation of PDU session may be stopped.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) release the PDU session. The SMF 160 may locally release the PDU session and may inform the AMF 155 that the PDU session may be released. The SMF 160 may respond to the AMF 155 with an appropriate reject cause and the user plane Activation of PDU session may be stopped.

In an example, if the UP activation of the PDU session may be accepted by the SMF 160, based on the location info received from the AMF 155, the SMF 160 may check the UPF 110 Selection 1025. Criteria (e.g., slice isolation requirements, slice coexistence requirements, UPF's 110 dynamic load, UPF's 110 relative static capacity among UPFs supporting the same DNN, UPF 110 location available at the SMF 160, UE 100 location information, Capability of the UPF 110 and the functionality required for the particular UE 100 session. In an example, an appropriate UPF 110 may be selected by matching the functionality and features required for a UE 100, DNN, PDU session type (i.e. IPv4, IPv6, ethernet type or unstructured type) and if applicable, the static IP address/prefix, SSC mode selected for the PDU session, UE 100 subscription profile in UDM 140, DNAI was included in the PCC rules, local operator policies, S-NSSAI, access technology being used by the UE 100, UPF 110 logical topology, and/or the like), and may determine to perform one or more of the following: continue using the current UPF(s); may select a new intermediate UPF 110 (or add/remove an intermediate UPF 110), if the UE 100 has moved out of the service area of the UPF 110 that was previously connecting to the (R)AN 105, while maintaining the UPF(s) acting as PDU session anchor; may trigger re-establishment of the PDU session to perform relocation/reallocation of the UPF 110 acting as PDU session anchor, e.g. the UE 100 has moved out of the service area of the anchor UPF 110 which is connecting to RAN 105.

In an example, the SMF 160 may send to the UPF 110 (e.g., new intermediate UPF 110) an N4 session establishment request 1030. In an example, if the SMF 160 may select a new UPF 110 to act as intermediate UPF 110-2 for the PDU session, or if the SMF 160 may select to insert an intermediate UPF 110 for a PDU session which may not have an intermediate UPF 110-2, an N4 session establishment request 1030 message may be sent to the new UPF 110, providing packet detection, data forwarding, enforcement and reporting rules to be installed on the new intermediate UPF. The PDU session anchor addressing information (on N9) for this PDU session may be provided to the intermediate UPF 110-2.

In an example, if a new UPF 110 is selected by the SMF 160 to replace the old (intermediate) UPF 110-2, the SMF 160 may include a data forwarding indication. The data forwarding indication may indicate to the UPF 110 that a second tunnel endpoint may be reserved for buffered DL data from the old I-UPF.

In an example, the new UPF 110 (intermediate) may send to SMF 160 an N4 session establishment response message 1030. In case the UPF 110 may allocate CN tunnel info, the UPF 110 may provide DL CN tunnel info for the UPF 110 acting as PDU session anchor and UL CN tunnel info (e.g., CN N3 tunnel info) to the SMF 160. If the data forwarding indication may be received, the new (intermediate) UPF 110 acting as N3 terminating point may send DL CN tunnel info for the old (intermediate) UPF 110-2 to the SMF 160. The SMF 160 may start a timer, to release the resource in the old intermediate UPF 110-2.

In an example, if the SMF 160 may selects a new intermediate UPF 110 for the PDU session or may remove the old I-UPF 110-2, the SMF 160 may send N4 session modification request message 1035 to PDU session anchor, PSA UPF 110-3, providing the data forwarding indication and DL tunnel information from new intermediate UPF 110.

In an example, if the new intermediate UPF 110 may be added for the PDU session, the (PSA) UPF 110-3 may begin to send the DL data to the new I-UPF 110 as indicated in the DL tunnel information.

In an example, if the service request may be triggered by the network, and the SMF 160 may remove the old I-UPF 110-2 and may not replace the old I-UPF 110-2 with the new I-UPF 110, the SMF 160 may include the data forwarding indication in the request. The data forwarding indication may indicate to the (PSA) UPF 110-3 that a second tunnel endpoint may be reserved for buffered DL data from the old I-UPF 110-2. In this case, the PSA UPF 110-3 may begin to buffer the DL data it may receive at the same time from the N6 interface.

In an example, the PSA UPF 110-3 (PSA) may send to the SMF 160 an N4 session modification response 1035. In an example, if the data forwarding indication may be received, the PSA UPF 110-3 may become as N3 terminating point and may send CN DL tunnel info for the old (intermediate) UPF 110-2 to the SMF 160. The SMF 160 may start a timer, to release the resource in old intermediate UPF 110-2 if there is one.

In an example, the SMF 160 may send to the old UPF 110-2 an N4 session modification request 1045 (e.g., may comprise new UPF 110 address, new UPF 110 DL tunnel ID, and/or the like). In an example, if the service request may be triggered by the network, and/or the SMF 160 may remove the old (intermediate) UPF 110-2, the SMF 160 may send the N4 session modification request message to the old (intermediate) UPF 110-2, and may provide the DL tunnel information for the buffered DL data. If the SMF 160 may allocate new I-UPF 110, the DL tunnel information is from the new (intermediate) UPF 110 may act as N3 terminating point. If the SMF 160 may not allocate a new I-UPF 110, the DL tunnel information may be from the new UPF 110 (PSA) 110-3 acting as N3 terminating point. The SMF 160 may start a timer to monitor the forwarding tunnel. In an example, the old (intermediate) UPF 110-2 may send N4 session modification response message to the SMF 160.

In an example, if the I-UPF 110-2 may be relocated and forwarding tunnel was established to the new I-UPF 110, the old (intermediate) UPF 110-2 may forward its buffered data to the new (intermediate) UPF 110 acting as N3 terminating point. In an example, if the old I-UPF 110-2 may be removed and the new I-UPF 110 may not be assigned for the PDU session and forwarding tunnel may be established to the UPF 110 (PSA) 110-3, the old (intermediate) UPF 110-2 may forward its buffered data to the UPF 110 (PSA) 110-3 acting as N3 terminating point.

In an example, the SMF 160 may send to the AMF 155 an N11 message 1060 e.g., a Nsmf_PDUSession_UpdateSMContext response (comprising: N1 SM container (PDU session ID, PDU session re-establishment indication), N2 SM information (PDU session ID, QoS profile, CN N3 tunnel info, S-NSSAI), Cause), upon reception of the Nsmf_PDUSession_UpdateSMContext request with a cause including e.g., establishment of user plane resources. The SMF 160 may determine whether UPF 110 reallocation may be performed, based on the UE 100 location information, UPF 110 service area and operator policies. In an example, for a PDU session that the SMF 160 may determine to be served by the current UPF 110, e.g., PDU session anchor or intermediate UPF, the SMF 160 may generate N2 SM information and may send a Nsmf_PDUSession_UpdateSMContext response 1060 to the AMF 155 to establish the user plane(s). The N2 SM information may contain information that the AMF 155 may provide to the RAN 105. In an example, for a PDU session that the SMF 160 may determine as requiring a UPF 110 relocation for PDU session anchor UPF, the SMF 160 may reject the activation of UP of the PDU session by sending Nsmf_PDUSession_UpdateSMContext response that may contain N1 SM container to the UE 100 via the AMF 155. The N1 SM container may include the corresponding PDU session ID and PDU session re-establishment indication.

Upon reception of the Namf_EventExposure_Notify from the AMF 155 to the SMF 160, with an indication that the UE 100 is reachable, if the SMF 160 may have pending DL data, the SMF 160 may invoke the Namf_Communication_N1N2MessageTransfer service operation to the AMF 155 to establish the user plane(s) for the PDU sessions. In an example, the SMF 160 may resume sending DL data notifications to the AMF 155 in case of DL data.

In an example, the SMF 160 may send a message to the AMF 155 to reject the activation of UP of the PDU session by including a cause in the Nsmf_PDUSession_UpdateSMContext response if the PDU session may correspond to a LADN and the UE 100 may be outside the area of availability of the LADN, or if the AMF 155 may notify the SMF 160 that the UE 100 may be reachable for regulatory prioritized service, and the PDU session to be activated may not for a regulatory prioritized service; or if the SMF 160 may decide to perform PSA UPF 110-3 relocation for the requested PDU session.

In an example, the AMF 155 may send to the (R)AN 105 an N2 request message 1065 (e.g., N2 SM information received from SMF 160, security context, AMF 155 signaling connection ID, handover restriction list, MM NAS service accept, list of recommended cells/TAs/NG-RAN node identifiers). In an example, the RAN 105 may store the security context, AMF 155 signaling connection Id, QoS information for the QoS flows of the PDU sessions that may be activated and N3 tunnel IDs in the UE 100 RAN 105 context. In an example, the MM NAS service accept may include PDU session status in the AMF 155. If the activation of UP of a PDU session may be rejected by the SMF 160, the MM NAS service accept may include the PDU session ID and the reason why the user plane resources may not be activated (e.g. LADN not available). Local PDU session release during the session request procedure may be indicated to the UE 100 via the session Status.

In an example, if there are multiple PDU sessions that may involve multiple SMF 160s, the AMF 155 may not wait for responses from all SMF 160s before it may send N2 SM information to the UE 100. The AMF 155 may wait for all responses from the SMF 160s before it may send MM NAS service accept message to the UE 100.

In an example, the AMF 155 may include at least one N2 SM information from the SMF 160 if the procedure may be triggered for PDU session user plane activation. AMF 155 may send additional N2 SM information from SMF 160s in separate N2 message(s) (e.g. N2 tunnel setup request), if there is any. Alternatively, if multiple SMF 160s may be involved, the AMF 155 may send one N2 request message to (R)AN 105 after all the Nsmf_PDUSession_UpdateSMContext response service operations from all the SMF 160s associated with the UE 100 may be received. In such case, the N2 request message may include the N2 SM information received in each of the Nsmf_PDUSession_UpdateSMContext response and PDU session ID to enable AMF 155 to associate responses to relevant SMF 160.

In an example, if the RAN 105 (e.g., NG RAN) node may provide the list of recommended cells/TAs/NG-RAN node identifiers during the AN release procedure, the AMF 155 may include the information from the list in the N2 request. The RAN 105 may use this information to allocate the RAN 105 notification area when the RAN 105 may decide to enable RRC inactive state for the UE 100.

If the AMF 155 may receive an indication, from the SMF 160 during a PDU session establishment procedure that the UE 100 may be using a PDU session related to latency sensitive services, for any of the PDU sessions established for the UE 100 and the AMF 155 has received an indication from the UE 100 that may support the CM-CONNECTED with RRC inactive state, then the AMF 155 may include the UE's RRC inactive assistance information. In an example, the AMF 155 based on network configuration, may include the UE's RRC inactive assistance information.

In an example, the (R)AN 105 may send to the UE 100 a message to perform RRC connection reconfiguration 1070 with the UE 100 depending on the QoS information for all the QoS flows of the PDU sessions whose UP connections may be activated and data radio bearers. In an example, the user plane security may be established.

In an example, if the N2 request may include a MM NAS service accept message, the RAN 105 may forward the MM NAS service accept to the UE 100. The UE 100 may locally delete context of PDU sessions that may not be available in 5GC.

In an example, if the N1 SM information may be transmitted to the UE 100 and may indicate that some PDU session(s) may be re-established, the UE 100 may initiate PDU session re-establishment for the PDU session(s) that may be re-established after the service request procedure may be complete.

In an example, after the user plane radio resources may be setup, the uplink data from the UE 100 may be forwarded to the RAN 105. The RAN 105 (e.g., NG-RAN) may send the uplink data to the UPF 110 address and tunnel ID provided.

In an example, the (R)AN 105 may send to the AMF 155 an N2 request Ack 1105 (e.g., N2 SM information (comprising: AN tunnel info, list of accepted QoS flows for the PDU sessions whose UP connections are activated, list of rejected QoS flows for the PDU sessions whose UP connections are activated)). In an example, the N2 request message may include N2 SM information(s), e.g. AN tunnel info. RAN 105 may respond N2 SM information with separate N2 message (e.g. N2 tunnel setup response). In an example, if multiple N2 SM information are included in the N2 request message, the N2 request Ack may include multiple N2 SM information and information to enable the AMF 155 to associate the responses to relevant SMF 160.

In an example, the AMF 155 may send to the SMF 160 a Nsmf_PDUSession_UpdateSMContext request 1110 (N2 SM information (AN tunnel info), RAT type) per PDU session. If the AMF 155 may receive N2 SM information (one or multiple) from the RAN 105, then the AMF 155 may forward the N2 SM information to the relevant SMF 160. If the UE 100 time zone may change compared to the last reported UE 100 Time Zone then the AMF 155 may include the UE 100 time zone IE in the Nsmf_PDUSession_UpdateSMContext request message.

In an example, if dynamic PCC is deployed, the SMF 160 may initiate notification about new location information to the PCF 135 (if subscribed) by invoking an event exposure notification operation (e.g., a Nsmf_EventExposure_Notify service operation). The PCF 135 may provide updated policies by invoking a policy control update notification message 1115 (e.g., a Npcf_SMPolicyControl_UpdateNotify operation).

In an example, if the SMF 160 may select a new UPF 110 to act as intermediate UPF 110 for the PDU session, the SMF 160 may initiates an N4 session modification procedure 1120 to the new I-UPF 110 and may provide AN tunnel info. The downlink data from the new I-UPF 110 may be forwarded to RAN 105 and UE 100. In an example, the UPF 110 may send to the SMF 160, an N4 session modification response 1120. In an example, the SMF 160 may send to the AMF 155, a Nsmf_PDUSession_UpdateSMContext response 1140.

In an example, if forwarding tunnel may be established to the new I-UPF 110 and if the timer SMF 160 set for forwarding tunnel may be expired, the SMF 160 may sends N4 session modification request 1145 to new (intermediate) UPF 110 acting as N3 terminating point to release the forwarding tunnel. In an example, the new (intermediate) UPF 110 may send to the SMF 160 an N4 session modification response 1145. In an example, the SMF 160 may send to the PSA UPF 110-3 an N4 session modification request 1150, or N4 session release request. In an example, if the SMF 160 may continue using the old UPF 110-2, the SMF 160 may send an N4 session modification request 1155, providing AN tunnel info. In an example, if the SMF 160 may select a new UPF 110 to act as intermediate UPF 110, and the old UPF 110-2 may not be PSA UPF 110-3, the SMF 160 may initiate resource release, after timer expires, by sending an N4 session release request (release cause) to the old intermediate UPF 110-2.

In an example, the old intermediate UPF 110-2 may send to the SMF 160 an N4 session modification response or N4 session release response 1155. The old UPF 110-2 may acknowledge with the N4 session modification response or N4 session release response message to confirm the modification or release of resources. The AMF 155 may invoke the Namf_EventExposure_Notify service operation to notify the mobility related events, after this procedure may complete, towards the NFs that may have subscribed for the events. In an example, the AMF 155 may invoke the Namf_EventExposure_Notify towards the SMF 160 if the SMF 160 had subscribed for UE 100 moving into or out of area of interest and if the UE's current location may indicate that it may be moving into or moving outside of the area of interest subscribed, or if the SMF 160 had subscribed for LADN DNN and if the UE 100 may be moving into or outside of an area where the LADN is available, or if the UE 100 may be in MICO mode and the AMF 155 had notified an SMF 160 of the UE 100 being unreachable and that SMF 160 may not send DL data notifications to the AMF 155, and the AMF 155 may informs the SMF 160 that the UE 100 is reachable, or if the SMF 160 had subscribed for UE 100 reachability status, then the AMF 155 may notify the UE 100 reachability.

Figure 12:
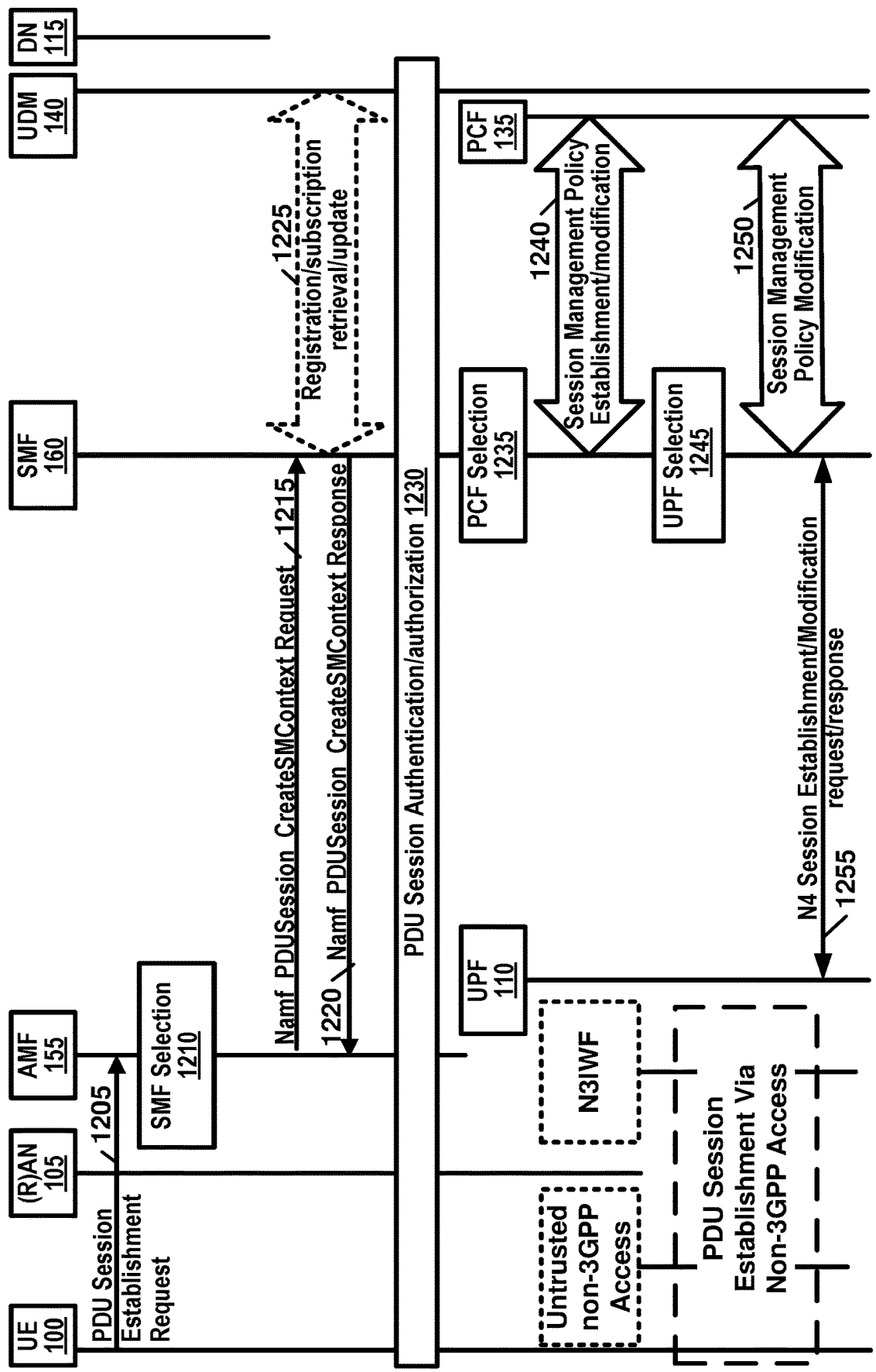
FIG. 12 is an example call flow as per an aspect of an embodiment of the present disclosure.
Figure 13:
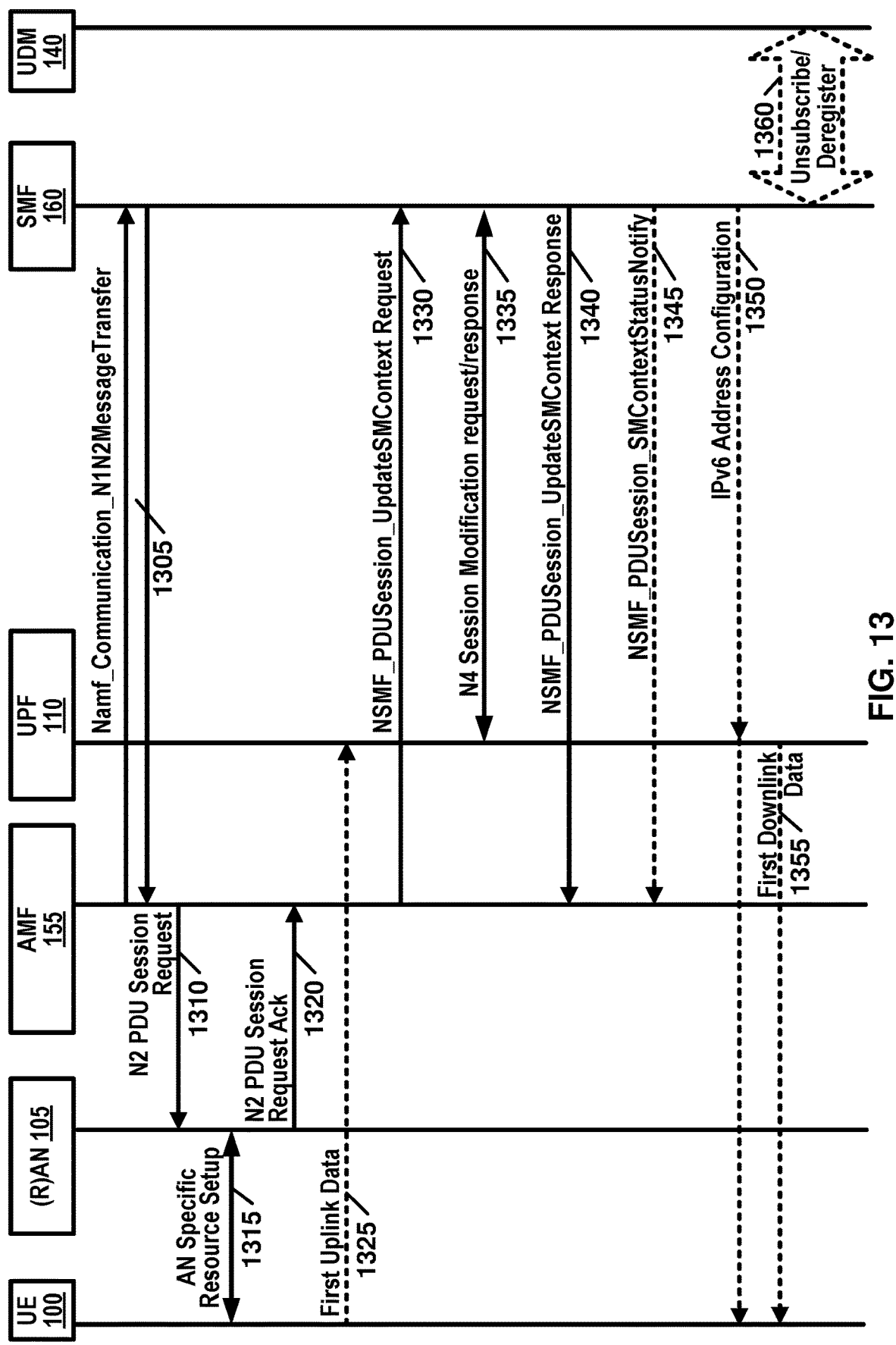
FIG. 13 is an example call flow as per an aspect of an embodiment of the present disclosure.

An example PDU session establishment procedure depicted in FIG. 12 and FIG. 13. In an example embodiment, when the PDU session establishment procedure may be employed, the UE 100 may send to the AMF 155 a NAS Message 1205 (or a SM NAS message) comprising NSSAI, S-NSSAI (e.g., requested S-NSSAI, allowed S-NSSAI, subscribed S-NSSAI, and/or the like), DNN, PDU session ID, request type, old PDU session ID, N1 SM container (PDU session establishment request), and/or the like. In an example, the UE 100, in order to establish a new PDU session, may generate a new PDU session ID. In an example, when emergency service may be required and an emergency PDU session may not already be established, the UE 100 may initiate the UE 100 requested PDU session establishment procedure with a request type indicating emergency request. In an example, the UE 100 may initiate the UE 100 requested PDU session establishment procedure by the transmission of the NAS message containing a PDU session establishment request within the N1 SM container. The PDU session establishment request may include a PDU type, SSC mode, protocol configuration options, and/or the like. In an example, the request type may indicate initial request if the PDU session establishment is a request to establish the new PDU session and may indicate existing PDU session if the request refers to an existing PDU session between 3GPP access and non-3GPP access or to an existing PDN connection in EPC. In an example, the request type may indicate emergency request if the PDU session establishment may be a request to establish a PDU session for emergency services. The request type may indicate existing emergency PDU session if the request refers to an existing PDU session for emergency services between 3GPP access and non-3GPP access. In an example, the NAS message sent by the UE 100 may be encapsulated by the AN in a N2 message towards the AMF 155 that may include user location information and access technology type information. In an example, the PDU session establishment request message may contain SM PDU DN request container containing information for the PDU session authorization by the external DN. In an example, if the procedure may be triggered for SSC mode 3 operation, the UE 100 may include the old PDU session ID which may indicate the PDU session ID of the on-going PDU session to be released, in the NAS message. The old PDU session ID may be an optional parameter which may be included in this case. In an example, the AMF 155 may receive from the AN the NAS message (e.g., NAS NAS message) together with user location information (e.g. cell ID in case of the RAN 105). In an example, the UE 100 may not trigger a PDU session establishment for a PDU session corresponding to a LADN when the UE 100 is outside the area of availability of the LADN.

In an example, the AMF 155 may determine that the NAS message or the SM NAS message may correspond to the request for the new PDU session based on that request type indicates initial request and that the PDU session ID may not be used for any existing PDU session(s) of the UE 100. If the NAS message does not contain an S-NSSAI, the AMF 155 may determine a default S-NSSAI for the requested PDU session either according to the UE 100 subscription, if it may contain only one default S-NSSAI, or based on operator policy. In an example, the AMF 155 may perform SMF 160 selection 1210 and select an SMF 160. If the request type may indicate initial request or the request may be due to handover from EPS, the AMF 155 may store an association of the S-NSSAI, the PDU session ID and a SMF 160 ID. In an example, if the request type is initial request and if the old PDU session ID indicating the existing PDU session may be contained in the message, the AMF 155 may select the SMF 160 and may store an association of the new PDU session ID and the selected SMF 160 ID.

In an example, the AMF 155 may send to the SMF 160, an N11 message 1215, e.g., Nsmf_PDUSession_CreateSM-Context request (comprising: SUPI or PEI, DNN, S-NSSAI, PDU session ID, AMF 155 ID, request type, N1 SM container (PDU session establishment request), user location information, access type, PEI, GPSI), or Nsmf_PDUSession_UpdateSMContext request (SUPI, DNN, S-NSSAI, PDU session ID, AMF 155 ID, request type, N1 SM container (PDU session establishment request), user location information, access type, RAT type, PEI). In an example, if the AMF 155 may not have an association with the SMF 160 for the PDU session ID provided by the UE 100 (e.g. when request type indicates initial request), the AMF 155 may invoke the Nsmf_PDUSession_CreateSMContext request, but if the AMF 155 already has an association with an SMF 160 for the PDU session ID provided by the UE 100 (e.g. when request type indicates existing PDU session), the AMF 155 may invoke the Nsmf_PDUSession_UpdateSMContext request. In an example, the AMF 155 ID may be the UE's GUAMI which uniquely identifies the AMF 155 serving the UE 100. The AMF 155 may forward the PDU session ID together with the N1 SM container containing the PDU session establishment request received from the UE 100. The AMF 155 may provide the PEI instead of the SUPI when the UE 100 has registered for emergency services without providing the SUPI. In case the UE 100 has registered for emergency services but has not been authenticated, the AMF 155 may indicate that the SUPI has not been authenticated.

In an example, if the request type may indicate neither emergency request nor existing emergency PDU session and, if the SMF 160 has not yet registered and subscription data may not be available, the SMF 160 may register with the UDM 140, and may retrieve subscription data 1225 and subscribes to be notified when subscription data may be modified. In an example, if the request type may indicate existing PDU session or existing emergency PDU session, the SMF 160 may determine that the request may be due to handover between 3GPP access and non-3GPP access or due to handover from EPS. The SMF 160 may identify the existing PDU session based on the PDU session ID. The SMF 160 may not create a new SM context but instead may update the existing SM context and may provide the representation of the updated SM context to the AMF 155 in the response. if the request type may be initial request and if the old PDU session ID may be included in Nsmf_PDUSession_CreateSMContext request, the SMF 160 may identify the existing PDU session to be released based on the old PDU session ID.

In an example, the SMF 160 may send to the AMF 155, the N11 message response 1220, e.g., either a PDU session create/update response, Nsmf_PDUSession_CreateSMContext response 1220 (cause, SM context ID or N1 SM container (PDU session reject(cause))) or a Nsmf_PDUSession_UpdateSMContext response.

In an example, if the SMF 160 may perform secondary authorization/authentication 1230 during the establishment of the PDU session by a DN-AAA server, the SMF 160 may select a UPF 110 and may trigger a PDU session establishment authentication/authorization.

In an example, if the request type may indicate initial request, the SMF 160 may select an SSC mode for the PDU session. The SMF 160 may select one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For Unstructured PDU type the SMF 160 may allocate an IPv6 prefix for the PDU session and N6 point-to-point tunneling (based on UDP/IPv6).

In an example, if dynamic PCC is deployed, the may SMF 160 performs PCF 135 selection 1235. If the request type indicates existing PDU session or existing emergency PDU session, the SMF 160 may use the PCF 135 already selected for the PDU session. If dynamic PCC is not deployed, the SMF 160 may apply local policy.

In an example, the SMF 160 may perform a session management policy establishment procedure 1240 to establish a PDU session with the PCF 135 and may get the default PCC Rules for the PDU session. The GPSI may be included if available at the SMF 160. If the request type in 1215 indicates existing PDU session, the SMF 160 may notify an event previously subscribed by the PCF 135 by a session management policy modification procedure and the PCF 135 may update policy information in the SMF 160. The PCF 135 may provide authorized session-AMBR and the authorized 5QI and ARP to SMF 160. The PCF 135 may subscribe to the IP allocation/release event in the SMF 160 (and may subscribe other events).

In an example, the PCF 135, based on the emergency DNN, may set the ARP of the PCC rules to a value that may be reserved for emergency services.

In an example, if the request type in 1215 indicates initial request, the SMF 160 may select an SSC mode for the PDU session. The SMF 160 may select 1245 one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For unstructured PDU type the SMF 160 may allocate an IPv6 prefix for the PDU session and N6 point-to-point tunneling (e.g., based on UDP/IPv6). In an example, for Ethernet PDU type PDU session, neither a MAC nor an IP address may be allocated by the SMF 160 to the UE 100 for this PDU session.

In an example, if the request type in 1215 is existing PDU session, the SMF 160 may maintain the same IP address/prefix that may be allocated to the UE 100 in the source network.

In an example, if the request type in 1215 indicates existing PDU session referring to an existing PDU session moved between 3GPP access and non-3GPP access, the SMF 160 may maintain the SSC mode of the PDU session, e.g., the current PDU session Anchor and IP address. In an example, the SMF 160 may trigger e.g. new intermediate UPF 110 insertion or allocation of a new UPF 110. In an example, if the request type indicates emergency request, the SMF 160 may select 1245 the UPF 110 and may select SSC mode 1.

In an example, the SMF 160 may perform a session management policy modification 1250 procedure to report some event to the PCF 135 that has previously subscribed. If request type is initial request and dynamic PCC is deployed and PDU type is IPv4 or IPv6, the SMF 160 may notify the PCF 135 (that has previously subscribed) with the allocated UE 100 IP address/prefix.

In an example, the PCF 135 may provide updated policies to the SMF 160. The PCF 135 may provide authorized session-AMBR and the authorized 5QI and ARP to the SMF 160.

In an example, if request type indicates initial request, the SMF 160 may initiate an N4 session establishment procedure 1255 with the selected UPF 110. The SMF 160 may initiate an N4 session modification procedure with the selected UPF 110. In an example, the SMF 160 may send an N4 session establishment/modification request 1255 to the UPF 110 and may provide packet detection, enforcement, reporting rules, and/or the like to be installed on the UPF 110 for this PDU session. If CN tunnel info is allocated by the SMF 160, the CN tunnel info may be provided to the UPF 110. If the selective user plane deactivation is required for this PDU session, the SMF 160 may determine the Inactivity Timer and may provide it to the UPF 110. In an example, the UPF 110 may acknowledges by sending an N4 session establishment/modification response 1255. If CN tunnel info is allocated by the UPF, the CN tunnel info may be provided to SMF 160. In an example, if multiple UPFs are selected for the PDU session, the SMF 160 may initiate N4 session establishment/modification procedure 1255 with each UPF 110 of the PDU session.

In an example, the SMF 160 may send to the AMF 155 an Namf_Communication_N1N2MessageTransfer 1305 message (comprising PDU session ID, access type, N2 SM information (PDU session ID, QFI(s), QoS profile(s), CN tunnel info, S-NSSAI, session-AMBR, PDU session type, and/or the like), N1 SM container (PDU session establishment accept (QoS Rule(s), selected SSC mode, S-NSSAI, allocated IPv4 address, interface identifier, session-AMBR, selected PDU session type, and/or the like))). In case of multiple UPFs are used for the PDU session, the CN tunnel info may comprise tunnel information related with the UPF 110 that terminates N3. In an example, the N2 SM information may carry information that the AMF 155 may forward to the (R)AN 105 (e.g., the CN tunnel info corresponding to the core network address of the N3 tunnel corresponding to the PDU session, one or multiple QoS profiles and the corresponding QFIs may be provided to the (R)AN 105, the PDU session ID may be used by AN signaling with the UE 100 to indicate to the UE 100 the association between AN resources and a PDU session for the UE 100, and/or the like). In an example, a PDU session may be associated to an S-NSSAI and a DNN. In an example, the N1 SM container may contain the PDU session establishment accept that the AMF 155 may provide to the UE 100. In an example, multiple QoS rules and QoS profiles may be included in the PDU session establishment accept within the N1 SM and in the N2 SM information. In an example, the Namf_Communication_N1N2MessageTransfer 1305 may further comprise the PDU session ID and information allowing the AMF 155 to know which access towards the UE 100 to use.

In an example, the AMF 155 may send to the (R)AN 105 an N2 PDU session request 1310 (comprising N2 SM information, NAS message (PDU session ID, N1 SM container (PDU session establishment accept, and/or the like))). In an example, the AMF 155 may send the NAS message 1310 that may comprise PDU session ID and PDU session establishment accept targeted to the UE 100 and the N2 SM information received from the SMF 160 within the N2 PDU session request 1310 to the (R)AN 105.

In an example, the (R)AN 105 may issue AN specific signaling exchange 1315 with the UE 100 that may be related with the information received from SMF 160. In an example, in case of a 3GPP RAN 105, an RRC connection reconfiguration procedure may take place with the UE 100 to establish the necessary RAN 105 resources related to the QoS Rules for the PDU session request 1310. In an example, (R)AN 105 may allocate (R)AN 105 N3 tunnel information for the PDU session. In case of dual connectivity, the master RAN 105 node may assign some (zero or more) QFIs to be setup to a master RAN 105 node and others to the secondary RAN 105 node. The AN tunnel info may comprise a tunnel endpoint for each involved RAN 105 node, and the QFIs assigned to each tunnel endpoint. A QFI may be assigned to either the master RAN 105 node or the secondary RAN 105 node. In an example, (R)AN 105 may forward the NAS message 1310 (PDU session ID, N1 SM container (PDU session establishment accept)) to the UE 100. The (R)AN 105 may provide the NAS message to the UE 100 if the necessary RAN 105 resources are established and the allocation of (R)AN 105 tunnel information are successful.

In an example, the N2 PDU session response 1320 may comprise a PDU session ID, cause, N2 SM information (PDU session ID, AN tunnel info, list of accepted/rejected QFI(s)), and/or the like. In an example, the AN tunnel info may correspond to the access network address of the N3 tunnel corresponding to the PDU session.

In an example, the AMF 155 may forward the N2 SM information received from (R)AN 105 to the SMF 160 via a Nsmf_PDUSession_UpdateSMContext request 1330 (comprising: N2 SM information, request type, and/or the like). In an example, if the list of rejected QFI(s) is included in N2 SM information, the SMF 160 may release the rejected QFI(s) associated QoS profiles.

In an example, the SMF 160 may initiate an N4 session modification procedure 1335 with the UPF 110. The SMF 160 may provide AN tunnel info to the UPF 110 as well as the corresponding forwarding rules. In an example, the UPF 110 may provide an N4 session modification response 1335 to the SMF 160.

In an example, the SMF 160 may send to the AMF 155 a Nsmf_PDUSession_UpdateSMContext response 1340 (Cause). In an example, the SMF 160 may subscribe to the UE 100 mobility event notification from the AMF 155 (e.g. location reporting, UE 100 moving into or out of area of interest), after this step by invoking Namf_EventExposure_Subscribe service operation. For LADN, the SMF 160 may subscribe to the UE 100 moving into or out of LADN service area event notification by providing the LADN DNN as an indicator for the area of interest. The AMF 155 may forward relevant events subscribed by the SMF 160.

In an example, the SMF 160 may send to the AMF 155, a Nsmf_PDUSession_SMContextStatusNotify (release) 1345. In an example, if during the procedure, any time the PDU session establishment is not successful, the SMF 160 may inform the AMF 155 by invoking Nsmf_PDUSession_SMContextStatusNotify (release) 1345. The SMF 160 may releases any N4 session(s) created, any PDU session address if allocated (e.g. IP address) and may release the association with the PCF 135.

In an example, in case of PDU type IPv6, the SMF 160 may generate an IPv6 Router Advertisement 1350 and may send it to the UE 100 via N4 and the UPF 110.

In an example, if the PDU session may not be established, the SMF 160 may unsubscribe 1360 to the modifications of session management subscription data for the corresponding (SUPI, DNN, S-NSSAI), using Nudm_SDM_Unsubscribe (SUPI, DNN, S-NSSAI), if the SMF 160 is no more handling a PDU session of the UE 100 for this (DNN, S-NSSAI). In an example, if the PDU session may not be established, the SMF 160 may deregister 1360 for the given PDU session using Nudm_UECM_Deregistration (SUPI, DNN, PDU session ID).

Figure 14:
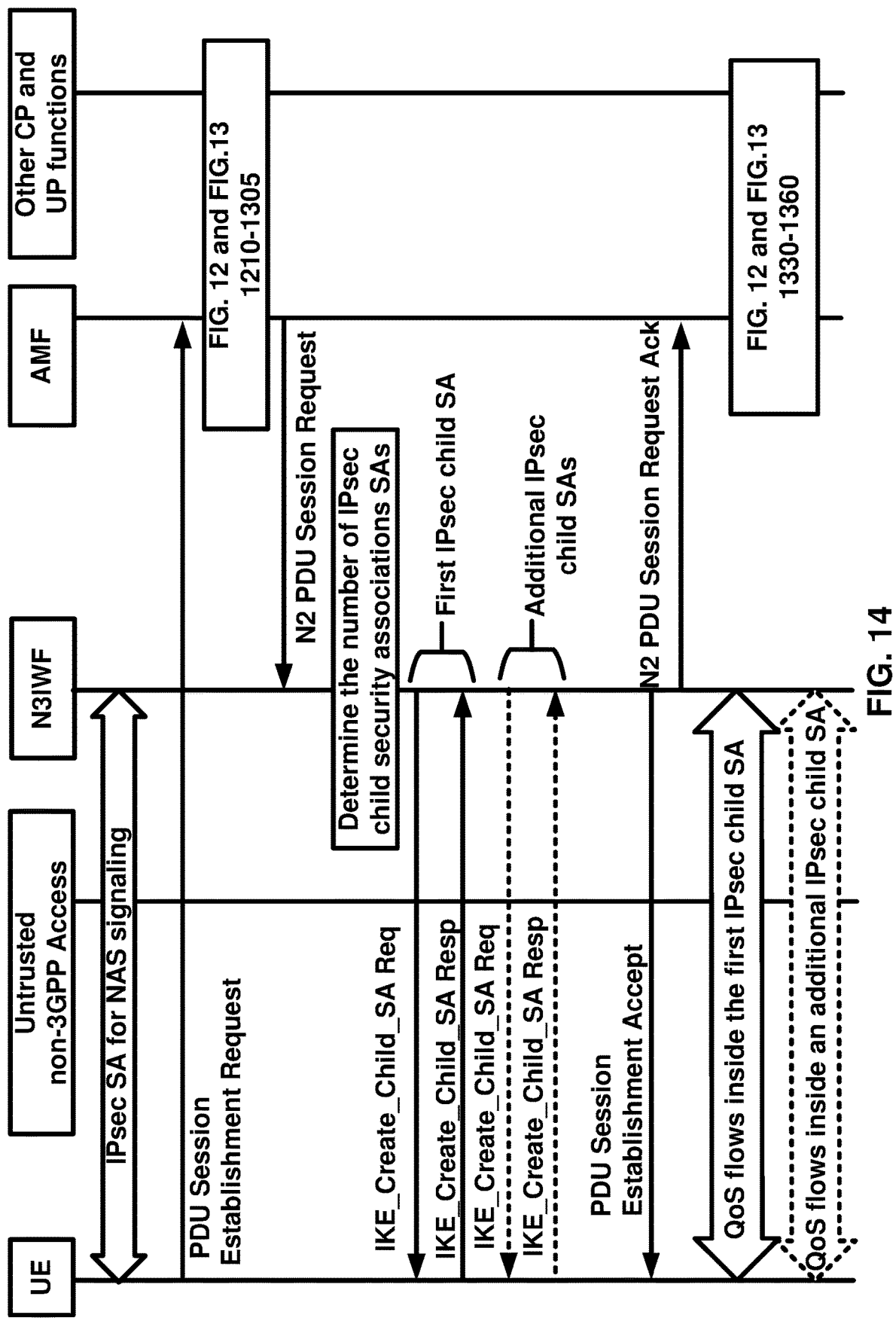
FIG. 14 is an example call flow as per an aspect of an embodiment of the present disclosure.

In an example embodiment as depicted in FIG. 14, a UE may establish a PDU session via untrusted non-3GPP access network such as WiFi, WLAN, and/or the like. In an example, the UE may send a PDU session establishment request message via an N3IWF to the AMF. The PDU session establishment request message may be sent via an IPsec security association (SA) for NAS signaling. The N3IWF may transparently forward the message to the AMF. In an example, the AMF may send an N2 PDU session request message to the N3IWF to establish the access resources for the PDU Session.

In an example embodiment, the N3IWF may determine the number of IPsec child SAs to establish and the QoS profiles associated with each IPsec child SA. In an example, the determination may be based on policies and configuration of the N3IWF, and/or based on the QoS profiles received via the N2 PDU session request message. In an example, the N3IWF may decide to establish one IPsec child SA and associate all QoS profiles with this IPsec child SA. In this case, all QoS Flows of the PDU Session may be transferred over one IPsec child SA.

In an example embodiment, the N3IWF may send to the UE an Internet key exchange (IKE) Create_Child_SA request (e.g., according to the IKEv2 specification in RFC 7296 [3] and/or the like) to establish a first IPsec child SA for the PDU session. In an example, the Create_Child_SA request may comprise a 3GPP-specific notify payload. In an example, the payload may comprise QFI(s) associated with the child SA, the identity of the PDU session associated with the child SA, a DSCP value associated with the child SA, and/or the like. If a DSCP value is included, then the UE and the N3IWF may mark all IP packets sent over this child SA with the DSCP value. The IKE Create_Child_SA request may further comprise the SA payload, the traffic selectors (TS) for the N3IWF and the UE, and/or the like. The IKE Create_Child_SA request may indicate that the requested IPsec child SA may operate in transport mode.

In an example embodiment, if the UE accepts the new IPsec child SA, the UE may send an IKE Create_Child_SA response (e.g., according to the IKEv2 specification in RFC 7296, and/or the like). During the IPsec child SA establishment, the UE may not be assigned an IP address. In an example, if the N3IWF determines to establish multiple IPsec child SAs for the PDU session, additional IPsec child SAs may be established and associated with one or more QoS profiles.

In an example embodiment, after IPsec child SAs are established, the N3IWF may forward to the UE via the IPsec SA for NAS signaling a PDU session establishment accept message.

In an example embodiment, the N3IWF may send to the AMF an N2 PDU session request acknowledgment.

In an example embodiment, when the UE has to transmit an UL PDU (e.g., uplink data), the UE may determine the QFI associated with the UL PDU (e.g., by using the QoS rules of the PDU session). In an example, the UE may encapsulate the UL PDU inside a generic routing encapsulation (GRE) packet and may forward the GRE packet to the N3IWF via the IPsec child SA associated with the QFI. The header of the GRE packet may carry the QFI associated with the UL PDU. In an example, when the N3IWF receives a DL PDU via N3, the N3IWF may employ the QFI and the identity of the PDU session in order to determine the IPsec child SA to use for sending the DL PDU to the UE (e.g., over an NWu interface, and/or the like). The N3IWK may encapsulate the DL PDU inside a GRE packet and may copy the QFI in the header of the GRE packet. The N3IWF may include in the GRE header a reflective QoS indicator (RQI), which may be used by the UE to enable reflective QoS.

Selective activation and deactivation of UP connection of existing PDU session: In an example embodiment, a UE may establish multiple PDU sessions. The activation of a UP connection of an existing PDU session may cause the activation of the UE-CN user plane connection (e.g., data radio bearer and N3 tunnel).

In an example, for the UE in the CM-IDLE state in 3GPP access, UE triggered and/or network triggered service request procedure may support (independent) activation of UP connection of an existing PDU session. For the UE in the CM-IDLE state in non-3GPP access, UE triggered service request procedure may allow re-activation of UP connection of existing PDU sessions, and may support (independent) activation of UP connection of an existing PDU session.

In an example, a UE in the CM-CONNECTED state may invoke a service request procedure to request activation of the UP connection of existing PDU session(s).

In an example, network triggered re-activation of UP connection of existing PDU sessions may be performed. In an example, if the UE CM state in the AMF is already CM-CONNECTED on the access (e.g., 3GPP, non-3GPP) associated to the PDU session in the SMF, the network may re-activate the UP connection of the PDU session using a network initiated service request procedure. In an example, if the UE is registered in both 3GPP and non-3GPP accesses and the UE CM state in the AMF is CM-IDLE in non-3GPP access, the UE may be paged or notified through the 3GPP access for a PDU session associated in the SMF (i.e. last routed) to the 3GPP access or to the non-3GPP access. If the UE CM state in the AMF is CM-IDLE in 3GPP access, the paging message may include the access type associated with the PDU session in the SMF. The UE, upon reception of the paging message containing an access type, may reply to the 5GC via the 3GPP access using a NAS service request message, which may comprise a list of PDU sessions associated with the received access type and whose UP connections may be re-activated over 3GPP (i.e. the list may not contain the PDU sessions whose UP connections may not be re-activated on 3GPP based on UE policies). If the PDU session for which the UE has been paged is in the list of the PDU sessions provided in the NAS service request, the 5GC may re-activate the PDU session UP connection over 3GPP access. If the UE CM state in the AMF is CM-CONNECTED in 3GPP access, the notification message may include the non-3GPP Access Type. The UE, upon reception of the notification message, may reply to the 5GC via the 3GPP access using the NAS service request message, which may contain a list of allowed PDU sessions that may be re-activated over 3GPP or an empty list of allowed PDU sessions if no PDU sessions are allowed to be re-activated over 3GPP access.

In an example embodiment, if the UE is registered in both 3GPP and non-3GPP accesses served by the same AMF and the UE connection management (CM) state in the AMF is CM-IDLE in 3GPP access and is in CM-CONNECTED in non 3GPP access, the UE may be notified through the non-3GPP for a PDU session associated in the SMF (i.e. last routed) to the 3GPP access. The notification message may include the 3GPP access type. Upon reception of the notification message, when 3GPP access is available, the UE may reply to the 5GC via the 3GPP access using the NAS service request message.

The deactivation of the UP connection of an existing PDU session may cause the corresponding data radio bearer and N3 tunnel to be deactivated. The UP connection of different PDU sessions may be deactivated independently when a UE is in CM-CONNECTED state in 3GPP access or non-3GPP access.

In an example embodiment, connection management procedure or non-3GPP access may apply. In an example, a UE that successfully establishes an NWu connection over an untrusted non-3GPP access may transition to CM-CONNECTED state for the untrusted non-3GPP access. In the case of untrusted non-3GPP access to 5GC, the NWu signalling may be released either as a result of an explicit deregistration procedure or an AN release procedure. In an example, the N3IWF may release the NWu signalling connection due to NWu connection failure, as determined by a dead peer detection mechanism e.g., in IKEv2 (defined in RFC 7296).

In the case of untrusted non-3GPP access, when the AMF releases the N2 interface, the N3IWF may release resources associated with the UE including the NWu connection with the UE. A release of the N2 connection by the AMF may set the CM state for the UE in the AMF to CM-IDLE.

In an example embodiment, UE reachability for a UE in CM-IDLE in non-3GPP may be applicable. If the states of a UE in the AMF are CM-IDLE and RM-REGISTERED for the non-3GPP access, there may be PDU sessions that were last routed over the non-3GPP access and/or without user plane resources. If the AMF receives a data notification with a non-3GPP access type indication from an SMF for a PDU session corresponding to a UE that is CM-IDLE for non-3GPP access, and the UE is registered over 3GPP access in the same PLMN as the one registered over non-3GPP access, a network triggered service request may be performed over the 3GPP access. In this case, the AMF may provide an indication that the procedure is related to pending down link data for non-3GPP access 5GS may support multi access packet data unit PDU sessions (MA PDU session). MA PDU sessions may simultaneously employ different access types such as 3GPP access technologies such as NG-RAN, new radio NR, E-UTRA, and/or the like, and/or non-3GPP or radio access technologies such as WLAN, NB-IoT, E-UTRA, NR, and/or the like. In an example, an NG-RAN node may be a gNB, providing NR user plane and control plane protocol terminations towards a wireless device (UE) and/or, an ng-eNB, providing E-UTRA user plane and control plane protocol terminations towards the UE. Access traffic steering, switching and splitting ATSSS may enable steering, switching and split of data traffic among accesses associated with an MA PDU session. The feature may provide enhanced continuity, efficient bandwidth usage and aggregation, improved performance, improved reliability, load balancing, and/or the like. Existing signaling mechanisms for MA PDU sessions and management of MA PDU sessions may result in increased communication failures, an increased packet loss rate, a longer communication delay when data transmission associated with the MA PDU sessions are initiated. Existing technologies for MA PDU session management may cause inefficient signaling between network nodes and may degrade reliability of communication network systems.

Example embodiments provide mechanisms for management of user plane resources and control plane signaling when ATSSS and MA PDU sessions are employed. Example embodiments provide mechanisms for a user plane network element to report events related to a MA PDU session to a control plane network element for session management, session activation, session deactivation, usage reporting, charging, measurement reporting, traffic detection, and/or the like.

In an example the MA PDU session feature may be employed for management of applications. In an example, an MA PDU session may be employed to steer, split, switch traffic for application signaling and application data (e.g., media files). In an example, application signaling may be transmitted via a first child session associated to a first access network and user data (e.g., media traffic) may be transmitted via a second child session associated with a second access network.

In an example, an MA PDU session may be employed for a case where a first child session of an MA PDU session may employ control plane data transmission (e.g., CIoT data transmission, CIoT control plane optimization, and/or the like) and a second child session the MA PDU session may employ user plane resources and/or employ user plane optimization (e.g., CIoT user plane optimization, and/or the like.)

In an example embodiment, access traffic steering, switching and splitting may be employed by the 5GS. In an example, access traffic steering may be a procedure that may select one or more access network(s) for a new data flow and may transfer the traffic of the data flow over the selected one or more access network(s). Access traffic steering may be applicable between 3GPP and non-3GPP accesses, and/or among different radio access technologies (RAT). In an example, access traffic switching may be a procedure that moves traffic of an ongoing data flow from one access network to another access network in a way that may maintain continuity of the data flow. In an example, access traffic switching may be applicable between 3GPP and non-3GPP accesses and/or among different RATs. In an example, access traffic splitting may be a procedure that may split the traffic of a data flow across multiple access networks. When traffic splitting is applied to a data flow, some traffic of the data flow may be transferred via one access and some other traffic of the same data flow may be transferred via another access. Access traffic splitting may be applicable between 3GPP and non-3GPP accesses and/or among different RATs.

In an example, a multi access PDU session (MA PDU session) may be a PDU session whose traffic may be sent over 3GPP access, or over non-3GPP access, or over both accesses and/or over one or more RATs.

In an example embodiment, an MA PDU session may be identified by a MA PDU session ID, a PDU session ID, an MA PDU capability flag, access information, and/or the like.

In an example, access information may comprise access type (e.g., 3GPP access, non-3GPP access, and/or the like), RAT information (e.g., E-UTRA, NR, WLAN, NB-IoT, cell identifier, access identifier, and/or the like). In an example, access information may be network instance, or an information element indicating access type, RAT, access point identifier, access network identifier, cell identifier, tunneling information, and/or the like.

In an example embodiment, different steering modes may be applied for a MA PDU session. The steering modes may be applied in a MA-PDU session by enforcing an appropriate ATSSS policy for the MA-PDU session. For example, during the establishment of an MA-PDU session, the PCF in the network may create the ATSSS policy for the MA-PDU, which may be transferred to the UE for uplink traffic steering and to a UPF for downlink traffic steering. The ATSSS policy may include a prioritized list of ATSSS rules and each ATSSS rule may include a steering mode that may be applied to the traffic matching this rule. An example FIG. 18 depicts ATSSS policy. In the example FIG. 18, the first ATSSS rule may steers the traffic of App-X to 3GPP access, if available; if not available, it may steer the traffic to non-3GPP access. The second ATSSS rule may steer the TCP traffic with destination IP address 10.10.0.1 to 3GPP access only. Since no standby access is defined, this traffic may not be transferred over non-3GPP access, even when the 3GPP access becomes unavailable. The default ATSSS rule may steer the rest of the traffic to non-3GPP, if available; if not available, it may be steered to 3GPP access.

In an example embodiment, different steering modes may be applied. In an example, an active-standby steering may be employed. In active-standby steering, all (or some of) the traffic of the MA-PDU session may be sent to one access only, which is called the active access. The other access may serve as a standby access and may take traffic when the active access becomes unavailable. When the active access becomes available, the traffic may be transferred to the active access. The active access may be defined when the MA-PDU session is established and may remain the same during the lifetime of the MA-PDU session or may change during the lifetime of the MA-PDU session.

In an example embodiment, a priority-based steering may be employed. The two accesses may be assigned a priority, e.g. during the establishment of the MA-PDU session. All traffic (or some) of the MA-PDU session may be sent to the high priority access. When congestion arises on the high priority access, new data flows (e.g., the overflow traffic) may be sent to the low priority access. When the high priority access becomes unavailable, traffic may be switched to the low priority access. It may be possible to change the priorities of the accesses during the lifetime of the MA-PDU session.

In an example embodiment, best-access steering method may be employed. The high priority access may be the one that may provide the best performance, e.g. the one with the smallest round trip time (RTT). In this case, the high priority access may not be pre-defined (as in Priority-based steering) but it may be estimated and may change.

In an example embodiment, in redundant steering mode all (or some) data flows may be transmitted on both accesses.

In an example embodiment, in load-balance steering mode, each access may receive a percentage of the data flows transmitted via the MA-PDU session. Each access may be assigned a weight factor (e.g. 50%, 80%, and/or the like) and may receive a percentage of the MA-PDU session traffic corresponding to this factor. As an example, in a 50/50

(50%) load-balancing, the overall traffic of the MA-PDU session is equally split across the two accesses. In an 80/20 load-balancing, about 80% of the overall traffic may be sent on one access and 20% on the other access.

Figure 19:
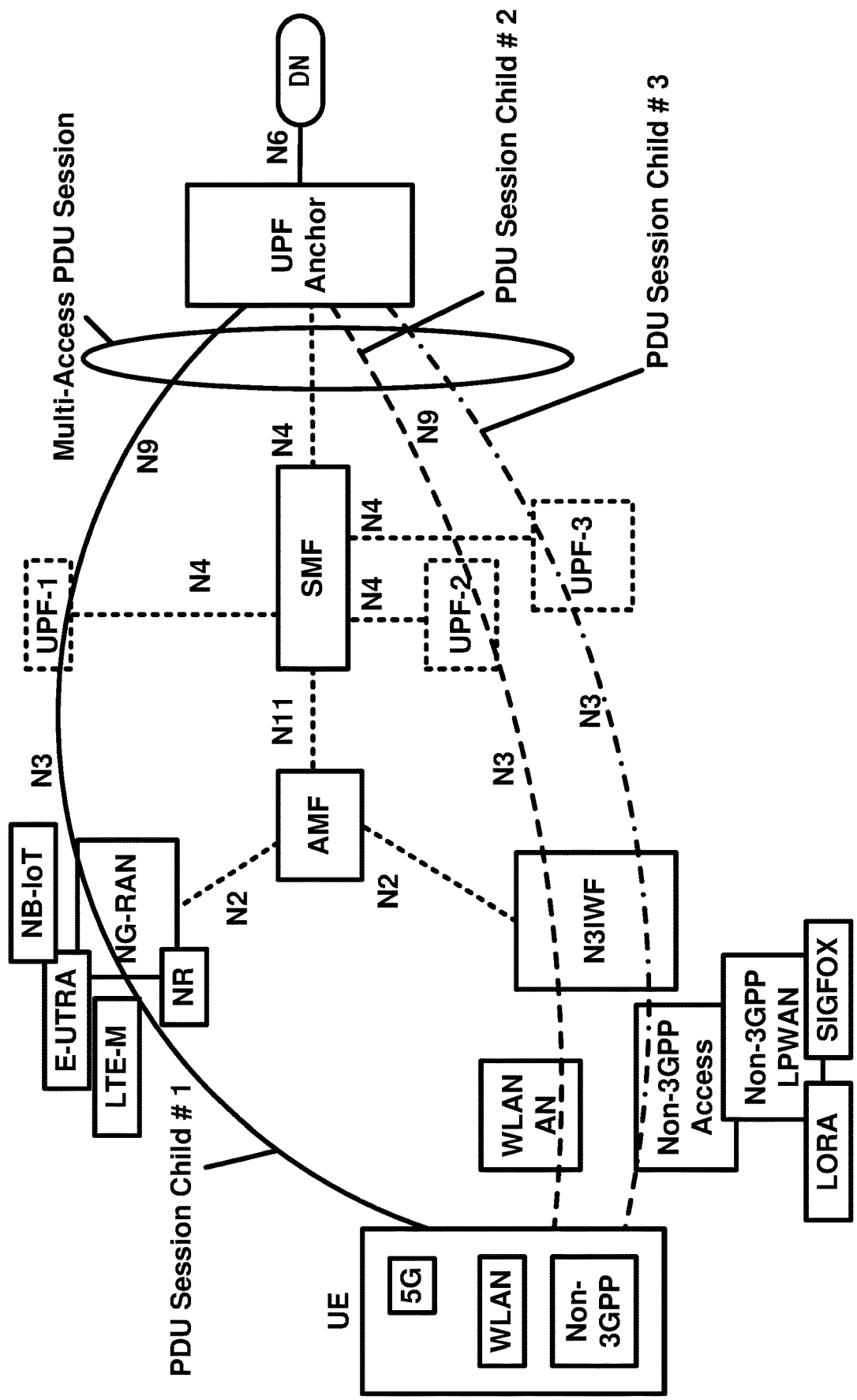
FIG. 19 is an example call flow as per an aspect of an embodiment of the present disclosure.
Figure 20:
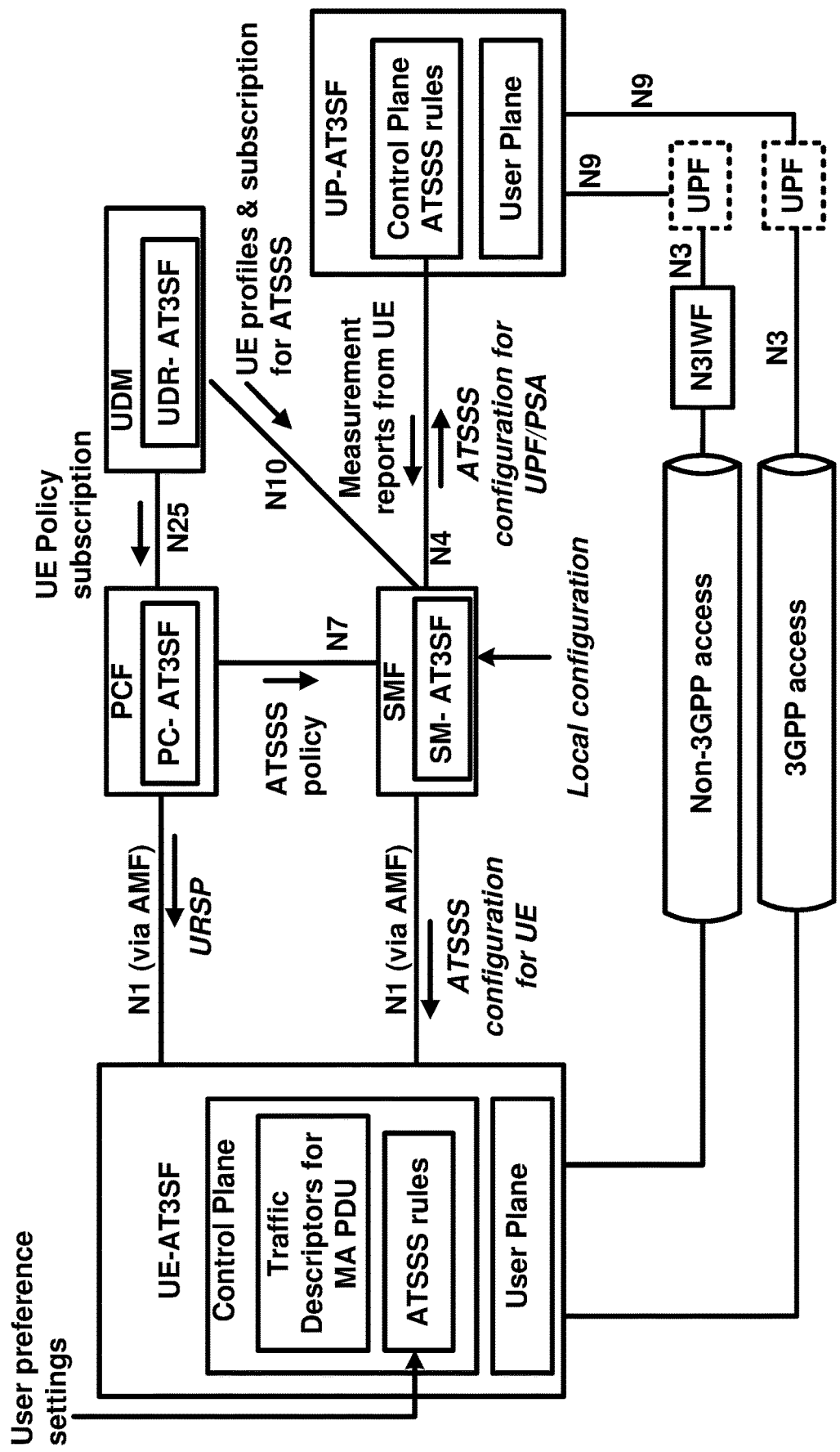
FIG. 20 is an example call flow as per an aspect of an embodiment of the present disclosure.
Figure 21:
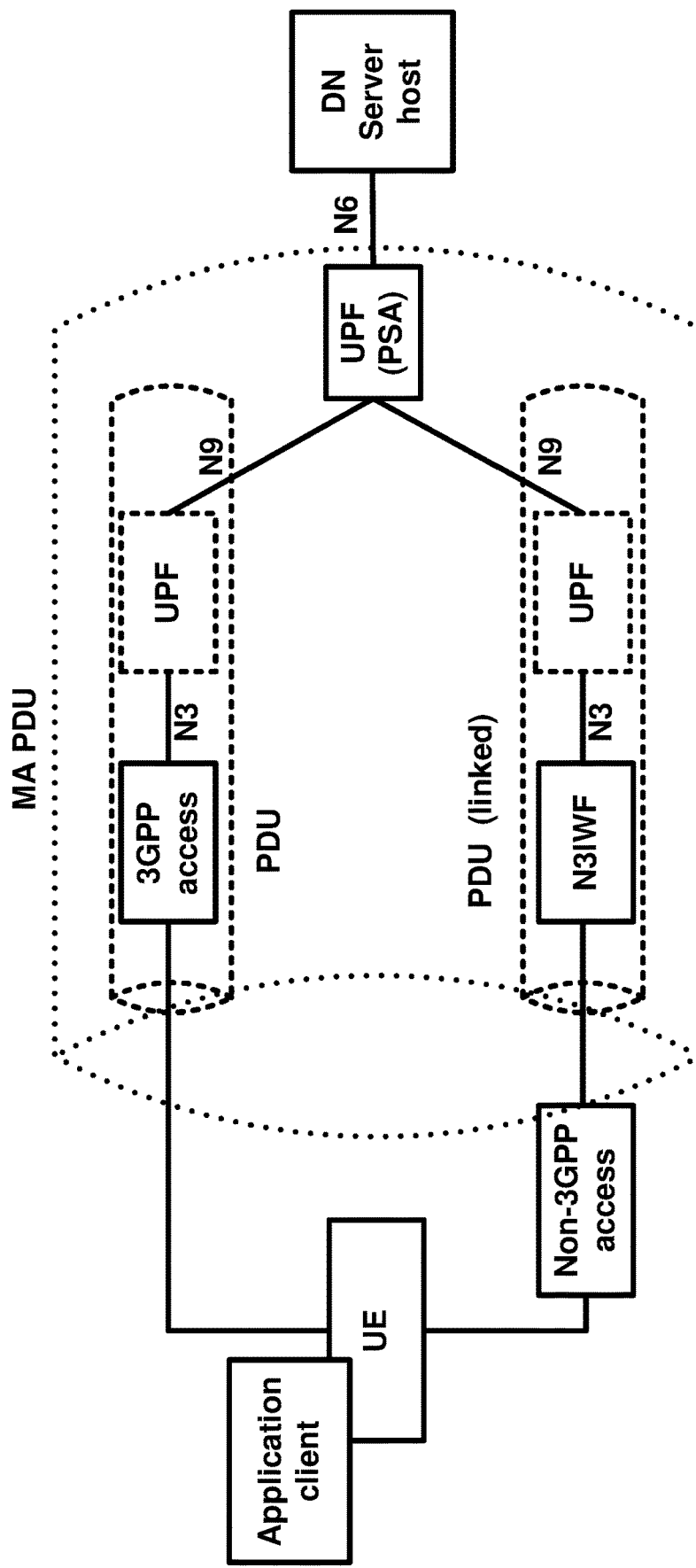
FIG. 21 is an example call flow as per an aspect of an embodiment of the present disclosure.

An example FIG. 19 depicts a MA PDU session with three child sessions (e.g., sub-PDU sessions, child PDU sessions). An MA-PDU session may be created by bundling together two or more separate PDU sessions, which may be established over different accesses or RATs. An MA-PDU session may comprise one, two or more PDU sessions (or sub-PDU sessions), referred to as child PDU sessions; some established over 3GPP access and the others established over untrusted non-3GPP access (e.g. a WLAN AN).

The child PDU sessions of a MA-PDU session may share a common DNN, a common UPF anchor (UPF-A), a common PDU type (e.g. IPv6), a common IP address(es), a common SSC mode, a common S-NSSAI and/or the like. An MA-PDU session may be deployed via a multi-path data link between a UE and an anchor UPF-A, as depicted in FIG. 19.

In an example, an MA-PDU session may be established with separate PDU session establishment procedures; one of each child PDU session, e.g., separate establishment.

In an example, an MA-PDU session may be established with a single MA-PDU session establishment procedure, where the child PDU sessions may be established in parallel, e.g., combined establishment.

Figure 22:
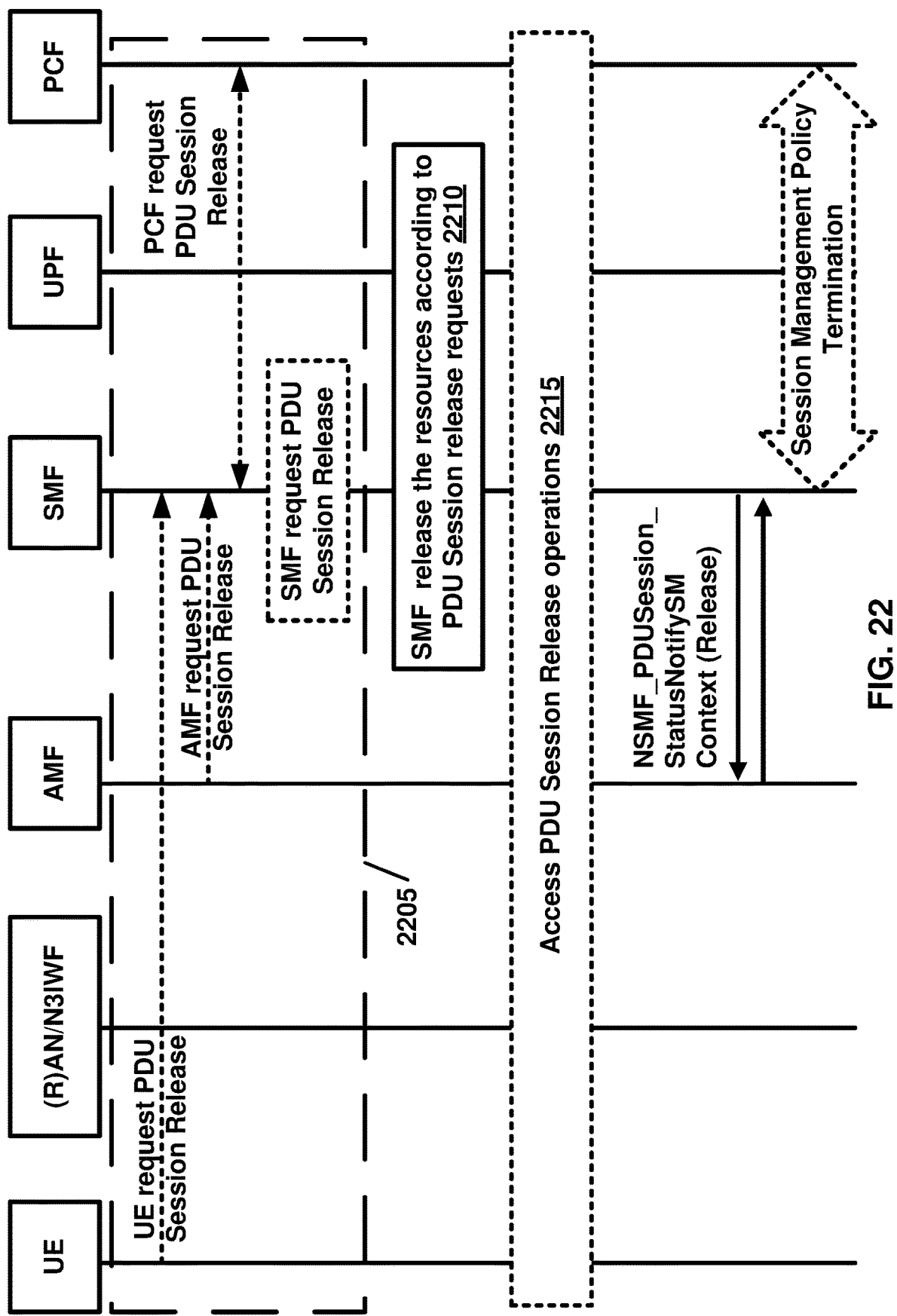
FIG. 22 is an example call flow as per an aspect of an embodiment of the present disclosure.
Figure 23:
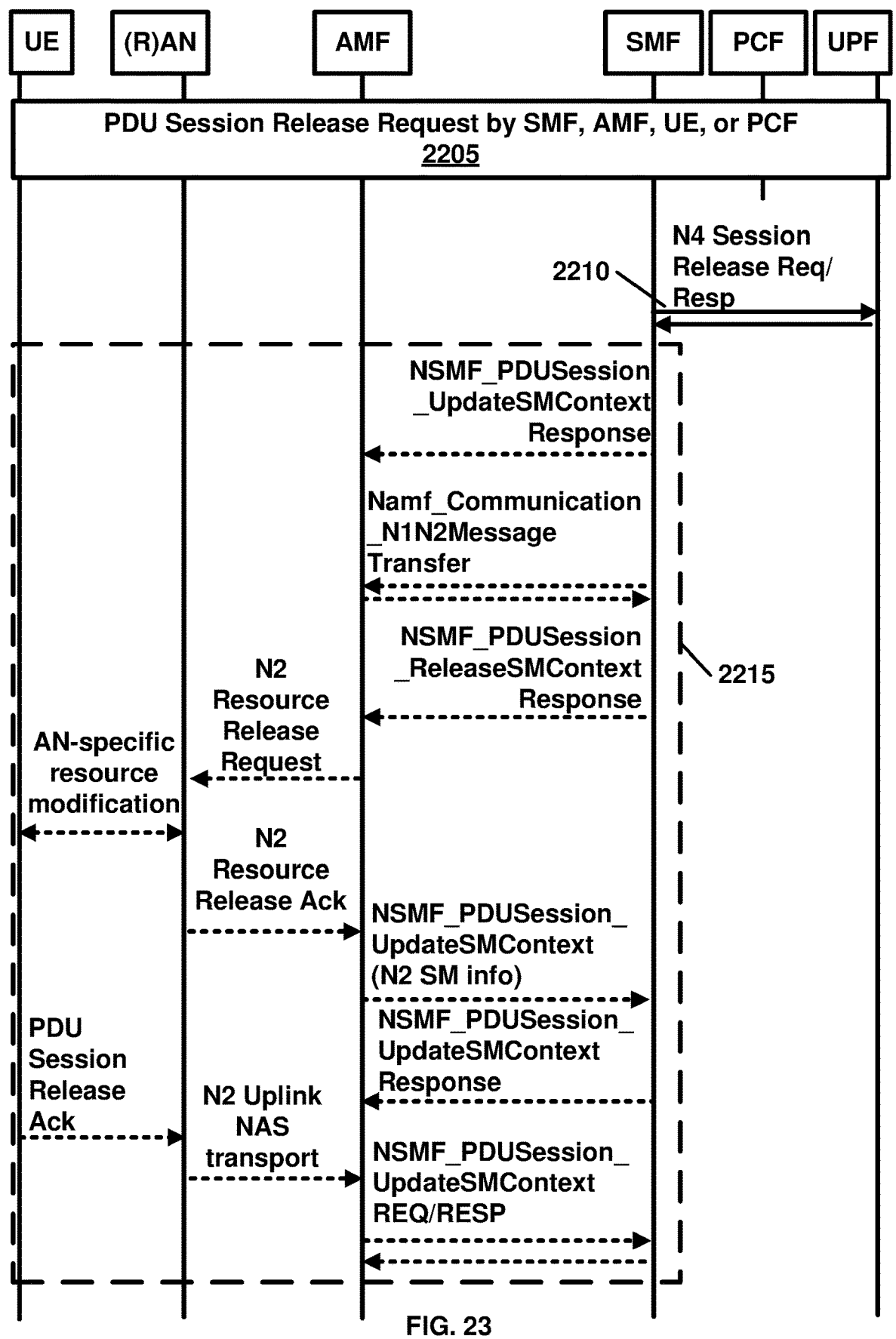
FIG. 23 is an example call flow as per an aspect of an embodiment of the present disclosure.
Figure 24:
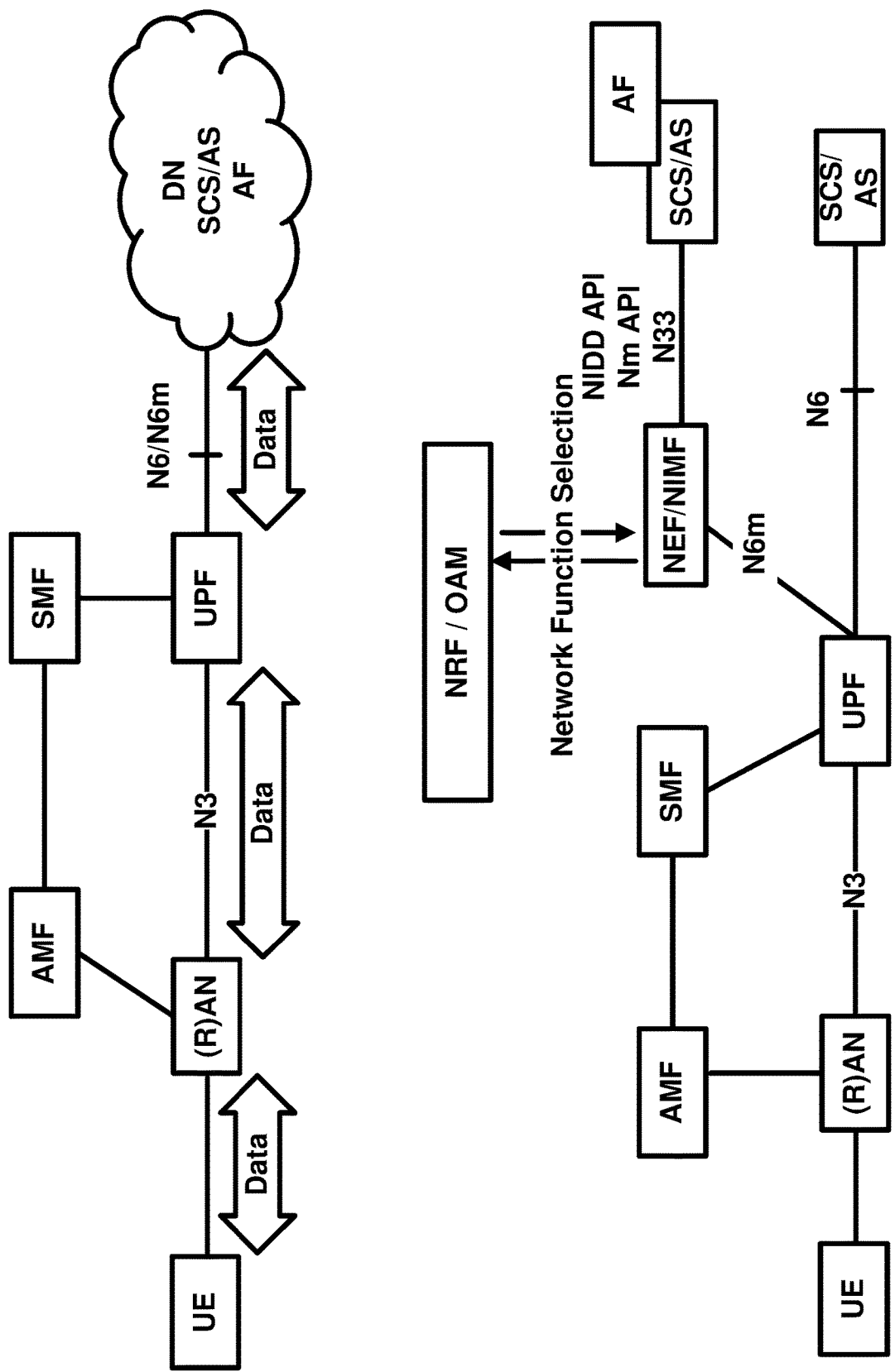
FIG. 24 is an example call flow as per an aspect of an embodiment of the present disclosure.

In an example, a UE may determine to establish a MA PDU session based on configured policy in the UE that may indicate whether multi-access is preferred when a PDU session is triggered;

Example FIG. 22 and FIG. 23 depict MA PDU session release procedure. The MA-PDU session release procedure may triggered by a UE request, an AMF request, a PCF request, an SMF request, and/or the like. MA PDU session release requests by UE or by Network may indicate which PDU Session ID (e.g., MA PDU session ID) on which access type or RAT within an MA-PDU session may be released. Access type may indicate whether the MA-PDU session release procedure applies to the 3GPP access, to the non-3GPP access, or to both accesses and/or to one or more RATs. In case of both accesses or all RATs, all resources of the MA PDU session may be released.

In an example embodiment, a UE may initiate a UE requested PDU session release procedure by the transmission of an NAS message (N1 SM container (PDU Session Release Request (MA PDU session ID, access information)), MA PDU session ID, access information) message. A RAN may send the NAS message to an AMF with an indication of user location information. The NAS message may be relayed to a SMF corresponding to the MA PDU session ID via N2 and the AMF. The AMF may invoke the Nsmf_PDUSession_UpdateSMContext service operation and provides the N1 SM container to the SMF together with user location information (ULI) received from the (R)AN.

In an example embodiment, the MA PDU session release may be initiated by a PCF. The PCF may invoke a session management policy termination procedure to request the release of the MA PDU Session.

In an example embodiment, the MA PDU session release may be initiated by an AMF. The AMF may invoke a Nsmf_PDUSession_ReleaseSMContext service operation to request the release of the MA PDU Session.

In an example embodiment, the MA PDU session release may be initiated by a SMF. The SMF may decide to release a PDU session based on a request from a DN (e.g., cancelling the UE authorization to access to the DN), based on a request from the UDM (subscription change) or from the OCS, if the SMF received an event notification from the AMF that the UE is out of LADN service area, based on locally configured policy (e.g. the release procedure may be related with the UPF re-allocation for SSC mode 2/mode 3), if the SMF receives a trigger (e.g., from the AMF, UE, PCF, and/or the like), and/or the like.

In an example embodiment, the SMF may release the IP address/Prefix(es) that were allocated to the MA PDU session and may release the corresponding user plane resources. In an example, the SMF may send an N4 session release request (N4 Session ID, access information) message to the UPF(s) of the MA PDU session. The UPF(s) may drop any remaining packets of the PDU session and may release tunnel resource and contexts associated with the N4 session or resources associated with the child session associated with the MA PDU session identified by the N4 session id and the access information. In an example, the UPF(s) may acknowledge the N4 session release request by transmission of an N4 session release response (N4 Session ID, access information) message to the SMF. In an example, the N4 session release response may indicate an acknowledgment for release of resources for a child session of a MA PDU session. In an example, a unique identifier of a child session may be employed to identify a child session of a MA PDU session.

In an example embodiment, if the MA PDU session release is initiated by the PCF and SMF, and the SMF has been notified by the AMF that UE is unreachable, e.g. due to the UE is in MICO mode or periodical registration failure, the SMF may notify the AMF that the PDU session is released by invoking an Nsmf_PDUSession_StatusNotify SM Context. In an example, the SMF may create an N1 SM including PDU session release command message (comprising: MA PDU session ID, access information, cause, and/or the like). The cause may indicate a trigger to establish a new MA PDU session with the same characteristics.

In an example embodiment, when the PDU session release is initiated by the UE, the SMF may respond to the AMF with a Nsmf_PDUSession_UpdateSMContext response (N2 SM Resource Release request, N1 SM container (PDU session release command, or MA PDU session release command)). In an example, if the PDU session release is initiated by the SMF, the SMF may invoke a Namf_Communication_N1N2MessageTransfer service operation (N1 SM container (MA PDU session release command or PDU session release command). In an example, if the UP connection of the PDU session (e.g., MA PDU session) is active, the SMF may include the N2 resource release request (MA PDU Session ID, or PDU Session ID) in the Namf_Communication_N1N2MessageTransfer, to release the (R)AN resources associated with the PDU Session (e.g., MA PDU session). In an example, a skip indicator may be employed to indicate to the AMF whether it may skip sending the N1 SM container to the UE (e.g. when the UE is in CM-IDLE state). The SMF may include the skip indicator in the Namf_Communication_N1N2MessageTransfer. In an example, if the UE is in CM-IDLE state and skip indicator is included in the Namf_Communication_N1N2MessageTransfer service operation, the AMF may send a Namf_Communication_N1N2MessageTransfer Response message (e.g., indicating N1 SM Message Not Transferred) to SMF.

In an example, when the MA PDU session release is initiated by the AMF (i.e. the SMF received the Nsmf_P-

DUSession_ReleaseSMContext request from the AMF), the SMF may respond to the AMF with the Nsmf_PDUSession_ReleaseSMContext response. If the MA PDU session release is triggered due to a mismatch of the MA PDU session status between UE and the AMF, the AMF and the SMF may remove contexts (including the MA PDU Session ID, or PDU Session ID) associated with the MA PDU session which are indicated as released at the UE. The AMF and SMF may remove event subscriptions on the AMF by the SMF.

In an example, if the MA PDU session release is triggered due to change of the set of network slices for a UE, the SMF may release the MA PDU session associated with the network slice instance that is no longer available.

In an example, if the UE is in CM-IDLE state and the skip indicator is not included, the AMF may initiate a network triggered service request procedure to transmit the NAS message (MA PDU Session ID, N1 SM container) to the UE.

In an example, if the UE is in CM-CONNECTED state, then the AMF may transfer the SM information received from the SMF (e.g., N2 SM resource release request, N1 SM container) to the (R)AN.

In an example, when the (R)AN has received an N2 SM request to release the AN resources associated with the PDU Session (e.g., MA PDU session), it may issue an AN specific signalling exchange(s) with the UE to release the corresponding AN resources. In the case of a NG-RAN, an RRC connection reconfiguration may take place with the UE releasing the NG-RAN resources related to the MA PDU session. In an example, the (R)AN may send NAS message (N1 SM container (PDU Session Release Command, or MA PDU Session Release Command)) received from the AMF.

In an example, if the (R)AN had received a N2 SM request to release the AN resources, the (R)AN may acknowledge the N2 SM resource release request by sending an N2 SM resource release ack (user location information) message to the AMF.

In an example, the AMF may invoke the Nsmf_PDUSession_UpdateSMContext (N2 SM resource release ack, user location information) to the SMF.

In an example, the SMF may respond to the AMF with a Nsmf_PDUSession_UpdateSMContext response.

In an example, the UE may acknowledge the MA PDU session release command by sending a NAS message (MA PDU session ID, or PDU Session ID, N1 SM container (PDU Session Release Ack)) message over the (R)AN.

In an example, the (R)AN may forwards the NAS message from the UE by sending a N2 NAS uplink transport (NAS message (PDU Session ID, N1 SM container (PDU Session Release Ack)), User Location Information) to the AMF.

In an example, the AMF may invoke the Nsmf_PDUSession_UpdateSMContext (N1 SM container (PDU Session Release Ack, User Location Information) to the SMF.

In an example, the SMF may respond to the AMF with a Nsmf_PDUSession_UpdateSMContext response.

In an example, the SMF may invoke Nsmf_PDUSession_StatusNotify to notify the AMF that the SM context for the PDU session is released. The AMF may release the association between the SMF ID and the PDU Session ID (or MA PDU session id), DNN, S-NSSAI, and/or the like.

In an example, if Dynamic PCC applied to the session (e.g., PDU session, or MA PDU session), the SMF may invoke a session management policy termination procedure to delete the PDU Session.

In an example, the SMF may notify entities that have subscribed to user location information related with MA PDU session change.

In an example, if it is the last PDU Session the SMF is handling for the UE for the associated (DNN, S-NSSAI), the SMF may unsubscribes from session management subscription data changes notification with the UDM via a Nudm_SDM_Unsubscribe (SUPI, DNN, S-NSSAI) service operation. The UDM may unsubscribe the subscription notification from UDR by Nudr_DM_Unsubscribe (SUPI, Subscription Data, Session Management Subscription data, DNN, S-NSSAI).

In an example, the SMF may invoke the Nudm_UECM_Deregistration service operation including the SMF address, the DNN and the PDU Session Id (or MA PDU session ID). The UDM may remove the association it had stored between the SMF identity, SMF address and the associated DNN and PDU Session Id. The UDM may update this information by Nudr_DM_Update (SUPI, Subscription Data, UE context in SMF data).

Figure 17:
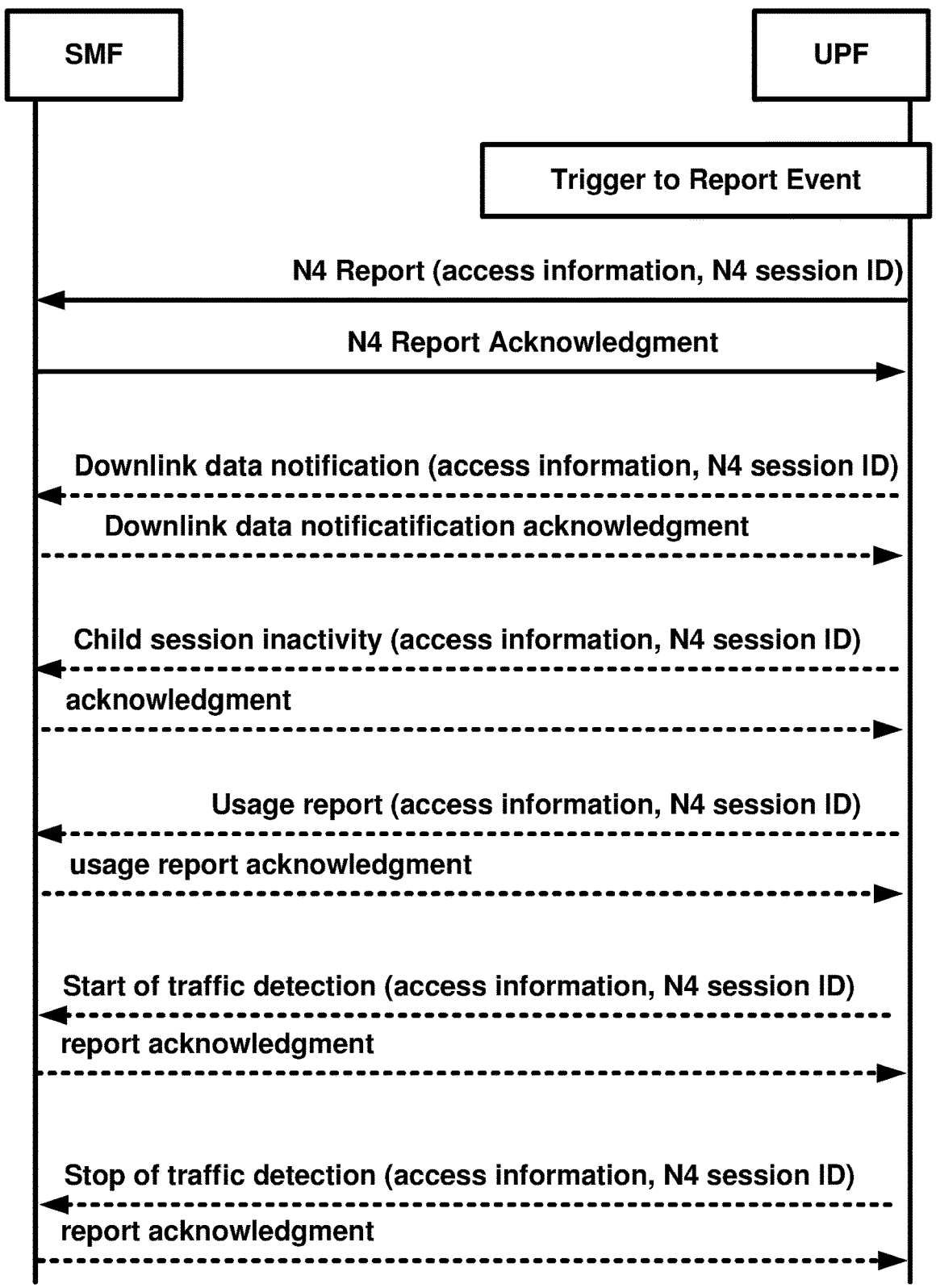
FIG. 17 is an example call flow as per an aspect of an embodiment of the present disclosure.

In an example embodiment as depicted in FIG. 17, an N4 reporting (e.g., an N4 session level reporting) procedure may be employed by a UPF to report events related to a child session of an MA PDU session, and/or an N4 session for an MA PDU session. The triggers for event reporting may be configured on the UPF during N4 session establishment/modification procedures by the SMF.

In an example, the UPF may trigger the N4 reporting to report usage information. Usage information may be collected by the UPF and reported to the SMF.

In an example, the SMF may support interfaces towards OCS/OFCS and PCF. The SMF may interact with OCS/OFCS and PCF based on information received from other control plane NFs and user plane related information received from the UPF. The SMF may store QoS Flow level, child session level, MA PDU session level, PDU Session level and subscriber related information. The SMF may request usage information from the UPF for a child session associated with an MA PDU session. In an example, the access information of the child session may be provided to the UPF by the SMF.

In an example embodiment, PCC rules (e.g., received from the PCF or preconfigured information available at the SMF, and/or from the OCS for online charging via Credit-Control session mechanisms, and/or the like) may trigger the SMF to provide usage reporting rules to the UPF for controlling how usage reporting may be performed. The SMF may request the report of relevant usage information for usage monitoring, based on monitoring keys and triggers. Usage reporting rule requested for usage monitoring control may comprise a list of traffic flows for UPF whose traffic is to be accounted under the rule. The SMF may use monitoring-key (e.g., preconfigured and/or received from the PCF) within the PCC rule in order to generate the list and may keep the mapping between them.

In an example, the SMF may request the report of the relevant usage information for offline and online charging, based on rating groups and triggers. Usage reporting rule requested for offline or online charging may comprise a list of traffic flows for the UPF whose traffic is to be accounted under this rule. The SMF may use rating group or sponsor identity (e.g., preconfigured and/or provided by PCF and/or OCS) and the PCC rule in order to generate this list and may store the mapping between them.

In an example, the SMF function may provide reporting trigger events to the UPF for when to report usage information. The reporting trigger events (e.g. triggers, threshold information etc.) may be supported for the MA PDU session level, PDU session level, child session level reporting, and/or on rule level basis as determined by the SMF. The triggers may be provided as a volume, time or event to cater for the different charging/usage monitoring models that are supported for usage monitoring and for offline and online charging. The SMF may decide on the thresholds value(s) based on allowance received from PCF, OCS or based on local configuration.

In an example, the UPF may support reporting of usage information to the SMF. The UPF may support reporting based on different triggers e.g., periodic reporting with period defined by the SMF, usage thresholds provided by the SMF, report on demand received from the SMF, and/or the like. In an example, the reporting of usage information message may comprise an N4 session id, access information, a child session id (e.g., a unique identifier of a child session), and/or the like. In an example, the reporting of usage information message may be an N4 report message. In an example, the N4 report message may comprise an N4 session identifier associated with the MA PDU session, access information associated with the child session, a list of reporting trigger, measurement information and/or the like. In an example, the reporting trigger parameter may comprise a name of the event which triggered the report. The measurement information parameter may comprise the information that the SMF requested to be informed about. In an example, the SMF may identify the N4 session context based on the received N4 session ID and may apply the reported information for the corresponding MA PDU session (or PDU session). The SMF may respond with an N4 report ACK message.

In an example, the SMF may determine the granularity levels required by the reporting keys in the usage reporting rules. The granularity level or aggregation levels may be based on child session level, MA PDU session level, PDU session level reporting, traffic flow (for both charging and usage monitoring) level reporting as defined by the reporting keys in the Usage Reporting Rule, and/or the like.

In an example, the SMF may combine the reported information with session and subscriber related information which may be available at the SMF, for usage monitoring reporting over a corresponding Npcf interface (e.g., an N7 reference point). In an example, the SMF may combine the reported information based on a mapping between Monitoring-key and PCC rule stored at the SMF, Based on the mapping between rating group or sponsor identity and PCC rule stored at the SMF, the SMF may combine the reported information with session and subscriber related information which may be available at the SMF, for offline and online charging reporting over the corresponding charging interfaces.

In an example, the 5GC charging may support collection and reporting of charging information for network resource usage. The SMF may support the interactions towards the charging system. The UPF may support functionality to collect and report usage data to the SMF. The N4 reference point may support the SMF control of the UPF collection and reporting of usage data.

In an example FIG. 17, the UPF may trigger the N4 reporting to report start of traffic detection. When traffic detection is requested by the SMF and the start of traffic is detected for a packet detection rule (PDR), the UPF may report the start of traffic detection to the SMF and indicate the corresponding PDR rule ID. A PDR may contain information required to classify a packet arriving at a UP function, e.g. a UPF, TDF-U, a PGW-U or an SGW-U, and/or the like. The PDR may contain packet detection information such as access information for a child session of a MA PDU session, source information, service data flow filter, application identity, and/or the like. In an example, the N4 report message may comprise an N4 session identifier associated with the MA PDU session, access information associated with the child session, a list of reporting trigger, measurement information and/or the like. In an example, the reporting trigger parameter may comprise a name of the event which triggered the report. The measurement information parameter may comprise the information that the SMF requested to be informed about. In an example, the SMF may identify the N4 session context based on the received N4 session ID and may apply the reported information for the corresponding MA PDU session (or PDU session). The SMF may respond with an N4 report ACK message.

In an example FIG. 17, the UPF may trigger the N4 reporting to report stop of traffic detection. When traffic detection is requested by the SMF and end of traffic is detected for a packet detection rule (PDR), the UPF may report the stop of traffic detection to the SMF and indicate the corresponding PDR rule ID. The PDR may contain packet detection information such as access information for a child session of a MA PDU session, source information, service data flow filter, application identity, and/or the like.

In an example, the SMF may provide information to a UP function (e.g., UPF) about how to detect user data traffic belonging to a PDR. In an example, the SMF may provide information to a UPF indicating how the UPF function may treat a packet that matches a detection information. The SMF may controls the traffic detection at the UPF function by providing detection information for every PDR. As an example, for IPv4 or IPv6 or IPv4v6 PDU session type (or a child session of a MA PDU session and/or a MA PDU session), detection information may comprise: an access information, a CN tunnel info, a network function instance, a QFI, an IP packet filter set, an application identifier, and/or the like. The application identifier may be an index to a set of application detection rules configured in UPF.

In an example, for Ethernet PDU Session type, detection information may comprise: an access information, a CN tunnel info, a network instance, QFI, Ethernet Packet Filter Set, and/or the like.

Traffic detection information sent by the SMF to the UPF for a PDU Session may be associated with network instance for detection and routing of traffic over N6.

Figure 15:
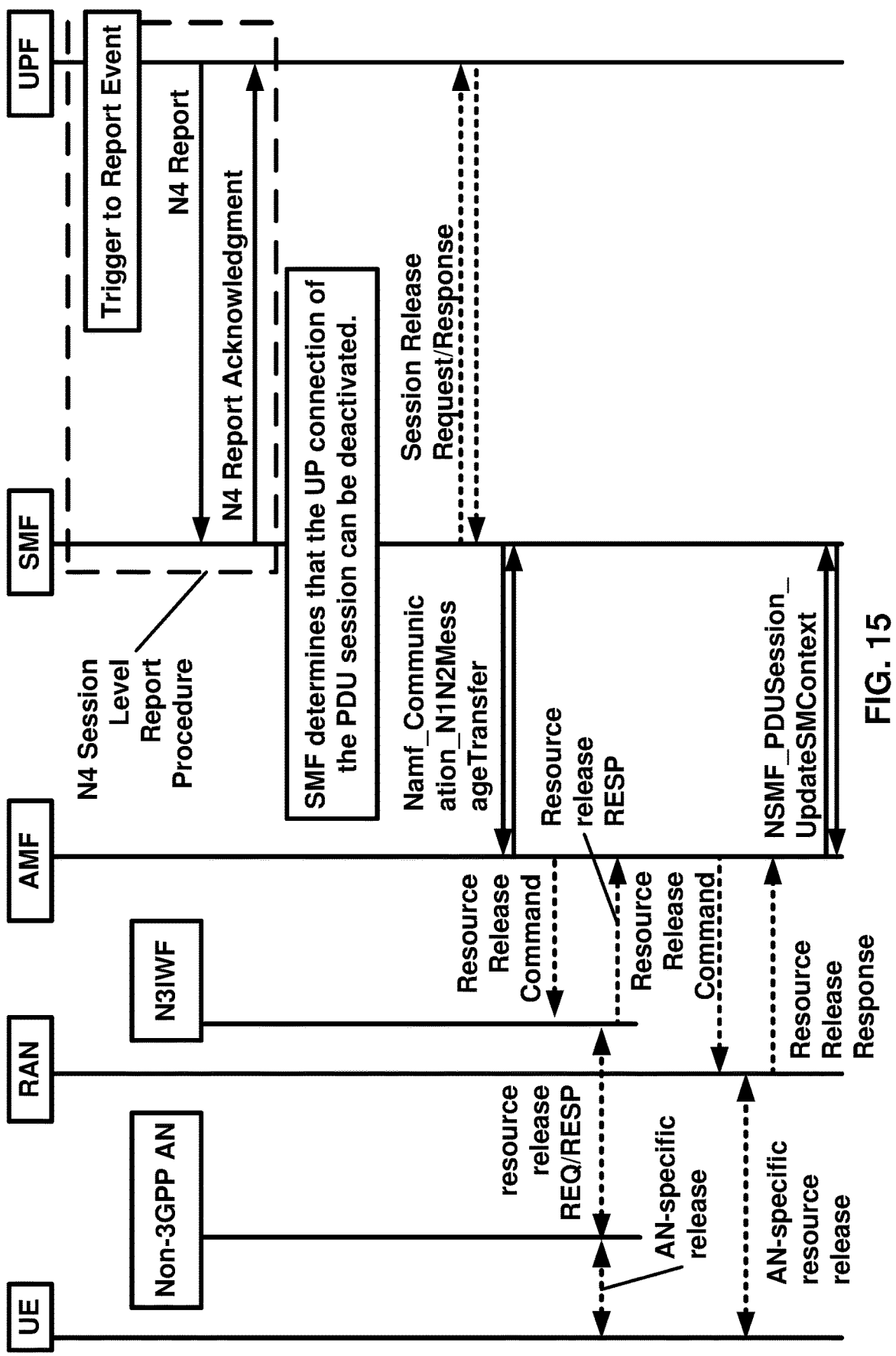
FIG. 15 is an example call flow as per an aspect of an embodiment of the present disclosure.

As depicted in example FIG. 15 and FIG. 17, the UPF may trigger an N4 reporting to report detection of child session inactivity, MA PDU session inactivity and/or PDU session inactivity for a specified period. In an example, the specified period may be determined based on an inactivity timer. When the inactivity timer for a child session, or MA PDU session is provided by the SMF during N4 session establishment/modification procedure, and the UPF detects the child session and/or the MA PDU session has no data transfer for a period specified by the inactivity timer, the UPF may report child session inactivity or MA PDU session inactivity to the SMF via an N4 report message.

In an example, the N4 report message may comprise an N4 session identifier associated with the MA PDU session (e.g., an N4 session id), access information associated with the child session, a list of reporting trigger, measurement information and/or the like.

In an example embodiment, the access information may comprise at least one of a radio access technology (RAT) information element indicating at least one of evolved universal terrestrial radio access (E-UTRA), next generation E-UTRA (NG E-UTRA), new radio (NR), long term evolution for machines (LTE-M), narrowband internet of things (NB-IoT), wireless local area network (WLAN), and/or the like. In an example, the access information may comprise at least one of an access type information element indicating at least one of 3GPP access type, or Non-3GPP access type.

In an example, the reporting trigger parameter may comprise a name of the event which triggered the report. The measurement information parameter may comprise the information that the SMF requested to be informed about.

In an example embodiment, the SMF may receive by the UPF, a first message reporting an event indicating inactivity of a child session of a multi access packet data unit (MA PDU) session. The first message may comprise access information of the child session, the identifier of the N4 session associated with the MA PDU session, and/or the like. In an example, the first message may be the N4 report message.

In an example, the SMF may determine to deactivate the child session in response to receiving the first message or the N4 report message. In an example, the determining may be based on the elements of the first message, the N4 report message, the inactivity timer, and/or the like.

In an example, the SMF may derive and/or determine an identifier of the MA PDU session associated with the child session, e.g., an MA PDU session id. In an example, the SMF may identify a set of parameters associated with the N4 session corresponding to the MA PDU session. In an example, the SMF may identify the N4 session context based on the N4 session id received via the first message and may apply the reported information for the corresponding MA PDU session (or PDU session). The SMF may respond with an N4 report acknowledgment message.

In an example, a session context (e.g., the N4 session context) may comprises session related parameters (e.g., N4 session id, the set of parameters associated with the N4 session corresponding to the MA PDU session, and/or the like), packet detection rules PDRs, usage reporting rules URRs, QoS enforcement rules, QERs, forwarding action rules FARs, and/or the like associated with the N4 Session id. In an example, the PDR may comprise information required to classify a packet arriving at the UPF. The PDR may be employed to detect packets in a certain transmission direction, e.g. UL direction or DL direction. In an example, the QER may define how a packet may be treated in terms of bit rate limitation and/or packet marking for QoS purposes. In an example, the URR may define how a packet may be accounted and/or when and how to report the measurements. The FAR may determine the forwarding policy for a user plane function based on preconfigured traffic forwarding rules.

In an example, the SMF may determine that the UP connection of the child session or the UP connection of MA PDU session may be deactivated. In an example, the cause for the determination by the SMF may be: the QoS flows of a MA PDU session may be rejected by the target NG-RAN during a handover procedure, the UPF may detect that the child session or the MA PDU session has no data transfer for a specified inactivity period, for a LADN MA PDU session or child session, the AMF may notify the SMF that the UE moved out of the LADN service area, the AMF may notify the SMF that the UE moved out of the allowed area, and/or the like.

In an example embodiment, the SMF may send to the UPF a third message indicating a request for release of the child session. The third message may comprise the identifier of the N4 session associated with the MA PDU session, the access information of the child session, and/or the like. In an example, the third message may be an N4 session modification procedure. In an example, the third message may be an N4 session release procedure.

In an example embodiment, the SMF may initiate the N4 session modification procedure (e.g., the third message) indicating a request to remove AN tunnel info for N3 tunnel of the corresponding child session and/or the MA PDU session. When the MA PDU session corresponds to a LADN, the SMF may notify the UPF to discard downlink data for the MA PDU sessions and/or to not provide further data notification messages. The SMF may release the IP address/Prefix(es) that were allocated to the MA PDU session or the child session and may release the corresponding user plane resources. The SMF may send an N4 session release request (N4 Session ID, access information) message to the UPF(s) of the child session or the MA PDU session. The UPF(s) may drop any remaining packets of the MA PDU session and release all tunnel resource and contexts associated with the N4 Session or tunnel resource and contexts associated with the child session identified by the N4 session id and access information. The UPF(s) may acknowledge the N4 session release request or the N4 session modification request by the transmission of an N4 session release response (N4 Session ID, access information) message, N4 session modification response (N4 Session ID, access information) message, and/or the like to the SMF.

In an example, the SMF may receive from the UPF a third response message indicating an acknowledgment to the third message. In an example, the SMF may modify by the child session information (e.g., the child session context, MA PDU session context, N4 session context, and/or the like), indicating that the child session is deactivated.

In an example embodiment, in response to the determining by the SMF that the UP connection of the child session or the UP connection of MA PDU session may be deactivated, the SMF may send to an access and mobility management function (AMF), a second message indicating a request for release of access network resources for the child session. In an example, the second message may comprise the identifier of the MA PDU session (e.g., MA PDU session id), access information of the child session, and/or the like. In an example, the second message may further comprise a Namf_Communication_N1N2MessageTransfer service operation.

In an example, the SMF may invoke to the AMF, the Namf_Communication_N1N2MessageTransfer service operation (N2 SM Information (access information, MA PDU session ID, child session id, and/or the like)) to release the NG-RAN resources associated with the child session and/or the MA PDU session.

In an example embodiment, the AMF may send to a base station, a fourth message indicating a request for release of resources for a child session. In an example, the fourth message may comprise an identifier of a MA PDU session, access information of the child session, and/or the like. In an example, the AMF may receive from the base station, a fourth response message indicating an acknowledgment for the request. In an example, the fourth message may be an N2 PDU session resource release command. In an example, for the case of 3GPP access, the AMF may send to the base station (e.g., RAN, NG-RAN, and/or the like) the N2 PDU session resource release command including N2 SM information (access information, MA PDU session ID, child session id, and/or the like) received from the SMF via N2.

In an example, the NG-RAN may issue NG-RAN specific signalling exchange (e.g. RRC connection reconfiguration) with the UE to release the NG-RAN resources related to the child session and/or the MA PDU session (e.g., that was received from the AMF).

In an example, the NG-RAN may acknowledge the N2 PDU session resource release command to the AMF. The AMF may invoke the Nsmf_PDUSession_UpdateSMContext service operation to acknowledge the Namf service received from the SMF.

In an example embodiment, the AMF may send to a non-3GPP interworking function (N3IWF), a fifth message indicating a request for release of resources for a child session. In an example, the fifth message may comprise an identifier of a MA PDU session, access information of the child session, and/or the like. In an example, the AMF may receive from the N3IWF, a fifth response message indicating an acknowledgment for the request. In an example, the fifth message may be a resource release command. In an example, for the case of non-3GPP access, the AMF may send to the N3IWF, the resource release command (e.g., an N2 PDU session resource release command, N2 resource release request, AN session release request message, and/or the like) including N2 SM information (access information, MA PDU session ID, child session id, and/or the like) received from the SMF via N2.

In an example, the N3IWF may issue N3IWF specific signalling exchange (e.g. IKE, IKEv1, IKEv2 signalling, and/or the like) with the UE to release the AN resources related to the child session and/or the MA PDU session. In an example, Internet key exchange (IKE) may be a protocol employed to set up a security association (SA) in an Internet Protocol Security (IPsec) protocol suite. IPsec may be a secure network protocol suite of IPv4 that may authenticate and encrypt packets of data sent over an IPv4 network.

In an example, upon receiving the resource release command from the AMF, the N3IWF may trigger release of the corresponding child security association (SA) by sending informational exchange (delete payload) to the UE. Delete payload may be included in the message listing the security parameter indexes SPIs of the child SAs to be deleted to the MA PDU session (or a child session of the MA PDU session). In an example, the delete payload message may comprise a protocol ID (e.g., identifying an IKE SA, an AH, ESP, and/or the like), SPI size, number of SPIs, security parameter index(es) (e.g., variable length that identifies the specific security association(s) to delete), and/or the like.

Encapsulating security payload (ESP) and authentication header (AH) may exist in pairs, with one SA in each direction. When a SA is closed, both members of the pair may be closed (e.g., deleted). An endpoint may close its incoming SAs and may allow the other endpoint to close the other SA in each pair. To delete an SA, an Informational exchange with one or more delete payloads may be sent listing the SPIs (as they may be expected in the headers of inbound packets) of the SAs to be deleted. The recipient may close the designated SAs. If there are many SAs to delete at the same time, one may include delete payloads for the inbound half of each SA pair in the Informational exchange. The response in the informational exchange may comprise delete payloads for the paired SAs going in the other direction. In an example, if both ends (e.g., the UE and the N3IWF) of a set of SAs decide to close them, each may send a delete payload and the two requests may cross in the network. If a node receives a delete request for SAs for which it has already issued a delete request, it may delete the outgoing SAs while processing the request and the incoming SAs while processing the response. In an example IKE SAs may be deleted by sending an informational exchange. Deleting an IKE SA may close any remaining Child SAs negotiated under it. The response to a request that deletes the IKE SA may be an empty informational response.

In an example, the N3IWF may acknowledge the resource release command to the AMF. The AMF may invoke the Nsmf_PDUSession_UpdateSMContext service operation to acknowledge the Namf service received from the SMF.

In an example embodiment, the SMF may receive from the AMF, a second response message comprising an acknowledgment for the request for release of access network resources for the child session. In an example, the second response message may be a Nsmf_PDUSession_UpdateSMContext service operation. The AMF may invoke to the SMF the Nsmf_PDUSession_UpdateSMContext service operation to acknowledge the Namf service operation.

Figure 16:
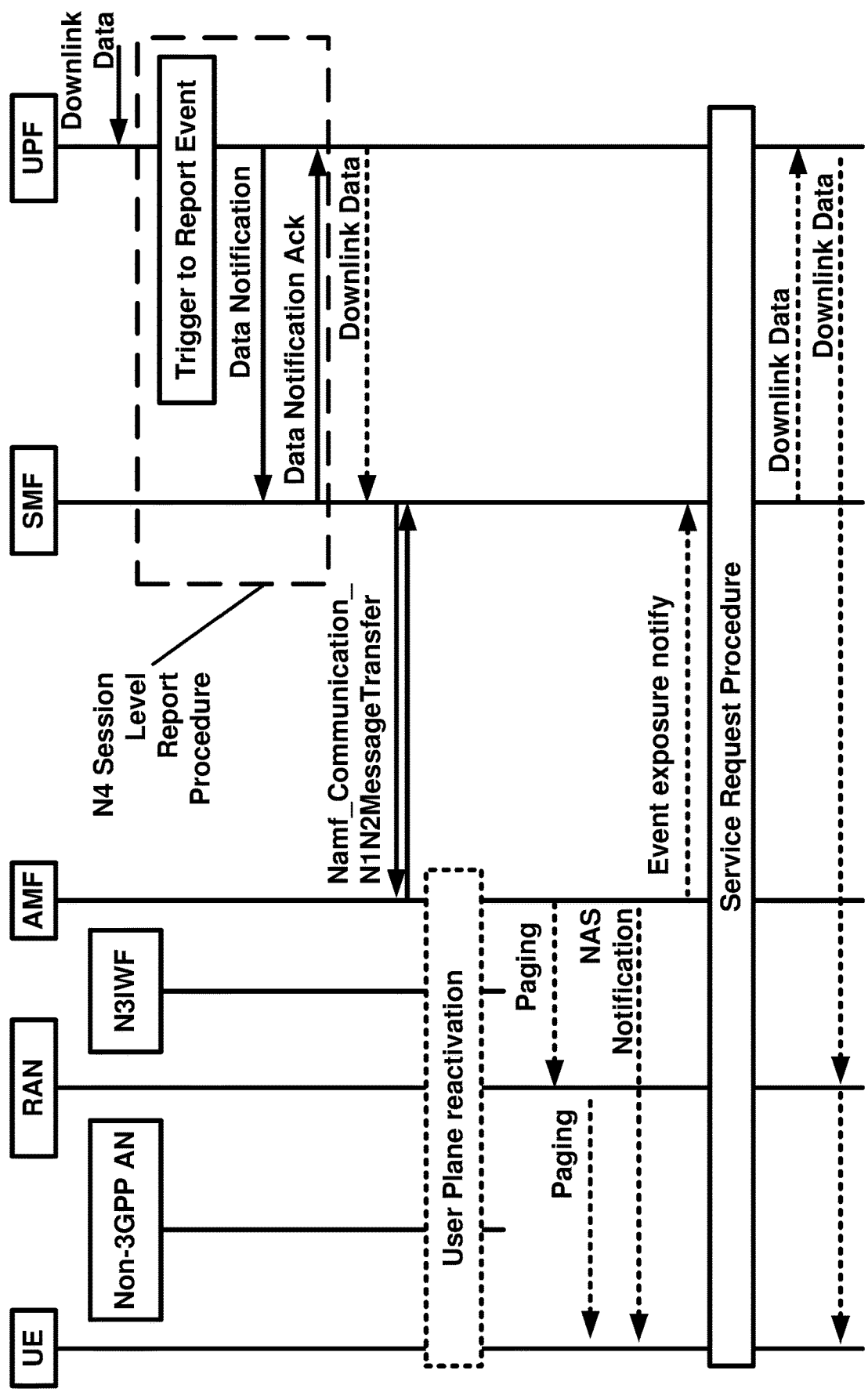
FIG. 16 is an example call flow as per an aspect of an embodiment of the present disclosure.

As depicted in example FIG. 16 and FIG. 17, a UPF may send to an SMF a first message reporting an event indicating an arrival of a first downlink data for a child session of a multi access packet data unit (MA PDU) session. In an example, the first message may comprise: access information of the child session, an identifier of an N4 session associated with the MA PDU session, a list of reporting trigger, a data notification, a first downlink data, a list of measurement information, a unique identifier of the child session of the MA PDU session, and/or the like. In an example, the SMF may derive an identifier of the MA PDU session associated with the child session. The UPF may trigger an N4 reporting to report detection of the first downlink data for the child session, or an MA PDU session and/or PDU session. In an example, the UE may be in CM-IDLE state for the access associated with the child session(s) or the MA PDU session. When the UPF receives a downlink packet (e.g., the first downlink data) and N3/N9 tunnel for downlink data transmission may not exist and the buffering is performed by the UPF, the UPF may report the detection of the first downlink data to the SMF for the purpose of downlink data notification. The UPF may report a differentiated services code point (DSCP) of the packet if the MA PDU session type is IP.

In an example, when the UPF receives downlink data (e.g., the first downlink data) for a child session or an MA PDU Session and there is no AN Tunnel Info stored in the UPF for the child session or the MA PDU session, based on the instruction from the SMF, the UPF may buffer the downlink data, or forward the downlink data to the SMF e.g., via the first message.

In an example, the first message may be a data notification message. The data notification message may comprise access information, an N4 session ID, information to identify the QoS Flow for the DL data packet, DSCP, and/or the like. In an example, the SMF may send an acknowledgment message to the UPF. The SMF may send to the UPF a first response message indicating an acknowledgment to receiving the first message.

In an example, the SMF may send to an AMF, a second message indicating an arrival of a first downlink data for the child session and a request for user plane connection activation of the child session. In an example, the second message may comprise the identifier of the MA PDU session, access information of the child session, and/or the like. In an example, the second message may be an Namf_Communication_N1N2MessageTransfer (e.g., comprising: access information, a SUPI, the MA PDU session id, N2 SM information (QFI(s), QoS profile(s), CN N3 tunnel info, S-NSSAI, paging policy indication, and/or the like), area of validity for N2 SM information, ARP, paging policy indication, 5QI, and/or the like).

In an example, the SMF may notify the UPF that originated the data notification to discard downlink data for the child session or the MA PDU sessions and/or to not provide further data notification messages. In an example, the SMF may determine whether to contact the AMF, i.e., the SMF may not contact the AMF if the SMF had previously been notified that the UE is unreachable, if the UE is reachable only for regulatory prioritized service and child session or the MA PDU session is not for regulatory prioritized service.

In an example, the SMF may determine the AMF and may invoke the Namf_Communication_N1N2MessageTransfer to the AMF including the access information, the MA PDU session ID, and/or the like. In an example, if the SMF, while waiting for the user plane connection to be activated, receives additional data notification message for a QoS flow associated with a higher priority (i.e., ARP priority level) than the priority associated with the previous data notification message, the SMF may invoke a new Namf_Communication_N1N2MessageTransfer indicating the higher priority ARP, access information, and MA PDU Session ID to the AMF. In an example, if the SMF, while waiting for the user plane to be activated, receives a message from a new AMF other than the one to which the SMF invoked the Namf_Communication_N1N2MessageTransfer (e.g., the second message), the SMF may re-invoke the Namf_Communication_N1N2MessageTransfer towards the new AMF.

In an example, the AMF may send to the SMF, a second response message comprising an acknowledgment for the request for user plane connection activation of the child session or the MA PDU session. If the UE is in CM-IDLE state at the AMF, and the AMF is able to page the UE the AMF may send a Namf_Communication_N1N2MessageTransfer response to the SMF with a cause indicating attempting to reach UE which may indicate to the SMF that once the UE is reachable, the SMF may be asked to provide the N2 SM information to the AMF. In an example, while waiting for the UE to respond to a paging request, if the AMF receives an Namf_Communication_N1N2MessageTransfer request message with the same or a lower priority than the previous message triggering the paging, or if the AMF has determined not to trigger additional paging requests for the UE based on local policy, the AMF may reject the Namf_Communication_N1N2MessageTransfer Request message. If the UE is in CM-CONNECTED state at the AMF then the AMF may send a Namf_Communication_N1N2MessageTransfer response to the SMF with a cause indicating that the transfer was successful (e.g., N1/N2 transfer success).

In an example, if the UE is in CM-IDLE state, and the AMF determines that the UE is not reachable for paging, the AMF may send a Namf_Communication_N1N2MessageTransfer response either to the SMF, or to other network functions from which AMF received the request message. In an example, the AMF may perform asynchronous type communication and may store the UE context based on the received message. If asynchronous type communication is invoked, the AMF may initiate communication with the UE and (R)AN when the UE is reachable e.g. when the UE enters CM-CONNECTED state.

In an example, if the AMF has determined the UE is unreachable for the SMF (e.g., due to the UE in MICO mode or the UE is only registered over non-3GPP access and its state is CM-IDLE), then the AMF may reject the request from the SMF. The AMF may include in the reject message an indication that the SMF may not send DL data notifications to the AMF, if the SMF has not subscribed to the event of the UE reachability. The AMF may store an indication that the SMF has been informed that the UE is unreachable. If the UE is not in MICO mode and the AMF detects the UE is in a Non-Allowed Area unless the request from the SMF is for regulatory prioritized service, the AMF may reject the request from the SMF and may notify the SMF that the UE is reachable only for regulatory prioritized service. The AMF may store an indication that the SMF has been informed that the UE is reachable only for regulatory prioritized service.

In an example, if the registration procedure with AMF change is in progress when the old AMF receives the Namf_Communication_N1N2MessageTransfer, the old AMF may reject the request with an indication that the Namf_Communication_N1N2MessageTransfer has been temporarily rejected.

In an example, upon reception of a Namf_Communication_N1N2MessageTransfer response with an indication that its request has been temporarily rejected, the SMF may start a locally configured guard timer and wait for a message to come from a new AMF. Upon reception of a message from an AMF, the SMF may re-invoke the Namf_Communication_N1N2MessageTransfer (with Data Notification) to the AMF from which it received the message. If the SMF decides that the control plane buffering may apply, the SMF may request the UPF to start forwarding the downlink data PDU towards the SMF.

In an example, the SMF may notify the UPF about the user plane setup failure. If the SMF receives an indication from the AMF that the UE is unreachable or reachable only for regulatory prioritized service, the SMF may, based on network policies, indicate to the UPF to stop sending Data Notifications, indicate to the UPF to stop buffering DL data and discard the buffered data, indicate to the UPF to stop sending Data Notifications and stop buffering DL data and discard the buffered data, refrains from sending further Namf_Communication_N1N2MessageTransfer message for DL data to the AMF while the UE is unreachable, and/or the like. In an example, based on operator policies, the SMF may apply the pause of charging procedure. If the SMF receives an indication from the AMF that the Namf_Communication_N1N2MessageTransfer message requested from an SMF has been temporarily rejected, the SMF may, based on network policies, indicate to the UPF to apply temporary or extended buffering.

In an example, if the UE is in CM-IDLE state in 3GPP access and the access information of the child session or the MA PDU session ID received from the SMF is associated with 3GPP access and based on local policy the AMF decides to notify the UE through 3GPP access even when UE is in CM-CONNECTED state for non-3GPP access, the AMF may send a paging message to NG-RAN node(s) via 3GPP access. If the UE is simultaneously registered over 3GPP and non-3GPP accesses in the same PLMN, the UE is in CM-IDLE state in both 3GPP access and non-3GPP access, and the access information of the child session or the MA PDU Session ID is associated with non-3GPP access, the AMF may send a paging message with associated access (e.g., non-3GPP, and/or indicate the RAT) to NG-RAN node(s) via 3GPP access.

In an example, if the UE is in RM-REGISTERED state and CM-IDLE and reachable, the AMF may send a paging message (NAS ID for paging, registration area list, paging DRX length, paging priority indication, access associated to the child session or the MA PDU Session) to (R)AN node(s) belonging to the registration area(s) in which the UE is registered, then the NG-RAN node may page the UE, including the access associated to the MA PDU Session in the paging message if received from the AMF.

In an example, if the UE is simultaneously registered over 3GPP and non-3GPP accesses in the same PLMN, and the UE is in CM-CONNECTED state in 3GPP access and the child session or the MA PDU session ID is associated with non-3GPP access, the AMF may send a NAS notification message containing the non-3GPP access type to the UE over 3GPP access and sets a notification timer. If the UE is simultaneously registered over 3GPP and non-3GPP accesses in the same PLMN, and the UE is in CM-CONNECTED state for non-3GPP access and in CM-IDLE for 3GPP access, and if the child session or the MA PDU session ID is associated with 3GPP access, and based on local policy the AMF decides to notify the UE through non-3GPP access, the AMF may send a NAS notification message containing the 3GPP access type to the UE over non-3GPP access and sets a notification timer.

In an example, the SMF may send to the UPF, a third message indicating a request for modification of the child session. In an example, the third message may comprise the identifier of the N4 session associated with the MA PDU session, the access information of the child session, access network tunnel information for the RAN or the N3IWF, and/or the like. In an example, the third message may be an N4 session modification request. The N4 session modification request may comprise the identifier of the N4 session associated with the MA PDU session, the access information of the child session, access network tunnel information for the RAN or the N3IWF, N4 session parameters (e.g., PDR, FAR, URR, and/or the like), and/or the like. The UPF may identify the context associated with the child session, N4 session context to be modified by the N4 Session ID, and/or the like. The UPF may update the parameters of the child session or the N4 session context according to the list of parameters sent by the SMF. The UPF may responds with a third response message. In an example, the third response message may be an N4 session modification response message containing any information that the UPF has to provide to the SMF in response to the control information received.

In an example, the SMF may update the child session context, the MA PDU session context, and/or modify by the child session information, indicating that the child session is activated.

In an example, the AMF may send to a base station (RAN), a fourth message indicating a request for activation of user plane resources for the child session. The fourth message may comprise the identifier of the MA PDU session, access information of the child session, and/or the like. In an example, the AMF may receive from the base station (RAN), a fourth response message indicating an acknowledgment for the request. In an example, the base station may be a non-3GPP interworking function (N3IWF), RAN, NG-RAN and/or the like. In an example, the AMF may send to a non-3GPP interworking function (N3IWF), a fifth message indicating a request for activation of user plane resources for the child session, the fifth message may comprise an identifier of a MA PDU session, access information of the child session, and/or the like. In an example, the AMF may receive from the N3IWF, a fifth response message indicating an acknowledgment for the request.

In an example, the fourth message and/or the fifth message may be an N2 Request (e.g., comprising: N2 SM information received from SMF, a security context, AMF Signalling Connection ID, a handover restriction list, subscribed UE-AMBR, MM NAS Service Accept, a list of recommended cells/TAs/NG-RAN node identifiers, N3IWF identifiers, and/or the like). If the Service Request procedure is triggered by the Network while the UE is in CM-CONNECTED state, the N2 SM information received from SMF may be included in the N2 request. For a UE that is in CM-IDLE state when the service request is triggered, the base station (RAN, NG-RAN, N3IWF) may store the security context, AMF signalling Connection Id, and/or the like. In an example, the MM NAS service accept may include PDU session status in AMF. If the activation of UP of a MA PDU session is rejected by an SMF, the MM NAS service accept may include the MA PDU session ID and the cause indicating the reason that the user plane resources were not activated (e.g. LADN not available). If there are multiple MA PDU sessions that may involve multiple SMFs, the AMF may not need to wait for responses from all SMFs before it sends N2 SM information to the base station (RAN) or the N3IWF. The AMF may wait for responses from the SMFs before it sends MM NAS Service Accept message to the UE.

If the NG-RAN node had provided the list of recommended cells/TAs/NG-RAN node identifiers during the AN release procedure, the AMF may include the list in the N2 request. The NG-RAN may use this information to allocate the RAN notification area when the NG-RAN may decide to enable RRC Inactive state for the UE. The AMF based on network configuration, may include the UE's RRC inactive assistance information.

In an example, the base station (e.g., RAN, NG-RAN) may perform RRC connection reconfiguration with the UE depending on the QoS Information for the QoS flows of the child session(s) or the MA PDU sessions whose UP connections are activated and data radio bearers. For a UE that is in CM-IDLE state and if the service request is not triggered by the UE for a signalling connection only, the user plane security may be established. If the N2 request includes a NAS message, the NG-RAN may forward the NAS message to the UE. The UE may locally delete context of the child session or the context of the MA PDU sessions that are not available in 5GC.

In an example, after the user plane radio resources are setup, the uplink data from the UE can now be forwarded to NG-RAN. The NG-RAN may send the uplink data to the UPF address and tunnel ID. In an example, the base station (RAN) may send to the AMF an N2 request ack (N2 SM information (AN tunnel info, list of accepted QoS flows for the child sessions of the MA PDU sessions whose UP connections are activated, list of rejected QoS flows for the MA PDU sessions whose UP connections are activated), MA PDU session ID, and/or the like). The message may comprise N2 SM information(s), e.g. AN Tunnel Info. NG-RAN may respond N2 SM information with separate N2 message (e.g. N2 tunnel setup response) if AMF sends separate N2 messages.

In an example, the AMF may send to the SMF an Nsmf_PDUSession_UpdateSMContext Request (N2 SM information, RAT Type) per MA PDU session or per child session to the SMF.

In an example, if a new intermediate UPF (I-UPF) exists, the SMF may send to the new intermediate UPF an N4 session modification request (AN Tunnel Info and List of accepted QFI(s)). If the SMF selected a new UPF to act as intermediate UPF for the child session or the MA PDU Session, the SMF may initiate an N4 session modification procedure to the new I-UPF and may provide AN tunnel info. The downlink data from the new I-UPF may be forwarded to NG-RAN and UE.

In an example, the SMF may send to MA PDU session anchor UPF (PSA) an N4 session modification request (AN tunnel info, list of rejected QoS flows). If a user plane is to be setup or modified and after the modification there is no I-UPF, the SMF may initiate an N4 session modification procedure to the UPF (PSA) and may provide AN tunnel info. The downlink data from the UPF (PSA) may be forwarded to NG-RAN and UE.

In an example, for the non-3GPP access, the UE may establish a signalling IPsec SA with the N3IWF via untrusted non-3GPP access. The UE may include the service request and the AN parameters in an EAP-5G packet, which may be encapsulated in an IKE_AUTH request. The user plane between the UE and N3IWF may be established with IKEv2 signalling (i.e. by using an IKEv2 Create_Child_SA exchange). The user plane of a child session or MA PDU session may comprise one or more child security associations SAs.

In an example embodiment, a multi access (MA) PDU session establishment procedure may be employed.

In an example, a UE may send a PDU session establishment request message with a new PDU session ID and request type indicating initial request. The UE may include an MA-PDU capability flag (e.g., an indicator, an information element, and/or the like) to indicate to the network that it may support MA-PDU sessions. In an example, the UE may send to the AMF a NAS Message (or a SM NAS message) comprising the MA PDU capability flag, NSSAI, S-NSSAI (e.g., requested S-NSSAI, allowed S-NSSAI, subscribed S-NSSAI, and/or the like), DNN, PDU session ID, request type, old PDU session ID, N1 SM container (PDU session establishment request), and/or the like. In an example, the UE, in order to establish a new PDU session, may generate a new PDU session ID. In an example, a PDU session id may be an MA PDU session id. In an example, the UE may initiate the UE requested PDU session establishment procedure by the transmission of the NAS message containing a PDU session establishment request within the N1 SM container. The PDU session establishment request may include the MA PDU capability flag, a PDU session type, SSC mode, protocol configuration options, and/or the like. In an example, the NAS message sent by the UE may be encapsulated by the AN in a N2 message towards the AMF that may include user location information and radio access technology type (RAT) information. In an example, the PDU session establishment request message may contain SM PDU DN request container containing information for the PDU session authorization by the external DN.

In an example embodiment, the AMF may select an SMF. The AMF may store access information of the PDU session e.g., access type (3GPP access, non-3GPP access), RAT type (e.g., E-UTRAN, NR, WLAN, NB-IoT, and/or the like), and/or the like. The AMF may store access type of the PDU session (e.g., 3GPP access, non-3GPP access). In an example, the AMF may store RAT type of the PDU session (e.g., E-UTRAN, NR, WLAN, NB-IoT, and/or the like). In an example, when the AMF receives the MA-PDU capability flag and if the AMF supports MA-PDU sessions, the AMF may include the MA PDU capability flag in a Nsmf_PDUSession_CreateSMContext request message sent to the SMF. In an example, the AMF may send to the SMF, an N11 message, e.g., Nsmf_PDUSession_CreateSMContext request (comprising: the MA PDU capability flag, access information, a SUPI or PEI, DNN, S-NSSAI, PDU session ID, AMF ID, request type, N1 SM container (PDU session establishment request), user location information, access type, PEI, GPSI), or Nsmf_PDUSession_UpdateSMContext request (the MA-PDU capability flag, access information, the SUPI, DNN, S-NSSAI, MA PDU session ID, AMF ID, request type, N1 SM container (PDU session establishment request), user location information, access type, RAT type, PEI). In an example, the SMF may register with the UDM.

In an example, in order to support ATSSS, network functions NFs such as SMF, UPD, UDR, PCF and/or the like may be required to support ATSSS. ATSSS capability may be discovered during an initial PDU session establishment and inter-PLMN mobility procedures where these network functions indicate its support.

In an example, to select the SMF that supports the ATSSS capability, the AMF may invoke a selection service such as a Nnssf_NSSelection_Get service operation from a network slice selection function (NSSF) in serving PLMN with the S-NSSAI (e.g., indicating that ATSSS support may be required) from the allowed NSSAI requested by the UE, PLMN ID of the SUPI, TAI of the UE and may indicate that the request may be within a procedure of an MA PDU session establishment with ATSSS support, an MA PDU session establishment in non-roaming, roaming with local breakout, MA PDU session establishment for CIoT and ATSSS, and/or the like. The NSSF in serving PLMN may select a network slice instance, and may determine and return an appropriate NRF (e.g., an identifier of an NRF, an address of an NRF, and/or the like). In an example, the network slice instance may support the MA PDU session capability, ATSSS capability (e.g., AT3SF capability), and/or the like. The appropriate NRF may be employed (e.g., by the AMF) to select network functions or network services within the selected network slice instance, and may return a network slice instance identifier corresponding to the network slice instance. In an example, the AMF may query the appropriate NRF in serving PLMN by issuing a Nnrf_NF-Discovery_Request comprising an ATSSS capability indicator, an S-NSSAI (e.g. the S-NSSAI from the wireless device and/or the default S-NSSAI) from the allowed NSSAI, PLMN ID of the SUPI, DNN, a CIoT indicator if CIoT support is required, the network slice instance identifier in case the AMF has stored the network slice instance identifier for the S-NSSAI from the allowed NSSAI, and/or the like. In an example, the NRF in serving PLMN may provide to the AMF, e.g. FQDN or IP address, of a set of discovered SMF instance(s) or endpoint address(es) of SMF service instance(s) in a Nnrf_NFDiscovery_Request response message, and/or the network slice instance identifier for a selected network slice instance corresponding to the S-NSSAI for subsequent NRF queries. In an example, the Nnrf_NFDiscovery_Request message may comprise the ATSSS capability indicator, NF service name(s) (e.g., SMF, UPF, NEF, NIMF, user plane CIoT data transmission, CIoT/MTC data transmission, and/or the like), NF type of a target NF (e.g., the UPF, NEF/NIMF), a NF type of the NF service consumer (e.g., the AMF, SMF, and/or the like), S-NSSAI(s), an identifier of a target NF/NF service PLMN (e.g., UPF PLMN ID, NEF PLMN ID, NIMF PLMN ID, and/or the like), serving PLMN ID, an identifier of the service consumer NF (e.g., the AMF ID, the SMF ID), and/or the like. In an example, in response to the at least one second message, the NRF may provide to the SMF, the IP address or FQDN of the expected NF instance(s) (e.g. the UPF, NEF, NIMF, and/or the like).

In an example, if the UE has sent an MA PDU Capability flag and the AMF and the SMF support MA PDU sessions, the SMF may send the MA-PDU capability flag to the PCF when it performs session management policy establishment procedure. The PCF may determine whether the MA PDU session is allowed or not based on operator policy and subscription. If the PCF permits the use of MA PDU procedures for the requested PDU session (e.g. to later establish another child PDU over non-3GPP access), the SMF may send a PDU session establishment accept message with the MA-PDU capability flag to inform the UE that the network may support MA PDU procedures for the PDU session. In an example, the SMF may accept the PDU session establishment but may not include the MA PDU capability flag in the PDU session establishment accept message. If the MA PDU capability flag is received by the UE, the UE may add other child PDU session(s) to the existing PDU session.

In an example, the UE may add a child PDU session over non-3GPP access. In an example, if the UE is not registered via non-3GPP access, the UE may initiate registration via non-3GPP access. The UE may send a PDU session establishment request message with the PDU session ID, request type (e.g., existing PDU session), an MA PDU request flag and includes the same PDU session parameters (e.g. S-NSSAI, DNN, PDU session type, SSC mode, PDU Session ID) used with the PDU session established via 3GPP access. In the MM NAS message, the UE may include the MA PDU request flag. The AMF may update the access type of the PDU session to Multi Access. In an example, when the AMF receives MA PDU capability flag and it supports MA PDU sessions, it may include MA PDU capability flag in the Nsmf_PDUSession_CreateSMContext request message sent to the SMF.

In an example, if the UE has sent the MA PDU request flag and the AMF and the SMF support MA PDU sessions, the SMF may send an MA PDU request flag and associated access information to the PCF when it performs session management policy modification procedure. The PCF may determine whether the requested PDU session may be added to the existing PDU session based on operator policy and subscription.

In an example, when the SMF performs N4 session modification, the SMF may include the MA PDU request flag to indicate that the PDU session is a MA PDU session. In an example, the SMF may initiate an N4 session modification procedure with the UPF. The SMF may provide AN tunnel info to the UPF as well as the corresponding forwarding rules. In an example, the UPF may provide an N4 session modification response to the SMF.

In an example embodiment, the SMF may select the UPF and send an N4 session establishment request/modification request message to the selected UPF. For the existing PDU session, if there are more than one serving UPFs, the SMF may select N3 UPF or anchor UPF to send the N4 session modification request message. In an example, the SMF may select the UPF by querying the appropriate NRF in serving PLMN and by issuing a Nnrf_NFDiscovery_Request comprising an ATSSS capability indicator, an S-NSSAI (e.g. the S-NSSAI from the wireless device and/or the default S-NSSAI) from the allowed NSSAI, PLMN ID of the SUPI, DNN, a CIoT indicator if CIoT support is required, and/or the like. In an example, the NRF may provide to the SMF, e.g. FQDN or IP address, of a set of discovered SMF instance(s) or endpoint address(es) of SMF service instance(s) in a Nnrf_NFDiscovery_Request response message, and/or the network slice instance identifier for a selected network slice instance corresponding to the S-NSSAI for subsequent NRF queries. In an example, the Nnrf_NFDiscovery_Request message may comprise the ATSSS capability indicator, NF service name(s) (e.g., SMF, UPF, NEF, NIMF, user plane CIoT data transmission, CIoT/MTC data transmission, and/or the like), NF type of a target NF (e.g., a user plane function with ATSSS support, the UPF, NEF/NIMF), a NF type of the NF service consumer (e.g., the AMF, SMF, and/or the like), S-NSSAI(s), an identifier of a target NF/NF service PLMN (e.g., UPF PLMN ID, NEF PLMN ID, NIMF PLMN ID, and/or the like), serving PLMN ID, an identifier of the service consumer NF (e.g., the AMF ID, the SMF ID), and/or the like. In an example, the NRF may provide to the SMF, the IP address or FQDN of the discovered NF instance(s) (e.g. the UPF, NEF, NIMF, and/or the like).

The SMF may send the N4 session establishment/modification request to the UPF. If the UE requested to use a traffic flow control protocol (TFCP) tunnel and the network supports the TFCP protocol, the SMF may authorized to establish the TFCP tunnel. If the UPF TFCP tunnel info is allocated by the SMF, the UPF TFCP tunnel info, UE TFCP tunnel info and the corresponding QoS flow info may be provided to the UPF. If UPF TFCP tunnel info is allocated by the UPF, the SMF may send UE TFCP tunnel info and the corresponding QoS flow info to the UPF. The UPF TFCP tunnel info may be provided to the SMF in a response message. In an example, the SMF may indicate that the TFCP tunnel may be applicable for per PDU session, per QoS flow or per packet filter. In an example, the SMF may send the RAN tunnel info, access information, RAT, access type (e.g., 3GPP access type), and/or the like to the UPF. In an example, if the PDU session establishment is for a child session of a MA PDU session and the child session is associated with a non-3GPP access type, the SMF may send the N3IWF tunnel info and non-3GPP access type to the UPF. The UPF may store access tunnel information and the binding access type for the Multi Access PDU session and/or the child session. This binding relationship may be employed when performing traffic splitting, switching, and/or the like in the user plane. In an example, the SMF may send ATSSS rules, ATSSS forwarding rules, ATSSS policy, and/or the like via the N4 session establishment/modification request to the UPF.

In an example embodiment, a session management function (SMF) may receive from a user plane function (UPF), a first message. The first message may report an event indicating inactivity of a child session of a multi access packet data unit (MA PDU) session. The first message may comprise: access information of the child session, an identifier of an N4 session associated with the MA PDU session, and/or the like. In an example, the SMF may determine to deactivate the child session in response to receiving the first message. In an example, the SMF may derive an identifier of the MA PDU session associated with the child session.

In an example, the SMF may send to an access and mobility management function (AMF) and in response to the determining, a second message. The second message may indicate a request for release of access network resources for the child session. The second message may comprise the identifier of the MA PDU session, access information of the child session, and/or the like.

In an example, the SMF may send to the UPF a third message. The third message may indicate a request for release of the child session. In an example, the third message may comprise the identifier of the N4 session associated with the MA PDU session, the access information of the child session, and/or the like.

In an example, the SMF may modify the child session information, indicating that the child session is deactivated.

In an example, the SMF may identify a set of parameters associated with an N4 session corresponding to the MA PDU session. In an example, the SMF may receive from the AMF, a second response message comprising an acknowledgment for the request for release of access network resources for the child session.

In an example embodiment, the access information may comprise at least one of a radio access technology (RAT) information element indicating at least one of evolved universal terrestrial radio access (E-UTRA), next generation E-UTRA (NG E-UTRA), new radio (NR), long term evolution for machines (LTE-M), narrowband internet of things (NB-IoT), wireless local area network (WLAN), and/or the like.

In an example, the access information may comprise at least one of an access type information element indicating at least one of 3GPP access type, Non-3GPP access type, and/or the like.

In an example, the first message may further comprise a list of reporting trigger, a list of measurement information, a unique identifier of the child session of the MA PDU session, and/or the like.

In an example, the SMF may send to the UPF a first response message indicating an acknowledgment to receiving the first message.

In an example, the SMF may receive from the UPF a third response message indicating an acknowledgment to the third message.

In an example, the AMF may send to a base station, a fourth message. In an example, the fourth message may indicate a request for release of resources for a child session. In an example, the fourth message may comprise: an identifier of a MA PDU session, access information of the child session, and/or the like.

In an example, the AMF may receive, from the base station, a fourth response message indicating an acknowledgment for the request. In an example, the AMF may send to a non-3GPP interworking function (N3IWF), a fifth message indicating a request for release of resources for a child session. The fifth message may comprise: an identifier of a MA PDU session, access information of the child session, and/or the like.

In an example, the AMF may receive from the N3IWF, a fifth response message indicating an acknowledgment for the request.

In an example, an MA PDU session may comprise a plurality of child sessions.

In an example embodiment, a session management function (SMF) may receive from a user plane function (UPF), a first message reporting an event indicating an arrival of a first downlink data for a child session of a multi access packet data unit (MA PDU) session. In an example, the first message may comprise: access information of the child session, an identifier of an N4 session associated with the MA PDU session, and/or the like.

The SMF may derive an identifier of the MA PDU session associated with the child session.

In an example, the SMF may send to an access and mobility management function (AMF), a second message. The second message may indicate an arrival of a first downlink data for the child session and a request for user plane connection activation of the child session. The second message may comprise: the identifier of the MA PDU session, access information of the child session, and/or the like.

In an example embodiment, the SMF may send to the UPF, a third message indicating a request for modification of the child session. The third message may comprise: the identifier of the N4 session associated with the MA PDU session, the access information of the child session, and/or the like. In an example, the SMF may modify the child session information, indicating that the child session is activated.

In an example embodiment, the SMF may identify a set of parameters associated with an N4 session corresponding to the MA PDU session.

In an example, the SMF may receive from the AMF, a second response message comprising an acknowledgment for the request for user plane connection activation of the child session.

In an example embodiment, the access information may comprise at least one of: a radio access technology (RAT) information element indicating at least one of: evolved universal terrestrial radio access (E-UTRA), next generation E-UTRA (NG E-UTRA), new radio (NR);

long term evolution for machines (LTE-M), narrowband internet of things (NB-IoT), wireless local area network (WLAN), and/or the like.

In an example, an access type information element may indicate at least one of: 3GPP access type, Non-3GPP access type, and/or the like.

In an example embodiment, the first message may further comprise a list of reporting trigger, a data notification, a first downlink data, a list of measurement information, a unique identifier of the child session of the MA PDU session, and/or the like.

In an example embodiment, the SMF may send to the UPF, a first response message indicating an acknowledgment to receiving the first message.

In an example, the third message may further comprise an access network tunnel information.

In an example, the SMF may receive from the UPF, a third response message indicating an acknowledgment to the third message. In an example, the UPF may send to a base station, the first downlink data.

In an example embodiment, the AMF may send to a base station, a fourth message indicating a request for activation of user plane resources for a child session. The fourth message may comprise: an identifier of a MA PDU session, access information of the child session, and/or the like. In an example, the AMF may receive from the base station, a fourth response message indicating an acknowledgment for the request.

In an example embodiment, the AMF may send to a non-3GPP interworking function (N3IWF), a fifth message indicating a request for activation of user plane resources for a child session. The fifth message may comprise: an identifier of a MA PDU session, access information of the child session, and/or the like. the AMF may receive from the N3IWF, a fifth response message indicating an acknowledgment for the request.

In an example, an MA PDU session may comprise a plurality of child sessions.

In an example embodiment, a user plane function (UPF) may send to a session management function (SMF) and in response to receiving a first downlink data for a child session of a multi access packet data unit (MA PDU) session, a first message. The first message may comprise: access information of the child session, an identifier of an N4 session associated with the MA PDU session, and/or the like.

In an example, UPF may receive from the SMF, a second message indicating a request for modification of the child session. The second message may comprise: the identifier of the N4 session associated with the MA PDU session, the access information of the child session, and/or the like.

In an example embodiment, the UPF may send to the SMF, a second response message, indicating an acknowledgment to the request for modification. The UPF may send to a base station, the downlink data. In an example, the first message may further comprise: a list of reporting trigger, a data notification, a first downlink data, a list of measurement information, a unique identifier of the child session of the MA PDU session, and/or the like. In an example, the second message may further comprise an access network tunnel information.

The SMF may derive/determine an identifier of the MA PDU session associated with the child session. The SMF may send to an access and mobility management function (AMF), a third message indicating an arrival of a first downlink data for the child session and a request for user plane connection activation of the child session. The third message may comprise the identifier of the MA PDU session, access information of the child session, and/or the like.

In an example embodiment, the AMF may send to a base station, a fourth message indicating a request for activation of user plane resources for a child session. The fourth message may comprise an identifier of a MA PDU session, access information of the child session, and/or the like.

The AMF may receive from the base station, a fourth response message indicating an acknowledgment for the request. The AMF may send to a non-3GPP interworking function (N3IWF), a fifth message indicating a request for activation of user plane resources for a child session. The fifth message may comprise an identifier of a MA PDU session, access information of the child session, and/or the like. In an example, the AMF may receive from the N3IWF, a fifth response message indicating an acknowledgment for the request.

In an example, an MA PDU session may comprise a plurality of child sessions.

In an example embodiment, a user plane function (UPF) may send to a session management function (SMF) and in response to detecting inactivity of a child session of a multi access packet data unit (MA PDU) session, a first message. The first message may comprise access information of the child session, an identifier of an N4 session associated with the MA PDU session, and/or the like.

In an example embodiment, the UPF may receive from the SMF, a second message indicating a request for release of the child session. The third message may comprise the identifier of the N4 session associated with the MA PDU session, the access information of the child session, and/or the like. The UPF may identify a set of parameters associated with the N4 session corresponding to the child session and may remove by the UPF the set of parameters. In an example, the UPF may send to the SMF, a second response message indicating an acknowledgment for the second message.

In an example embodiment, the SMF may determine to deactivate the child session. The SMF may derive an identifier of an MA PDU session associated with a child session. The SMF may identify a set of parameters associated with an N4 session corresponding to the MA PDU session.

In an example embodiment, the SMF may send to an access and mobility management function (AMF) and in response to the determining, a third message indicating a request for release of access network resources for the child session. The third message may comprise: the identifier of the MA PDU session, access information of the child session, and/or the like.

The SMF may modify the child session information associated with the set of parameters, indicating that the child session is deactivated. In an example, the determining may be in response to receiving the first message.

In an example embodiment, the SMF may receive from the AMF, a third response message comprising an acknowledgment for the request for release of access network resources for the child session.

In an example embodiment, the access information may comprise at least one of: a radio access technology (RAT) information element indicating at least one of: evolved universal terrestrial radio access (E-UTRA), next generation E-UTRA (NG E-UTRA), new radio (NR), long term evolution for machines (LTE-M), narrowband internet of things (NB-IoT), wireless local area network (WLAN), and/or the like. In an example, an access type information element may indicate at least one of: 3GPP access type, Non-3GPP access type, and/or the like.

In an example embodiment, the first message may further comprise: a list of reporting trigger, a list of measurement information, a unique identifier of the child session of the MA PDU session, and/or the like.

The AMF may send to a base station, a fourth message indicating a request for release of resources for a child session. The fourth message may comprise: an identifier of a MA PDU session, access information of the child session, and/or the like. The AMF may receive from the base station, a fourth response message indicating an acknowledgment for the request.

In an example, the AMF may send to a non-3GPP interworking function (N3IWF), a fifth message indicating a request for release of resources for a child session. The fifth message comprise: an identifier of a MA PDU session, access information of the child session, and/or the like.

In an example, the AMF may receive from the N3IWF, a fifth response message indicating an acknowledgment for the request.

In an example, an MA PDU session may comprise a plurality of child sessions.

Figure 26:
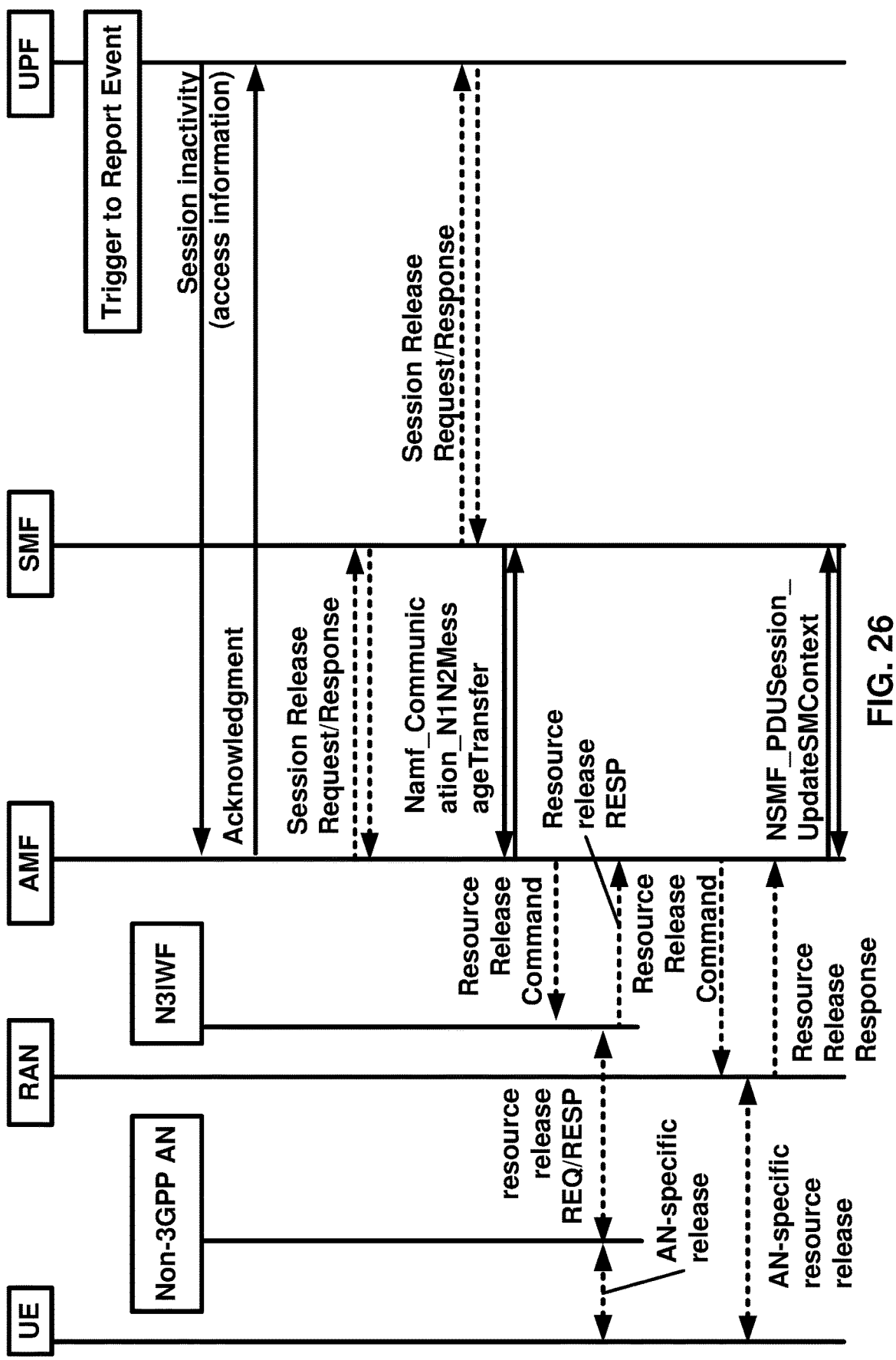
FIG. 26 is an example call flow as per an aspect of an embodiment of the present disclosure.
Figure 27:
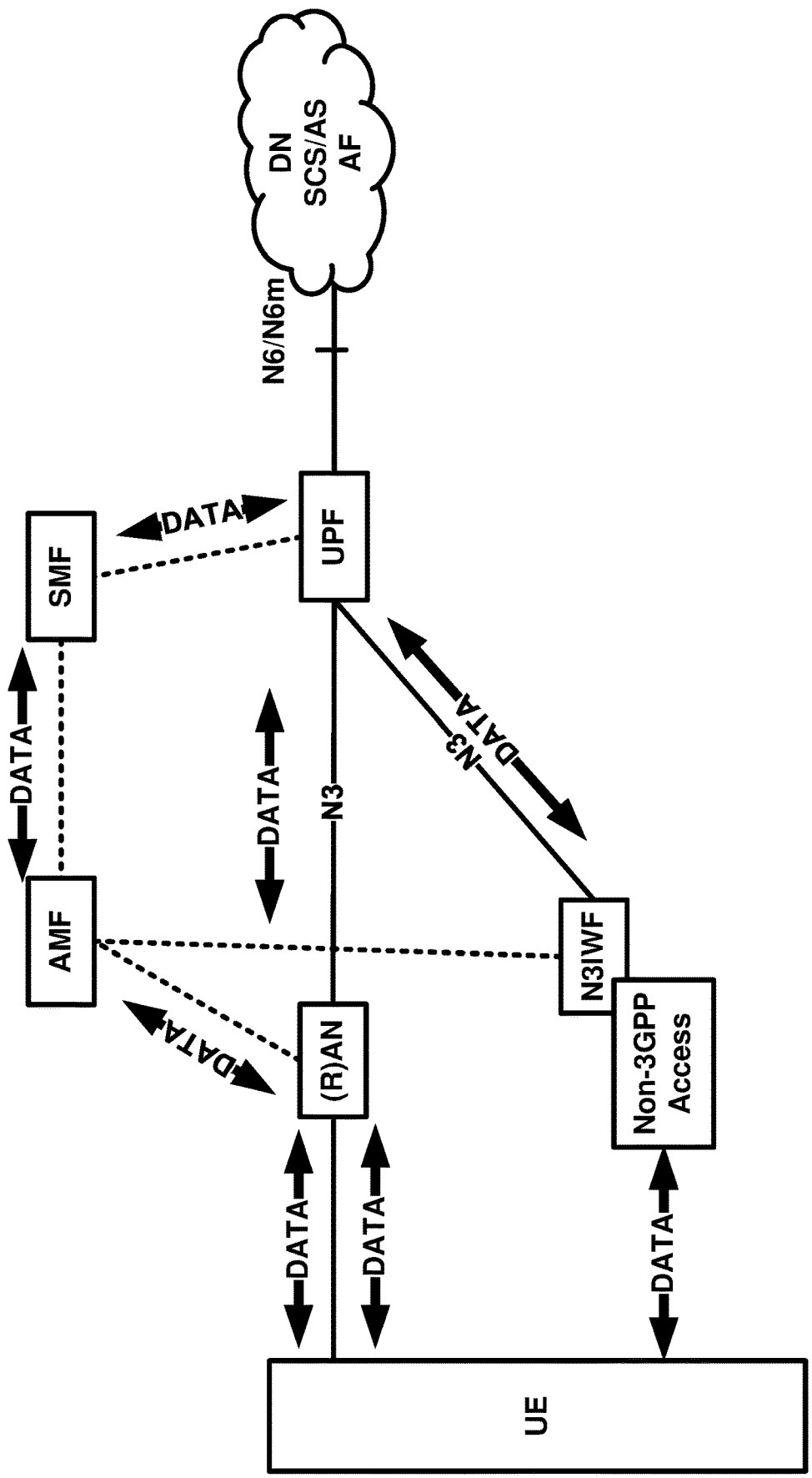
FIG. 27 is an example call flow as per an aspect of an embodiment of the present disclosure.
Figure 28:
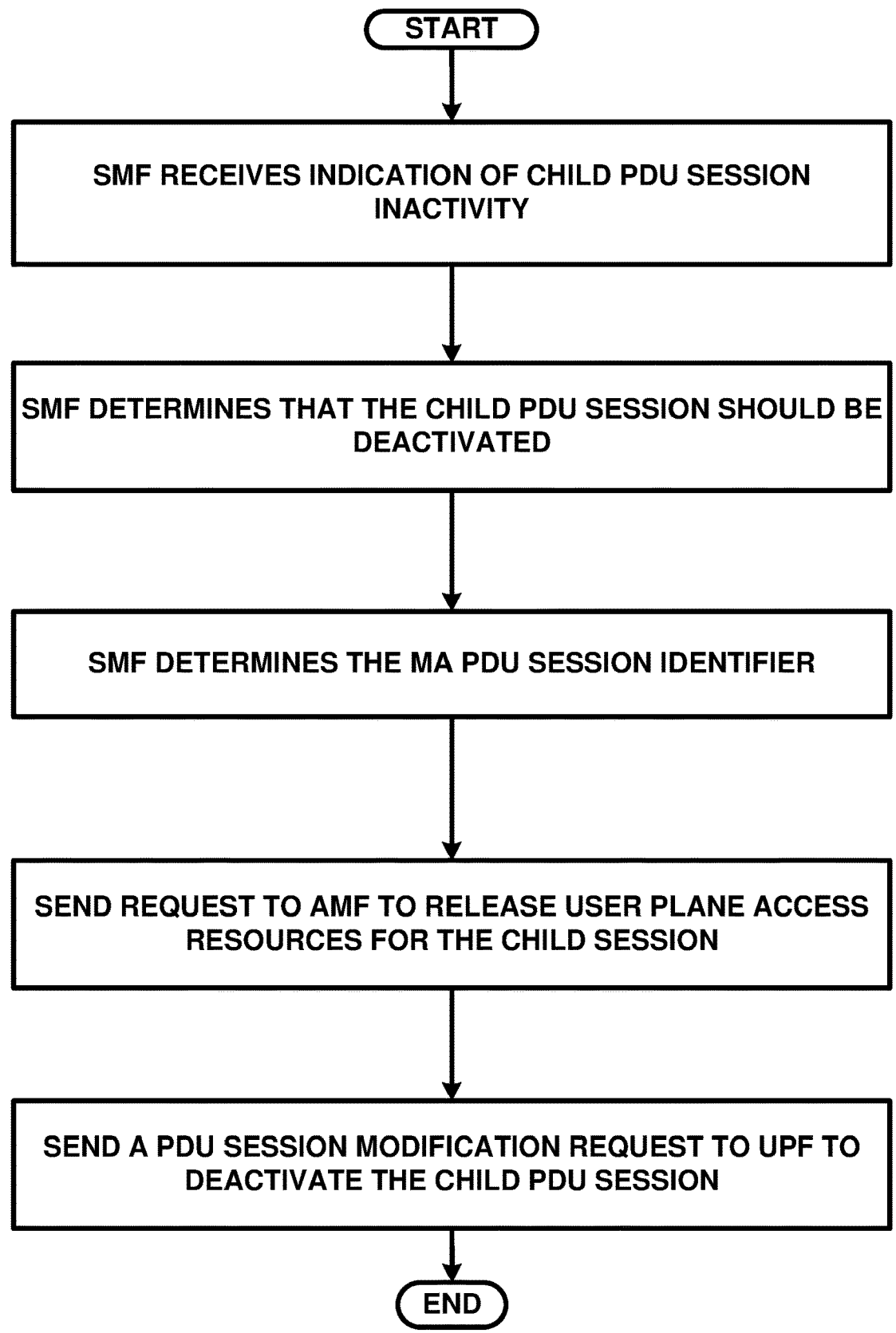
FIG. 28 is an example call flow as per an aspect of an embodiment of the present disclosure.
Figure 29:
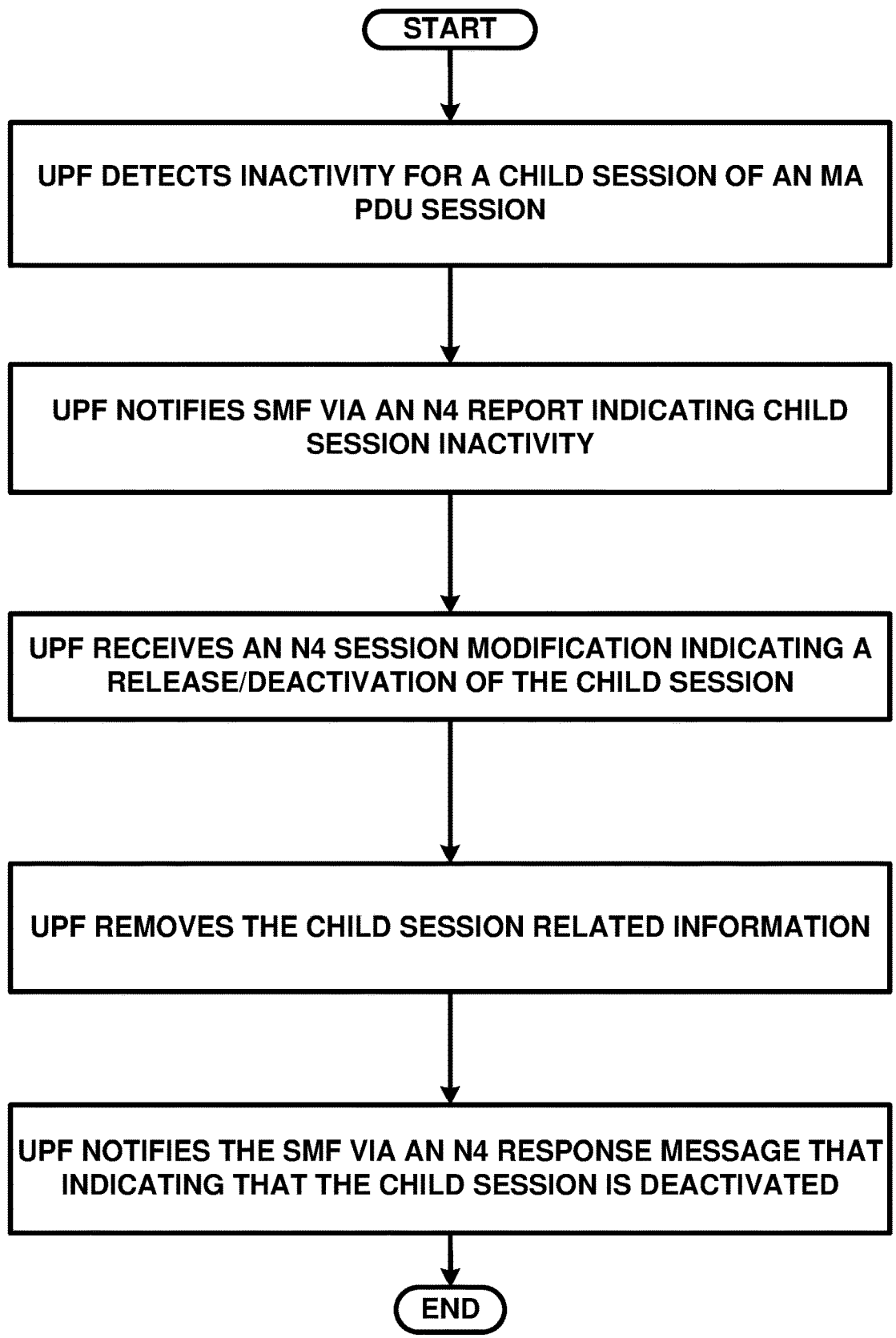
FIG. 29 is an example call flow as per an aspect of an embodiment of the present disclosure.
Figure 30:
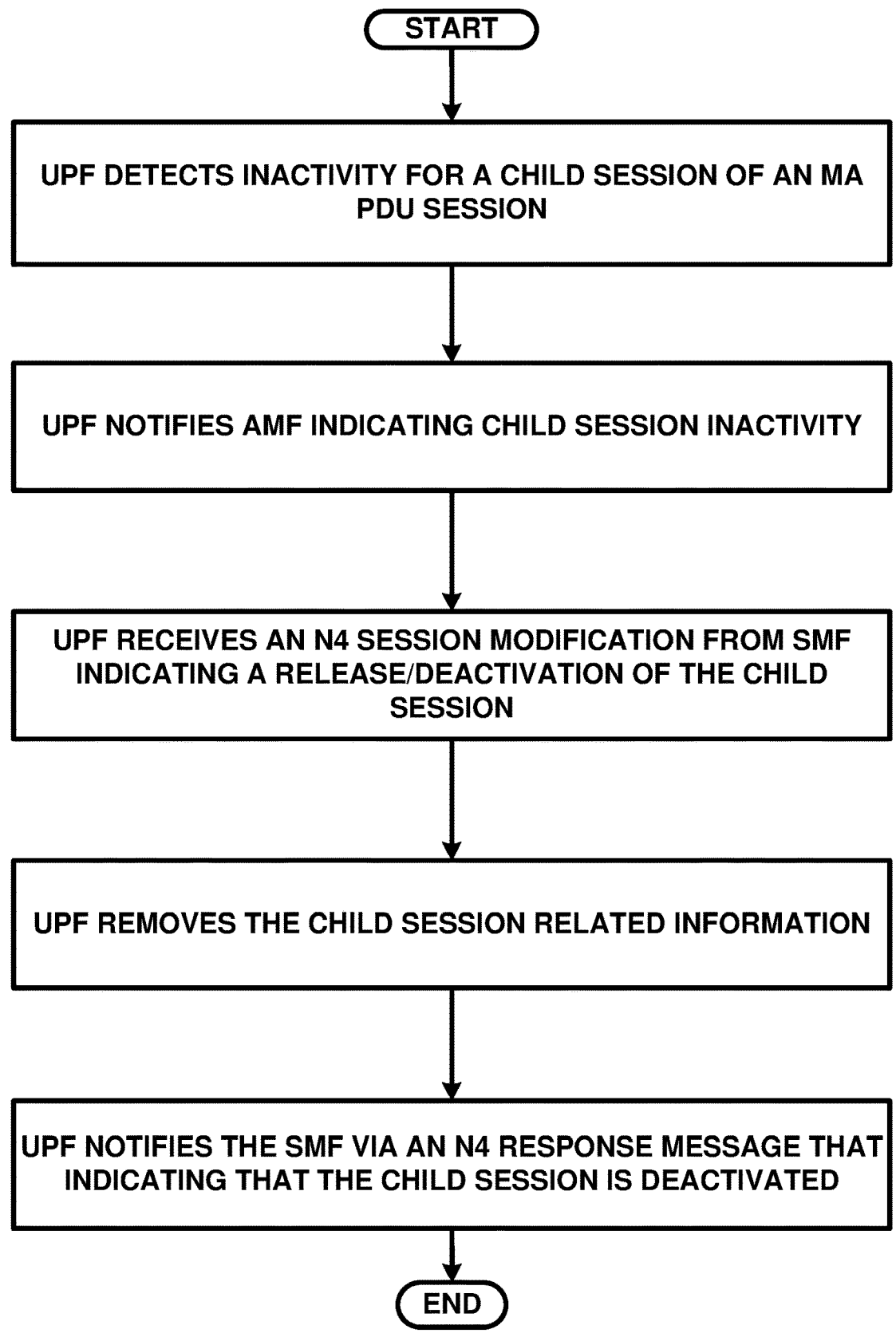
FIG. 30 is an example call flow as per an aspect of an embodiment of the present disclosure.
Figure 31:
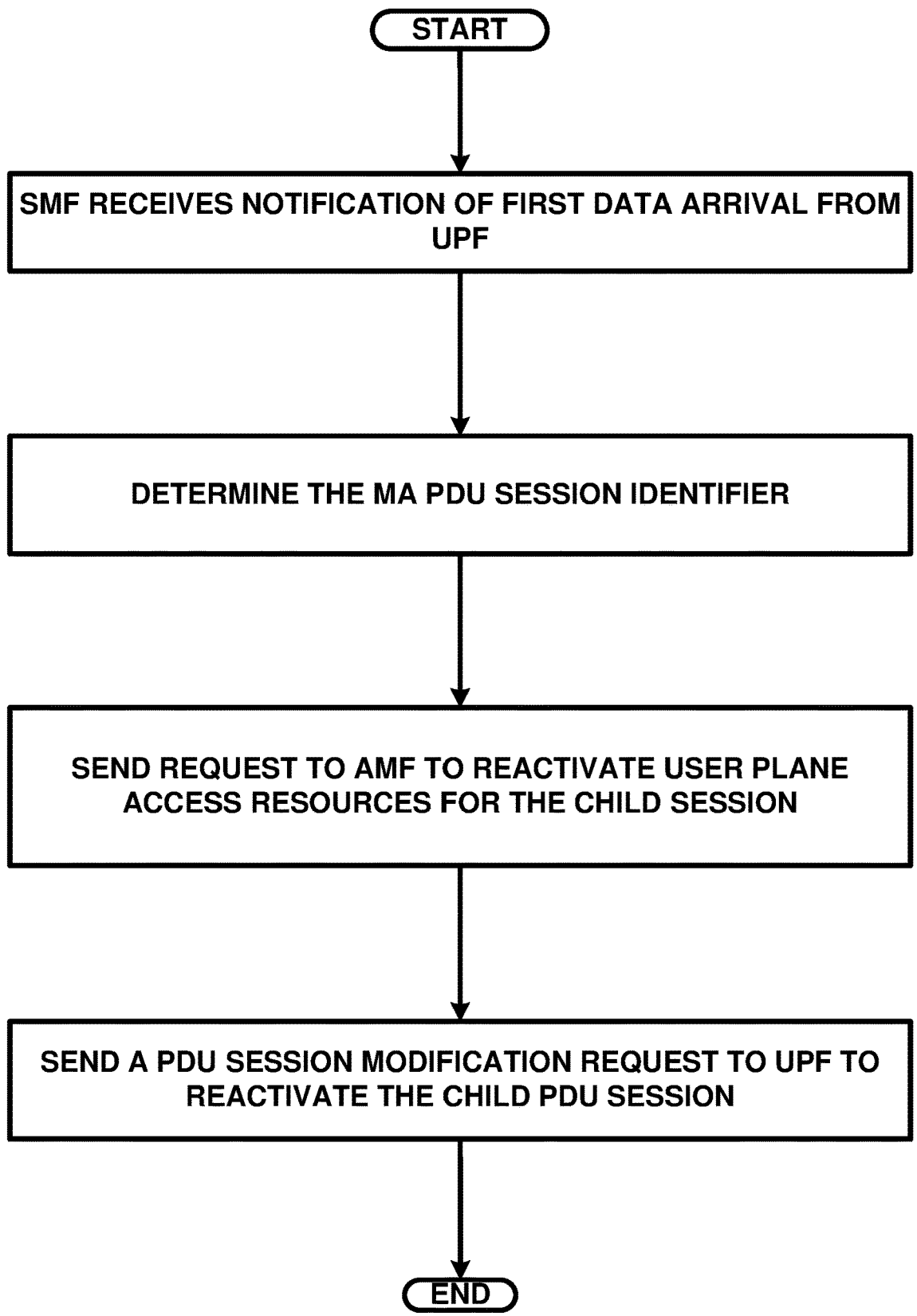
FIG. 31 is an example call flow as per an aspect of an embodiment of the present disclosure.
Figure 32:
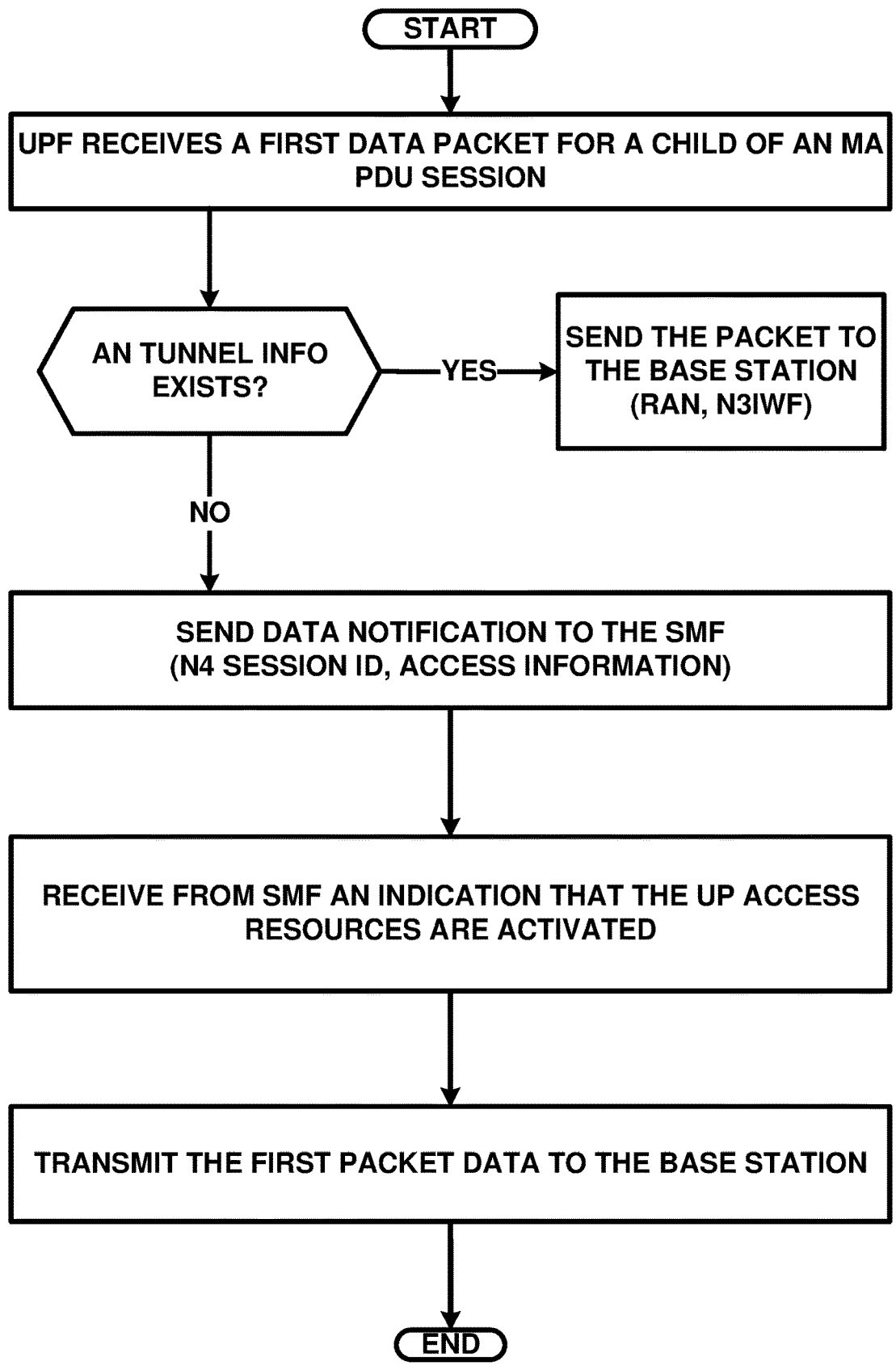
FIG. 32 is an example call flow as per an aspect of an embodiment of the present disclosure.

In an example embodiment as depicted in FIG. 26, an access and mobility management function (AMF) may receive from a user plane function (UPF), a first message reporting an event indicating inactivity of a child session of a multi access packet data unit (MA PDU) session. The first message may comprise: access information of the child session, an identifier of the MA PDU session, and/or the like. The AMF may send to a base station, a second message indicating a request for release of resources for the child session. The second message may comprise: the identifier of the MA PDU session, access information of the child session, and/or the like. The AMF may receive from the base station, a second response message indicating an acknowledgement that the resources for the child session are released. The AMF may send to a session management function (SMF), a third message indicating a request for modification of the MA PDU session. The third message maty comprise: the identifier of the MA PDU session, access information of the child session, and/or the like. The AMF may modify the MA PDU session information, indicating that one or more child session(s) are deactivated.

In an example, the SMF may identify a set of parameters associated with an N4 session corresponding to the MA PDU session.

In an example, the AMF may receive from the SMF, a third response message. The third response message may comprise an acknowledgment for the request for modification of the MA PDU session.

In an example embodiment, the access information may comprise at least one of: a radio access technology (RAT) information element indicating at least one of: evolved universal terrestrial radio access (E-UTRA), next generation E-UTRA (NG E-UTRA), new radio (NR), long term evolution for machines (LTE-M), narrowband internet of things (NB-IoT), wireless local area network (WLAN), and/or the like. In an example, an access type information element may indicate at least one of: 3GPP access type, Non-3GPP access type, and/or the like.

In an example, the first message may further comprise a unique identifier of the child session of the MA PDU session.

In an example, the SMF may send to the UPF a fourth message indicating a request for release of a child session associated with an MA PDU session. The fourth message may comprise: the identifier of the N4 session associated with the MA PDU session, the access information of the child session, and/or the like.

In an example, the SMF may receive from the UPF a fourth response message indicating an acknowledgment to the request for release of a child session associated with an MA PDU session. The SMF may modify the child session information, indicating that the child session is deactivated. In an example, the base station may be a non-3GPP interworking function (N3IWF). In an example, an MA PDU session may comprise a plurality of child sessions.

Figure 25:
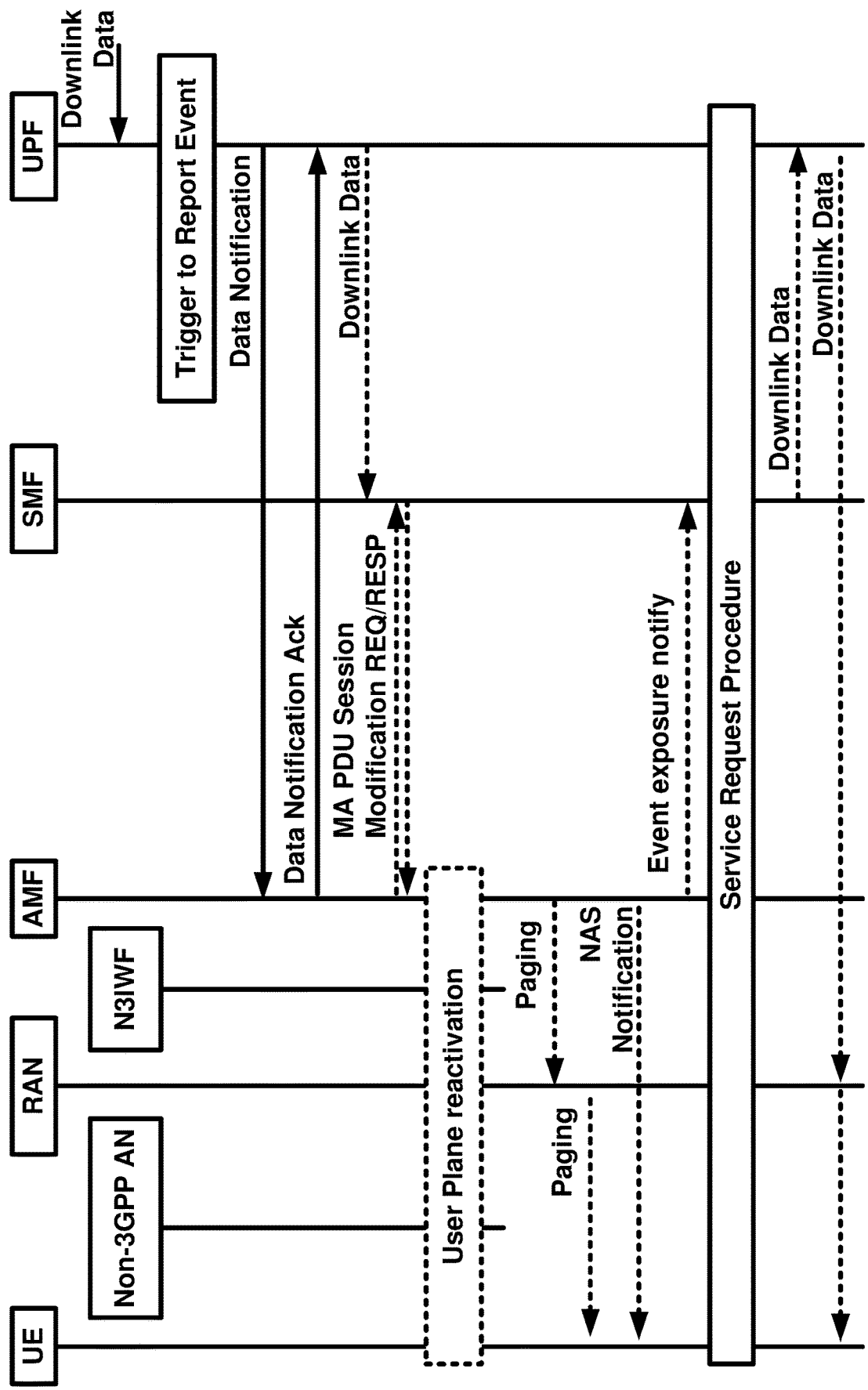
FIG. 25 is an example call flow as per an aspect of an embodiment of the present disclosure.

In an example embodiment as depicted in FIG. 25, an access and mobility management function (AMF) may receive from a user plane function (UPF), a first message. The first message may report an event indicating an arrival of a first downlink data for a child session of a multi access packet data unit (MA PDU) session. The first message may comprise access information of the child session, an identifier of the MA PDU session, and/or the like. The AMF may send to a base station, a second message indicating a request for activation of user plane resources for the child session. The second message may comprise the identifier of the MA PDU session, access information of the child session, and/or the like. The AMF may receive from the base station, a second response message indicating an acknowledgment for the request. The second response message may comprise an access network tunnel information, and/or the like. The AMF may send to a session management function (SMF), a third message indicating a request for modification of the MA PDU session. The third message may comprise the access network tunnel information, the identifier of the MA PDU session, access information of the child session, and/or the like. The AMF may modify the MA PDU session information, indicating that one or more child session(s) are activated.

In an example, the SMF may identify a set of parameters associated with an N4 session corresponding to the MA PDU session.

In an example, the AMF may receive from the SMF, a third response message comprising an acknowledgment for the request for modification of the MA PDU session.

In an example embodiment, the access information may comprise at least one of: a radio access technology (RAT) information element indicating at least one of: evolved universal terrestrial radio access (E-UTRA), next generation E-UTRA (NG E-UTRA), new radio (NR), long term evolution for machines (LTE-M), narrowband internet of things (NB-IoT), wireless local area network (WLAN), and/or the like. In an example, an access type information element may indicate at least one of: 3GPP access type, Non-3GPP access type, and/or the like.

In an example, the first message may further comprise a unique identifier of the child session of the MA PDU session.

In an example, the SMF may send to the UPF a fourth message indicating a request for modification of a child session associated with an MA PDU session. The fourth message may comprise: an access network tunnel information, the identifier of the N4 session associated with the MA PDU session, the access information of the child session, and/or the like.

In an example, the SMF may receive from the UPF a fourth response message indicating an acknowledgment to the request. The SMF may modify the child session information, indicating that the child session is activated. In an example, the base station may be a non-3GPP interworking function (N3IWF). In an example, an MA PDU session may comprise a plurality of child sessions.

Figure 33:
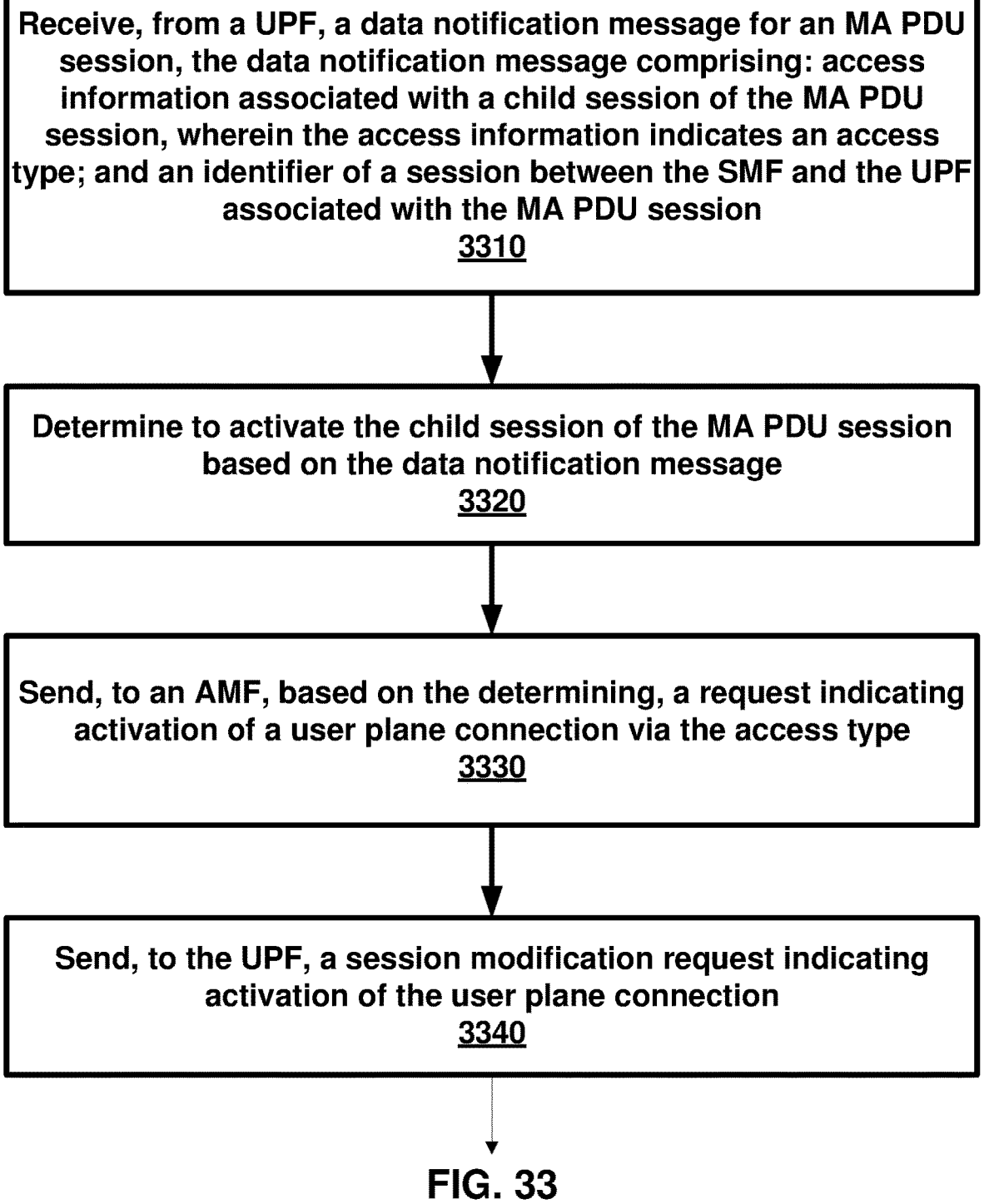
FIG. 33 is a flow diagram of an aspect of an embodiment of the present disclosure.

FIG. 33 is a flow diagram of an aspect of an embodiment of the present disclosure. At 3310, an SMF may receive, from a UPF, a data notification message for a multi access packet data unit (MA PDU) session. The data notification message may comprise access information associated with a child session of the MA PDU session. The access information may indicate an access type. The data notification message may comprise an identifier of a session between the SMF and the UPF associated with the MA PDU session. At 3320, the SMF may determine to activate the child session of the MA PDU session based on the data notification message. At 3330, the SMF may send, to an AMF, based on the determining, a request indicating activation of a user plane connection via the access type. At 3340, the SMF may send, to the UPF, a session modification request indicating activation of the user plane connection.

According to an example embodiment, the receiving of the data notification message at 3310 may be based on a determination by the UPF that a user plane connection for the child session for transmission of downlink data is required. The transmission of the downlink data may be via the access type associated with the child session.

According to an example embodiment, the SMF may derive an identifier of the MA PDU session. The SMF may include the identifier of the MA PDU in the request sent at 3330. The SMF may include the access information associated with the child session in the request sent at 3330. The deriving of the identifier may be based on the identifier of the session between the SMF and the UPF which is received at 3310. The identifier of the session between the SMF and the UPF may be an identifier of an N4 session.

According to an example embodiment, the access type indicated in the access information of the data notification message received at 3310 may be 3GPP access or non-3GPP access. The access information may indicate one or more of an identifier of an access point, an identifier of an access network, an identifier of a cell, an access network tunnel information, and a radio access technology (RAT) type. The RAT type may comprise one or more of evolved universal terrestrial radio access (E-UTRA), next generation E-UTRA (NG E-UTRA), new radio (NR), long term evolution for machines (LTE-M), narrowband internet of things (NB-IoT), and wireless local area network (WLAN).

According to an example embodiment, the SMF may receive, from a PCF, one or more ATSSS rules. The SMF may send, to the UPF, a packet detection rule (PDR) based on the one or more ATSSS rules. The receiving of the data notification message at 3310 may be based on a determination, by the UPF and based on the PDR, of the child session for transmission of downlink data.

According to an example embodiment, the data notification message received at 3310 may further comprise one or more of a list of one or more reporting triggers, the downlink data, a list of measurement information, and a unique identifier of the child session of the MA PDU session.

According to an example embodiment, the SMF may receive, from a wireless device via the AMF, a request indicating establishment of the MA PDU session.

According to an example embodiment, the AMF may send a request for activation of user plane resources for the child session to a base station or a non-3GPP interworking function (N3IWF). The AMF may send the request after receiving, from the SMF, the request indicating activation of the user plane connection sent at 3330. The request for activation of user plane resources may comprise the identifier of the MA PDU session and the access information associated with the child session. The AMF may receive a response message from the from the base station or the N3IWF. The response message may indicate an acknowledgment for the request.

According to an example embodiment, the data notification message may be received at 3310 in response to an arrival of downlink data for the child session at the UPF. Additionally or alternatively, the data notification message may be received at 3310 in response to a determination that activation of user plane connection for the child session is required for transmission of the downlink data via the access type associated with the child session.

Figure 34:
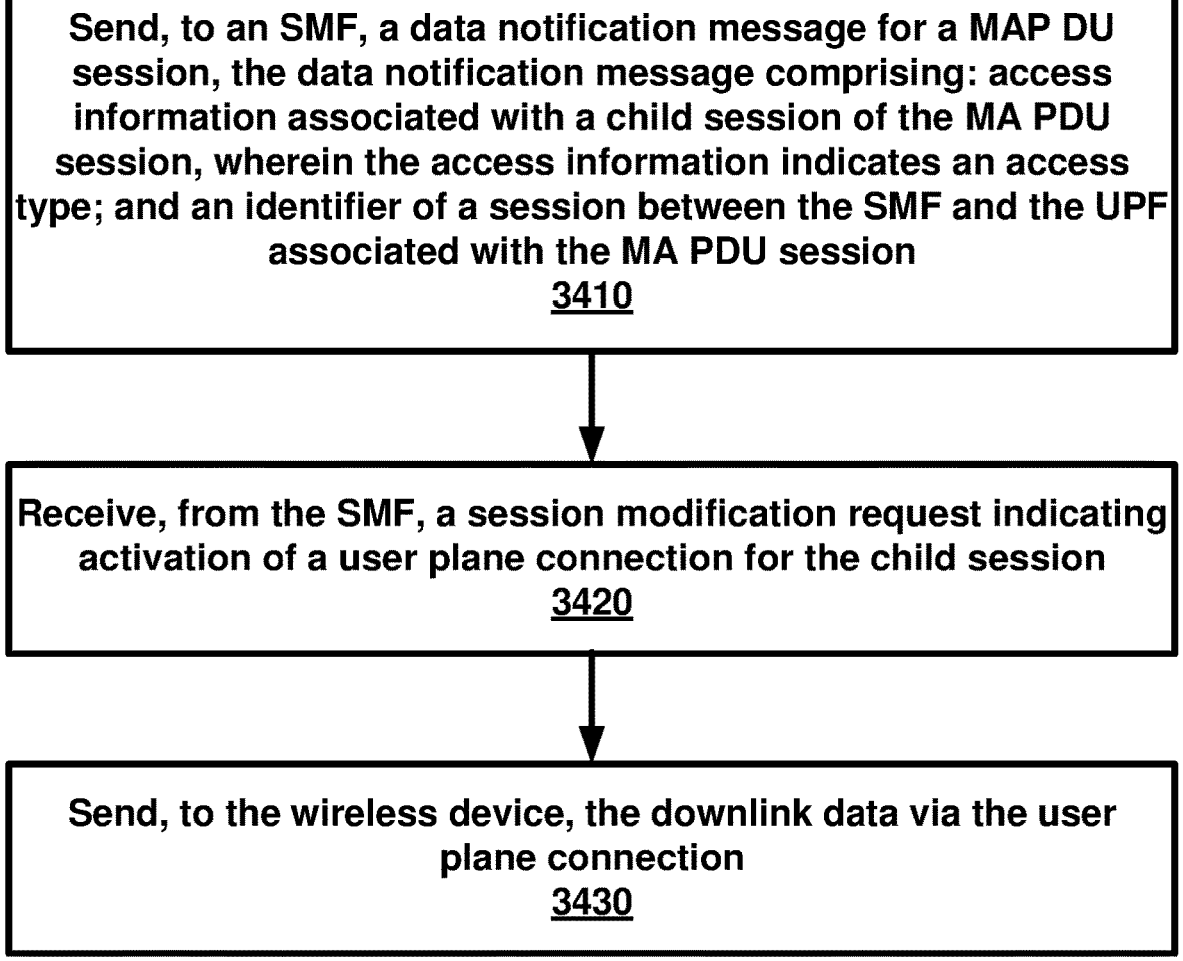
FIG. 34 is a flow diagram of an aspect of an embodiment of the present disclosure.

FIG. 34 is a flow diagram of an aspect of an embodiment of the present disclosure. At 3410, a UPF may send, to an SMF, a data notification message for a MAP DU session. The data notification message may comprise access information associated with a child session of the MA PDU session, wherein the access information indicates an access type. The data notification message may comprise an identifier of a session between the SMF and the UPF associated with the MA PDU session. At 3420, the UPF may receive, from the SMF, a session modification request indicating activation of a user plane connection for the child session. At 3430, the UPF may send, to the wireless device, the downlink data via the user plane connection.

According to an example embodiment, the receiving of the data notification message at 3310 may be based on a determination by the UPF that a user plane connection for the child session for transmission of downlink data is required. The transmission of the downlink data may be via the access type associated with the child session.

According to an example embodiment, the SMF may derive an identifier of the MA PDU session. The SMF may include the identifier of the MA PDU in the request sent at 3330. The SMF may include the access information associated with the child session in the request sent at 3330. The deriving of the identifier may be based on the identifier of the session between the SMF and the UPF which is received at 3310. The identifier of the session between the SMF and the UPF may be an identifier of an N4 session.

According to an example embodiment, the access type indicated in the access information of the data notification message received at 3310 may be 3GPP access or non-3GPP access. The access information may indicate one or more of an identifier of an access point, an identifier of an access network, an identifier of a cell, an access network tunnel information, and a radio access technology (RAT) type. The RAT type may comprise one or more of evolved universal terrestrial radio access (E-UTRA), next generation E-UTRA (NG E-UTRA), new radio (NR), long term evolution for machines (LTE-M), narrowband internet of things (NB-IoT), and wireless local area network (WLAN).

According to an example embodiment, the SMF may receive, from a PCF, one or more ATSSS rules. The SMF may send, to the UPF, a packet detection rule (PDR) based on the one or more ATSSS rules. The receiving of the data notification message at 3310 may be based on a determination, by the UPF and based on the PDR, of the child session for transmission of downlink data.

According to an example embodiment, the data notification message received at 3310 may further comprise one or more of a list of one or more reporting triggers, the downlink data, a list of measurement information, and a unique identifier of the child session of the MA PDU session.

According to an example embodiment, the SMF may receive, from a wireless device via the AMF, a request indicating establishment of the MA PDU session.

According to an example embodiment, the AMF may send a request for activation of user plane resources for the child session to a base station or a non-3GPP interworking function (N3IWF). The AMF may send the request after receiving, from the SMF, the request indicating activation of the user plane connection sent at 3330. The request for activation of user plane resources may comprise the identifier of the MA PDU session and the access information associated with the child session. The AMF may receive a response message from the from the base station or the N3IWF. The response message may indicate an acknowledgment for the request.

According to an example embodiment, the data notification message may be received at 3310 in response to an arrival of downlink data for the child session at the UPF. Additionally or alternatively, the data notification message may be received at 3310 in response to a determination that activation of user plane connection for the child session is required for transmission of the downlink data via the access type associated with the child session.

Figure 35:
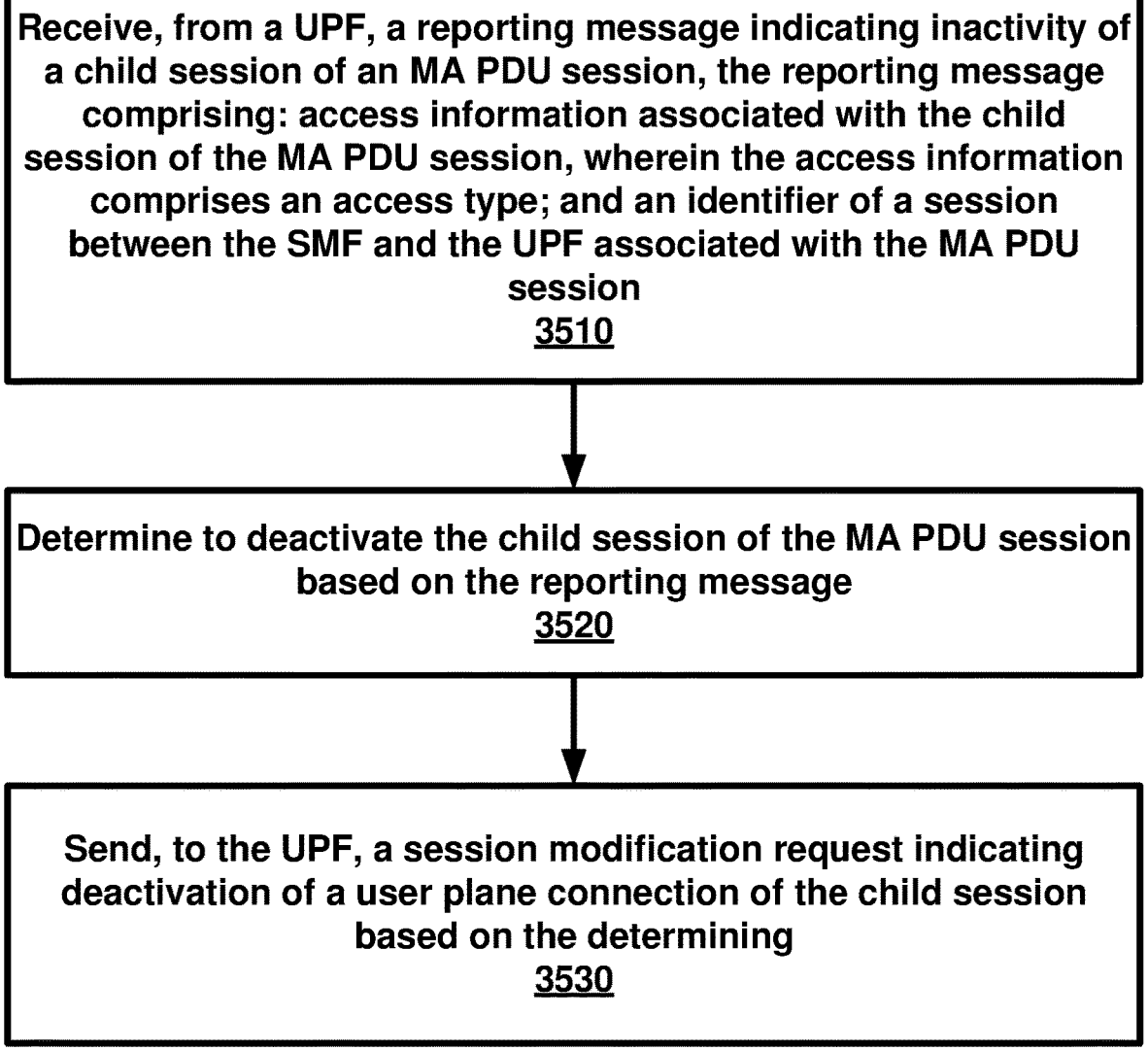
FIG. 35 is a flow diagram of an aspect of an embodiment of the present disclosure.

FIG. 35 is a flow diagram of an aspect of an embodiment of the present disclosure. At 3510, an SMF may receive, from a UPF, a reporting message indicating inactivity of a child session of an MA PDU session. The reporting message may comprise access information associated with the child session of the MA PDU session. The access information may comprise an access type. The reporting message may comprise an identifier of a session between the SMF and the UPF associated with the MA PDU session. At 3520, the SMF may determine to deactivate the child session of the MA PDU session based on the reporting message. At 3530, the SMF may send, to the UPF, a session modification request indicating deactivation of a user plane connection of the child session based on the determining.

According to an example embodiment, the SMF may identify a set of parameters associated with an N4 session corresponding to the MA PDU session. The SMF may remove the set of parameters. According to an example embodiment, the reporting message received at 3510 may further indicate inactivity of the child session of the MA PDU session for a period of time.

According to an example embodiment, the SMF may send to an AMF in response to the determining at 3520, a request indicating deactivation of the user plane connection of the child session. The request may comprise an identifier of the MA PDU session. The request may comprise access information associated with the child session. The SMF may derive the identifier of the MA PDU session based on the identifier of the session between the SMF and the UPF. The access information may comprise an identifier of an access point. The access information may comprise an identifier of an access network. The access information may comprise an identifier of a cell. The access information may comprise a radio access technology (RAT) type. The access information may comprise an access network tunnel information. The RAT type may comprise E-UTRA, NG E-UTRA, NR, LTE-M, NB-IoT, and/or WLAN. According to an example embodiment, the access type comprises 3GPP access or non-3GPP access.

According to an example embodiment, the SMF may receive, from a PCF, one or more ATSSS rules. The SMF may send, to the UPF, a packet detection rule (PDR).

According to an example embodiment, the reporting message received at 3510 may comprise a list of reporting triggers. The reporting message received at 3510 may comprise a list of measurement information. The reporting message received at 3510 may comprise a unique identifier of the child session of the MA PDU session. The MA PDU session may employ one or more child sessions for splitting, steering, and switching of traffic among a plurality of access types.

According to an example embodiment, the SMF may send, to a network element, a request for deactivation of user plane resources for the child session. The network element may be a base station or a non-EGPP interworking function (N3IWF). The request may comprise the identifier of the MA PDU session. The request may comprise the access information associated with the child session.

According to an example embodiment, the AMF may receive, from the base station, a response message indicating an acknowledgment for the request. The identifier of the session between the SMF and the UPF is an identifier of an N4 session. The UPF may receive, from the SMF, a packet detection rule (PDR) for the MA PDU session. The PDR may comprise access information of the child session of the MA PDU session. The deactivation may comprise release of user plane connection. The deactivation may comprise maintaining the session between the SMF and the UPF in response to receiving the session modification request. The deactivation may comprise removing by the UPF an access network tunnel information of the child session. The UPF may determine a set of parameters associated with the child session of the MA PDU session. The UPF may remove the set of parameters.

FIG. 36 is a flow diagram of an aspect of an embodiment of the present disclosure. At 3610, a UPF may send, to an SMF, a reporting message indicating inactivity of a child session of an MA PDU session. The reporting message may comprise access information associated with the child session of the MA PDU session. The access information may comprise an access type. The reporting message may comprise and an identifier of a session between the SMF and the UPF associated with the MA PDU session. At 3620, the UPF may receive, from the SMF, a session modification request indicating deactivation of a user plane connection of the child session. At 3630, the UPF may deactivate, based on the session modification request, the user plane connection of the child session.

FIG. 37 is a flow diagram of an aspect of an embodiment of the present disclosure. At 3710, an SMF may receive, from an AMF, a first session creation request message for an MA PDU session of a wireless device. The first session creation request message may comprise an ATSSS capability indicator. At 3720, the SMF may send, to an NRF, a first message requesting discovery of a UPF. The first message may comprise the ATSSS capability indicator. At 3730, the SMF may receive, from the NPF, a second message. The second message may comprise an identifier of the UPF. At 3740, the SMF may send, to the UPF, a second session creation request message to create a session between the SMF and the UPF.

Figure 38:
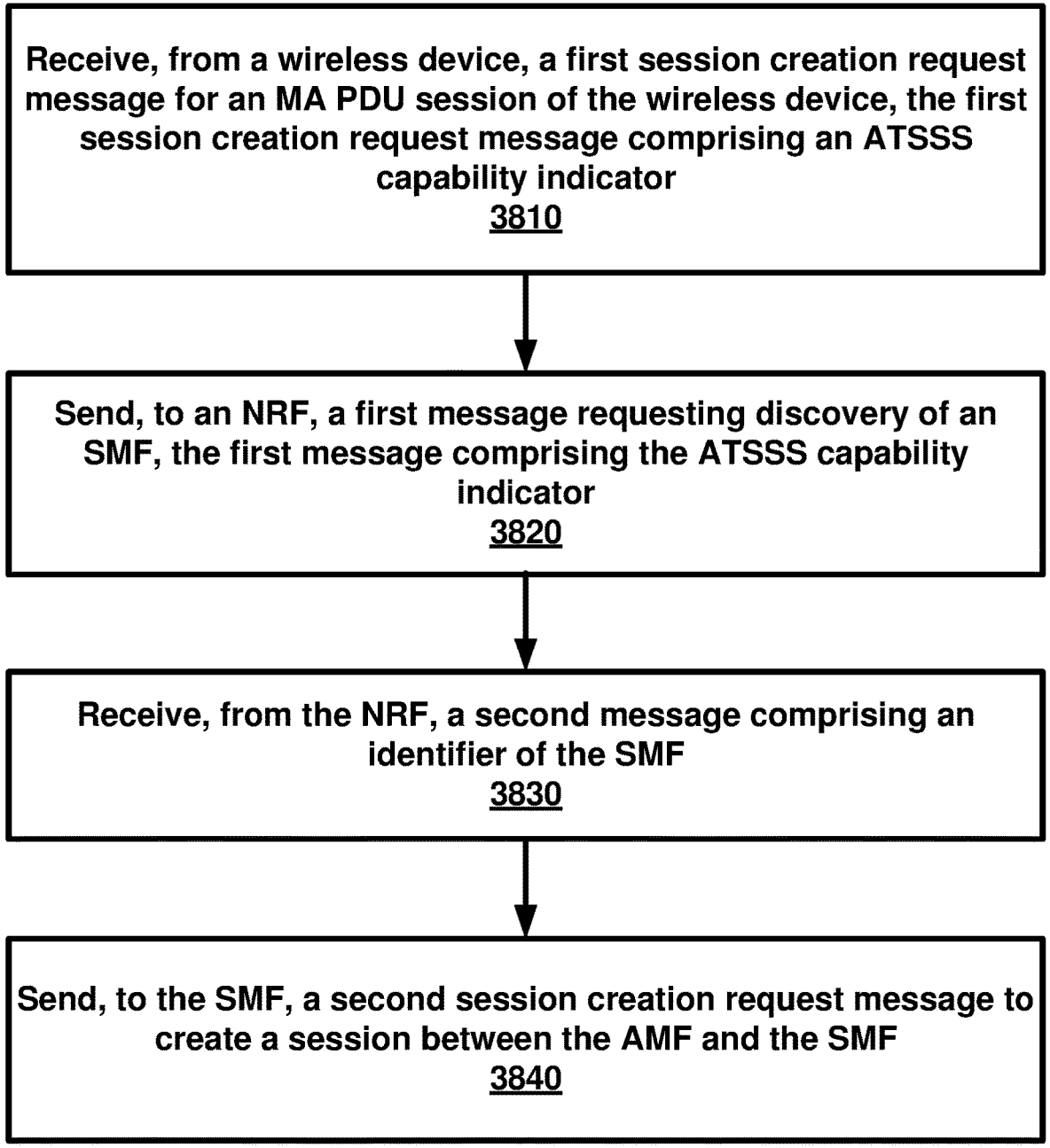
FIG. 38 is a flow diagram of an aspect of an embodiment of the present disclosure.

FIG. 38 is a flow diagram of an aspect of an embodiment of the present disclosure. At 3810, a UPF may receive, from a wireless device, a first session creation request message for an MA PDU session of the wireless device. The first session creation request message may comprise an ATSSS capability indicator. At 3820, the UPF may send, to an NRF, a first message requesting discovery of an SMF. The first message may comprise the ATSSS capability indicator. At 3830, the UPF may receive, from the NRF, a second message. The second message may comprise an identifier of the SMF. At 3840, the UPF may send, to the SMF, a second session creation request message to create a session between the AMF and the SMF.

In this specification, a and an and similar phrases are to be interpreted as at least one and one or more. In this specification, the term may is to be interpreted as may, for example. In other words, the term may is indicative that the phrase following the term may is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often employed in combination to achieve the result of a functional module.

Example embodiments of the invention may be implemented using various physical and/or virtual network elements, software defined networking, virtual network functions.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using 5G AN. However, one skilled in the art will recognize that embodiments of the invention may also be implemented in a system comprising one or more legacy systems or LTE. The disclosed methods and systems may be implemented in wireless or wireline systems. The features of various embodiments presented in this invention may be combined. One or many features (method or system) of one embodiment may be implemented in other embodiments. A limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language means for or step for be interpreted under 35 U.S.C. 112. Claims that do not expressly include the phrase means for or step for are not to be interpreted under 35 U.S.C. 112.

What is claimed is:

1. A method comprising:
receiving, by a session management function (SMF) from a user plane function (UPF), a data notification message for a multi access (MA) packet data unit (PDU) session associated with multiple tunnels between multiple access network types and a PDU session anchor; and
sending, by the SMF to an access and mobility management function (AMF), a first request to activate user plane resources of an access network type from among the multiple access network types of the MA PDU session, wherein the first request comprises an indication of the access network type, from among the multiple access network types.

2. The method of claim 1, further comprising receiving, by the SMF from the AMF, a second request to establish the MA PDU session.

3. The method of claim 2, further comprising sending, by the SMF to a network repository function (NRF), a third request for discovery of one or more UPFs that support access traffic steering, switching and splitting (ATSSS) for the MA PDU session, the third request comprising an ATSSS capability indicator.

4. The method of claim 3, further comprising receiving, by the SMF from the NRF and based on the third request, an identifier of the UPF from among the one or more UPFs that support ATSSS for the MA PDU session.

5. The method of claim 4, further comprising sending, by the SMF to the UPF, a fourth request to establish the MA PDU session.

6. The method of claim 1, further comprising sending, by the SMF to the UPF, a packet detection rule (PDR) comprising packet detection information, wherein the packet detection information comprises an access network information for the MA PDU session.

7. The method of claim 6, wherein the SMF sends to the UPF the PDR in response to receiving an access traffic steering, switching and splitting (ATSSS) rule from a policy and charging control function node.

8. The method of claim 1, wherein the data notification message comprises:
access information associated with the MA PDU session, wherein the access information comprises the access network type; and
an identifier of a session between the SMF and the UPF associated with the MA PDU session.

9. The method of claim 8, further comprising determining by the SMF to activate the MA PDU session based on the data notification message.

10. The method of claim 9, wherein the first request to activate the user plane resources is sent by the SMF to the AMF in response to the determining.

11. The method of claim 1, wherein the MA PDU session comprises one or more PDU sessions associated with one or more access network types.

12. The method of claim 1, wherein the multiple access network types comprise:
a third generation partnership project (3GPP) access network; and
a non-3GPP access network.

13. A session management function (SMF) comprising:
one or more processors; and
memory storing instructions that, when executed by the one or more processors, cause the SMF to:
receive, from a user plane function (UPF), a data notification message for a multi access (MA) packet data unit (PDU) session associated with multiple tunnels between multiple access network types and a PDU session anchor; and
send, to an access and mobility management function (AMF), a first request to activate user plane resources of an access network type from among the multiple access network types of the MA PDU session, wherein the first request comprises an indication of the access network type, from among the multiple access network types.

14. The SMF of claim 13, wherein the instructions further cause the SMF to receive, from the AMF, a second request to establish the MA PDU session.

15. The SMF of claim 14, wherein the instructions further cause the SMF to send, to a network repository function (NRF), a third request for discovery of one or more UPFs that support access traffic steering, switching and splitting (ATSSS) for the MA PDU session, the third request comprising an ATSSS capability indicator.

16. The SMF of claim 15, wherein the instructions further cause the SMF to receive, from the NRF and based on the third request, an identifier of the UPF from among the one or more UPFs that support ATSSS for the MA PDU session.

17. The SMF of claim 16, wherein the instructions further cause the SMF to send, to the UPF, a fourth request to establish the MA PDU session.

18. The SMF of claim 13, wherein the instructions further cause the SMF to send, to the UPF, a packet detection rule (PDR) comprising packet detection information, wherein the packet detection information comprises an access network information for the MA PDU session.

19. The SMF of claim 18, wherein the PDR is sent in response to receiving an access traffic steering, switching and splitting (ATSSS) rule from a policy and charging control function node.

20. A system, comprising:
   a session management function (SMF) comprising:
      one or more processors; and
   memory storing instructions that, when executed by the one or more processors of the SMF, cause the SMF to:
      receive, from a user plane function (UPF), a data notification message for a multi access (MA) packet data unit (PDU) session associated with multiple tunnels between multiple access network types and a PDU session anchor; and
      send, to an access and mobility management function (AMF), a first request to activate user plane resources of an access network type from among the multiple access network types of the MA PDU session, wherein the first request comprises an indication of the access network type, from among the multiple access network types.

\* \* \* \* \*